(12) United States Patent
Chino et al.

(10) Patent No.: US 11,834,292 B2
(45) Date of Patent: Dec. 5, 2023

(54) DRIVING FORCE TRANSMISSION DEVICE AND IMAGE FORMING APPARATUS

(71) Applicant: CANON KABUSHIKI KAISHA, Tokyo (JP)

(72) Inventors: Hideto Chino, Kanagawa (JP); Shunsuke Okazaki, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 17/390,679

(22) Filed: Jul. 30, 2021

(65) Prior Publication Data
US 2022/0043373 A1 Feb. 10, 2022

(30) Foreign Application Priority Data
Aug. 4, 2020 (JP) .................. 2020-132479

(51) Int. Cl.
*B65H 3/06* (2006.01)
*G03G 15/16* (2006.01)
*G03G 15/00* (2006.01)
*F16H 37/12* (2006.01)

(52) U.S. Cl.
CPC ......... *B65H 3/0669* (2013.01); *B65H 3/0684* (2013.01); *F16H 37/12* (2013.01); *G03G 15/1615* (2013.01); *G03G 15/6529* (2013.01); *B65H 2403/421* (2013.01); *B65H 2403/512* (2013.01)

(58) Field of Classification Search
CPC ...... B65H 3/06; B65H 3/0669; B65H 3/0684; B65H 2403/421; B65H 2403/51; B65H 2403/511; B65H 2403/512; B65H 2403/514; B65H 2511/21; B65H 2511/212; F16H 37/12
See application file for complete search history.

(56) References Cited

U.S. PATENT DOCUMENTS

| 2017/0248211 | A1* | 8/2017 | Chino ............. F16H 1/206 |
| 2019/0121278 | A1* | 4/2019 | Kawamura ......... B65H 3/0684 |
| 2021/0003945 | A1* | 1/2021 | Chino ............. G03G 15/1615 |

FOREIGN PATENT DOCUMENTS

| JP | 2005154076 A | 6/2005 |
| JP | 2008050133 A | 3/2008 |
| JP | 2016210533 A | 12/2016 |

* cited by examiner

*Primary Examiner* — Prasad V Gokhale
(74) *Attorney, Agent, or Firm* — Canon U.S.A., Inc. IP Division

(57) ABSTRACT

A driving force transmission device includes a drive gear, a driven gear, which includes a gear portion and a partially toothless gear portion, rotates by the gear portion meshing with the drive gear, stops rotating in response to the partially toothless gear portion facing the drive gear, a first cam member and a second cam member which operate in conjunction with the driven gear, a first elastic member for urging the first cam member, a follower member to which urging force is applied by a second elastic member and which is moved by the second cam member, and a contact portion for coming into contact with the first cam member by urging force of the first elastic member. The first cam member includes a home cam surface for coming into contact with the contact portion so that rotation of the driven gear is limited.

20 Claims, 40 Drawing Sheets

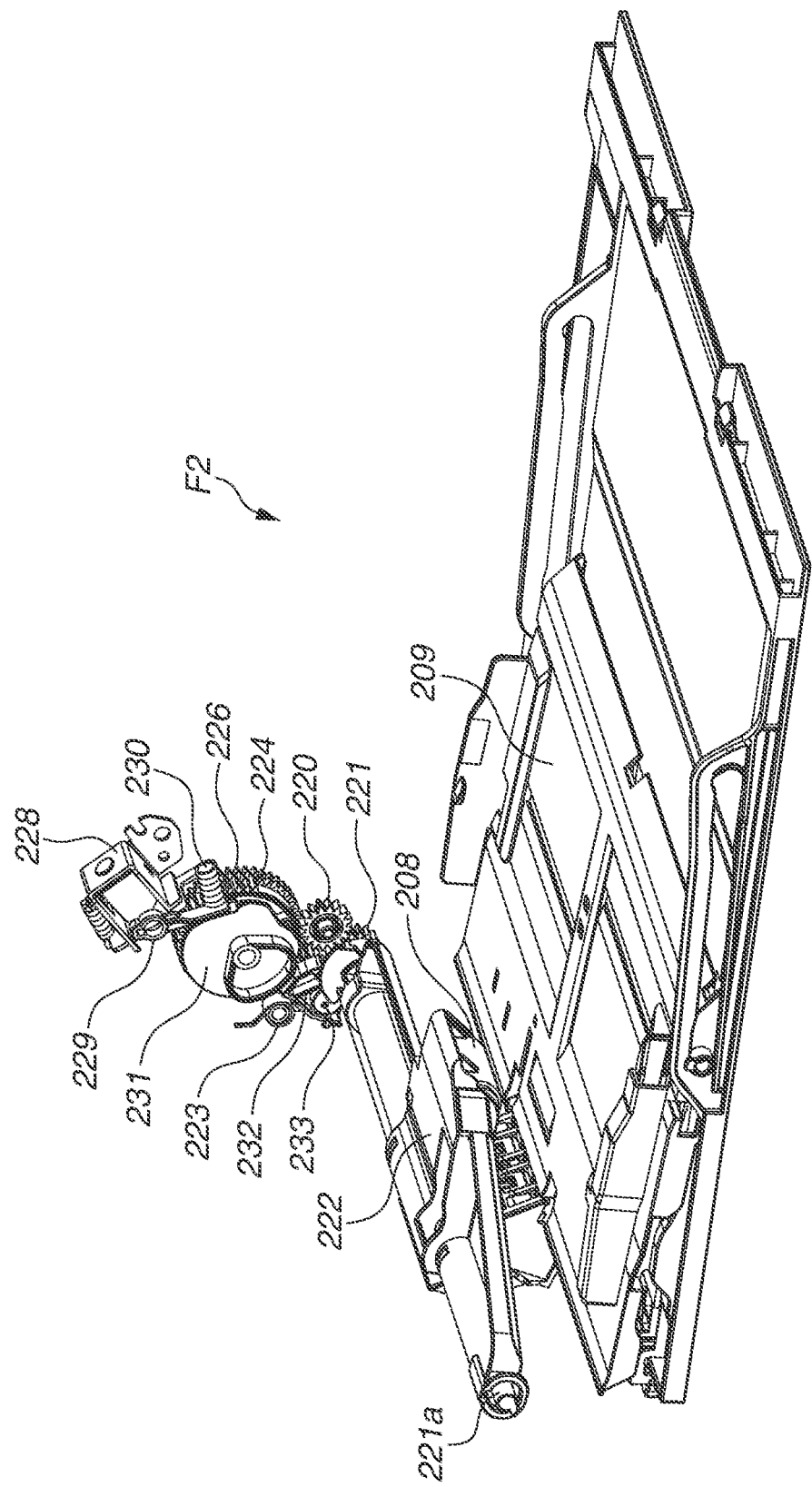

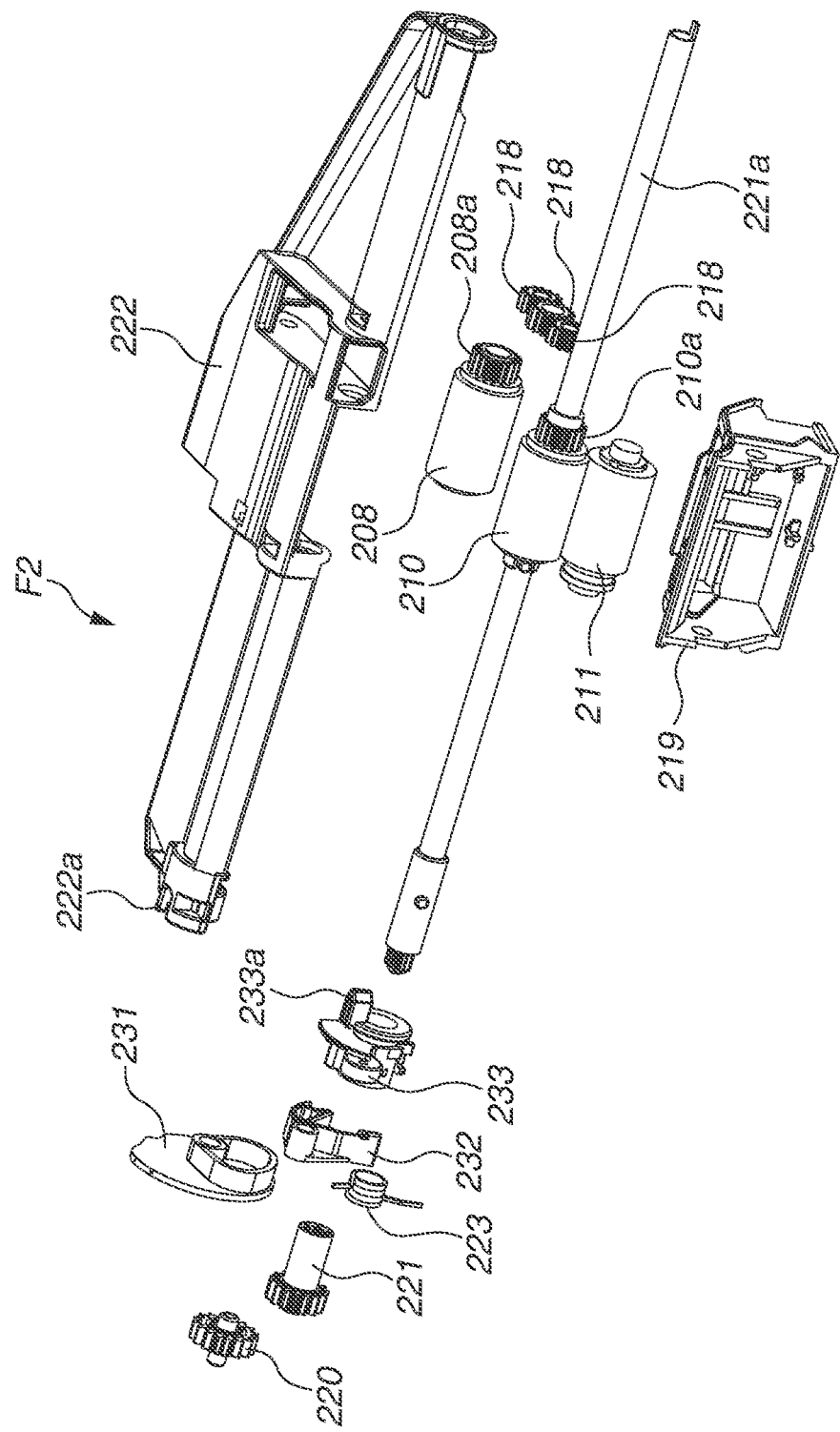

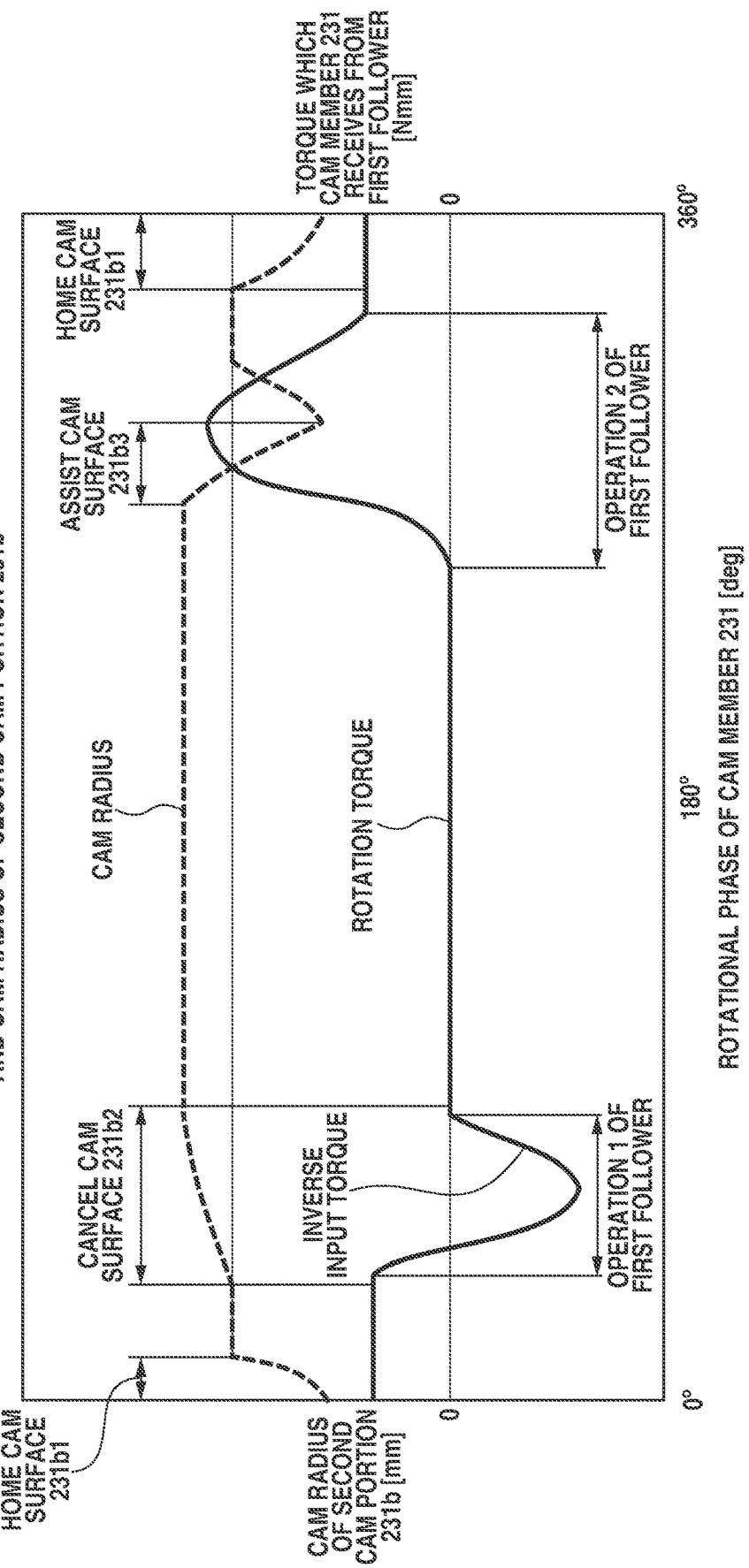

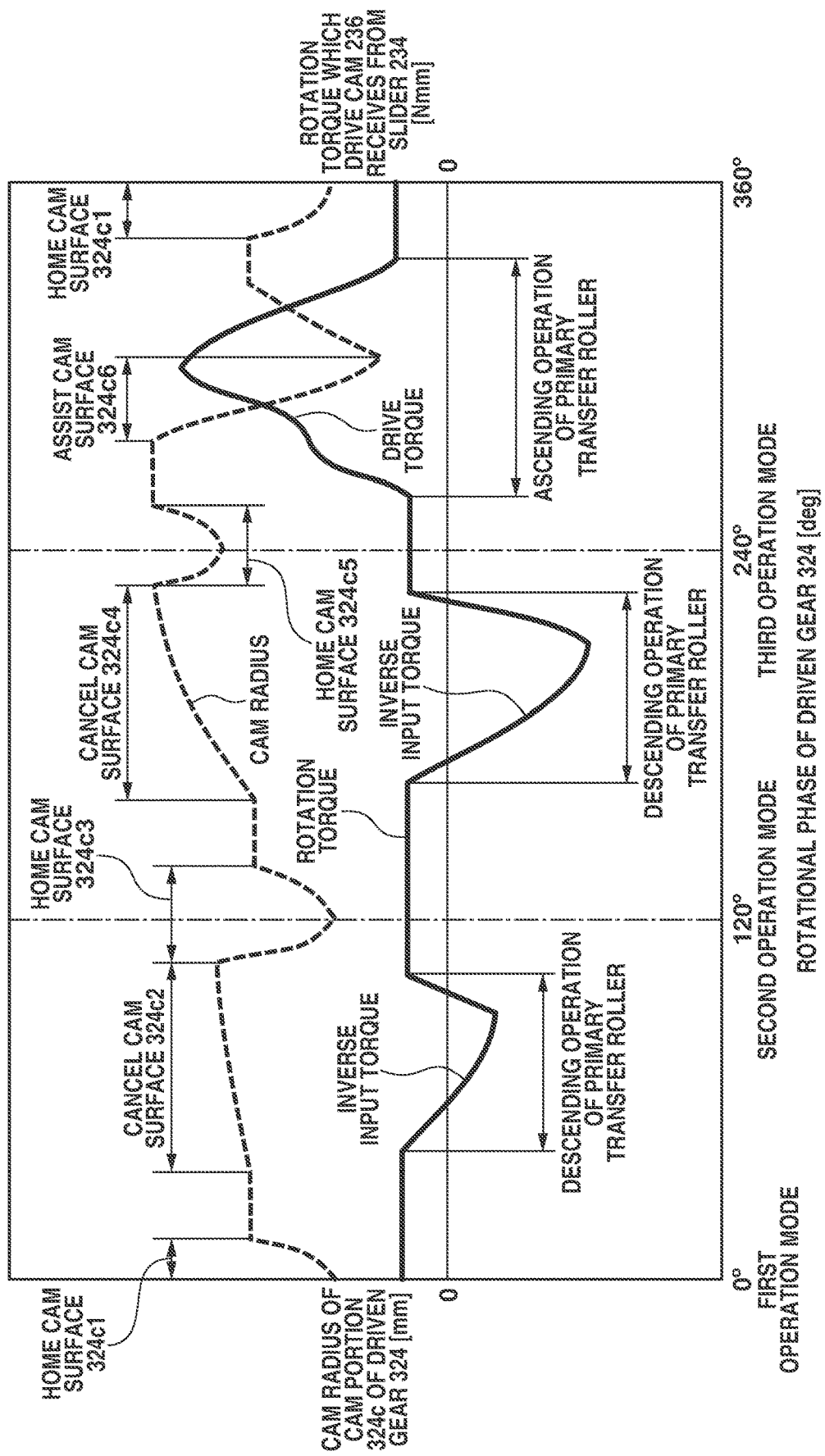

DRIVING FORCE TRANSMISSION DEVICE AND IMAGE FORMING APPARATUS

BACKGROUND

Field of the Disclosure

Aspects of the present disclosure generally relate to a driving force transmission device which transmits a driving force coming from a drive source to a driven member.

Description of the Related Art

Conventional image forming apparatuses include a configuration which causes a driving force transmission device using a partially toothless gear to transmit a driving force coming from a drive source to a driven member to drive the driven member.

Japanese Patent Application Laid-Open No. 2008-50133 discusses a configuration which causes the above-mentioned driving force transmission device to rotationally drive a pick roller serving as a driven member or to operate a pick arm for moving the pick roller from a retreating position to a feeding position.

Specifically, in the configuration discussed in Japanese Patent Application Laid-Open No. 2008-50133, the pick roller serving as a driven member is held by the pick arm, which is able to turn around an axis, and is driven by a feeding motor. The pick arm is controlled for rotational motion by a cam which lowers the pick roller from the retreating position to the feeding position.

When a command for feeding a sheet is issued, a solenoid operates and a trigger cam rotates by a trigger member, which is urged by a trigger spring. A cam which operates the pick arm includes an engagement portion in such a way as to rotate in synchronization with the trigger cam, and thus rotates in conjunction with the trigger cam.

Then, when the cam rotates by a predetermined amount in conjunction with the trigger cam, a partially toothless gear, which rotates in synchronization with the cam, meshes with a connection gear, which is driven by the feeding motor, and thus starts to rotate. With this rotation, the cam further rotates, and the pick arm, which is urged by a feeding spring, is lowered while being in sliding contact with the outer circumferential surface of the cam. Then, the pick roller moves to the feeding position, comes into contact with the uppermost sheet in a sheet stack loaded in a cassette, and performs feeding of the sheet.

However, in the configuration discussed in Japanese Patent Application Laid-Open No. 2008-50133, when the pick arm starts a descending operation from the retreating position to the feeding position due to the rotation of the cam, the feeding spring, which is urging the pick arm, is expanded, so that an elastic force of the feeding spring is released. Then, due to the elastic force of the feeding spring, an inverse input torque, which acts on the cam in the rotational direction of the cam, is generated. When such an inverse input torque is generated, backlash in gear meshing between the partially toothless gear and the connection gear may become apt to be clogged or a striking sound caused by the pick arm suddenly operating may become apt to be generated.

On the other hand, when the pick arm starts an ascending operation from the feeding position to the retreating position due to the rotation of the cam, the feeding spring, which is urging the pick arm, is compressed, so that an elastic force of the feeding spring is charged. Then, due to the force by which the feeding spring is compressed, a driving torque, which acts on the cam in a direction opposite to the rotational direction of the cam, is generated.

SUMMARY

Aspects of the present disclosure are generally directed to reducing any torque variation of a cam member, which is rotated by receiving a driving force from a drive source, without the need to arrange a dedicated member.

According to an aspect of the present disclosure, a driving force transmission device provided in a drive train which transmits a driving force coming from a drive source to a driven member includes a drive gear configured to rotate by being coupled to the drive source, a driven gear including a gear portion, which has a plurality of teeth meshing with the drive gear, and a partially toothless gear portion, which is a region having no teeth meshing with the drive gear, and configured to rotate in response to the gear portion meshing with the drive gear and to stop rotating in response to the partially toothless gear portion facing the drive gear, a first cam member configured to rotate in conjunction with rotation of the driven gear, a second cam member configured to rotate in conjunction with rotation of the driven gear, a first elastic member configured to apply an urging force to the first cam member, a contact portion configured to come into contact with the first cam member by the urging force of the first elastic member, and a follower member configured to be urged by a second elastic member and be moved by the second cam member, wherein the first cam member includes (i) a home cam surface configured to come into contact with the contact portion in such a manner that, when the partially toothless gear portion faces the drive gear, rotation of the driven gear is limited, and (ii) a cancel cam surface configured to come into contact with the contact portion when an elastic force of the second elastic member is released according to rotation of the driven gear, and wherein the cancel cam surface comes into contact with the contact portion in such a manner that an elastic force of the first elastic member is charged according to rotation of the driven gear.

According to another aspect of the present disclosure, a driving force transmission device provided in a drive train which transmits a driving force coming from a drive source to a driven member includes a drive gear configured to rotate by being coupled to the drive source, a driven gear including a gear portion, which has a plurality of teeth meshing with the drive gear, and a partially toothless gear portion, which is a region having no teeth meshing with the drive gear, and configured to rotate in response to the gear portion meshing with the drive gear and to stop rotating in response to the partially toothless gear portion facing the drive gear, a first cam member configured to rotate in conjunction with rotation of the driven gear, a second cam member configured to rotate in conjunction with rotation of the driven gear, a first elastic member configured to apply an urging force to the first cam member, a contact portion configured to come into contact with the first cam member by the urging force of the first elastic member, and a follower member configured to be urged by a second elastic member and be moved by the second cam member, wherein the first cam member includes (i) a home cam surface configured to come into contact with the contact portion in such a manner that, when the partially toothless gear portion faces the drive gear, rotation of the driven gear is limited, and (ii) an assist cam surface configured to come into contact with the contact portion when an elastic force of the second elastic member is charged according to rotation of the driven gear, and wherein the assist cam surface comes into contact with the contact portion in such a manner that an elastic force of the first elastic member is released according to rotation of the driven gear.

According to yet another aspect of the present disclosure, a driving force transmission device provided in a drive train which transmits a driving force coming from a drive source to a driven member includes a drive gear configured to rotate by being coupled to the drive source, a driven gear including a gear portion, which has a plurality of teeth meshing with the drive gear, and a partially toothless gear portion, which is a region having no teeth meshing with the drive gear, and configured to rotate in response to the gear portion meshing with the drive gear and to stop rotating in response to the partially toothless gear portion facing the drive gear, a first cam member configured to rotate in conjunction with rotation of the driven gear, a second cam member configured to rotate in conjunction with rotation of the driven gear, a first elastic member configured to apply an urging force to the first cam member, a contact portion configured to come into contact with the first cam member by the urging force of the first elastic member, and a follower member configured to be urged by a second elastic member and be moved by the second cam member, wherein the first cam member includes (i) a home cam surface configured to come into contact with the contact portion in such a manner that, when the partially toothless gear portion faces the drive gear, rotation of the driven gear is limited, and (ii) at least one of a cancel cam surface and an assist cam surface, wherein the cancel cam surface comes into contact with the contact portion in such a manner that, when an elastic force of the second elastic member is released according to rotation of the driven gear, an elastic force of the first elastic member is charged according to rotation of the driven gear, and wherein the assist cam surface comes into contact with the contact portion in such a manner that, when the elastic force of the second elastic member is charged according to rotation of the driven gear, the elastic force of the first elastic member is released according to rotation of the driven gear.

Further features of the present disclosure will become apparent from the following description of exemplary embodiments with reference to the attached drawings.

BRIEF DESCRIPTION OF THE DRAWINGS

FIG. 22 is a perspective view of a second feeding portion.

FIG. 23 is a perspective view of the second feeding portion before being assembled.

FIG. 32 is a relationship diagram between the rotation torque of a cam member and the cam radius of a second cam portion.

FIG. 40 is a relationship diagram between the rotation torque of the driven gear and the cam radius of a cam portion.

DESCRIPTION OF THE EMBODIMENTS

Various exemplary embodiments, features, and aspects of the disclosure will be described in detail below with reference to the drawings. However, for example, the dimensions, materials, shapes, and relative locations of constituent components described in the following exemplary embodiments are those which are to be altered or modified as appropriate according to configurations of devices or apparatuses to which the aspects of the disclosure are applied and various conditions, and the scope of the disclosure should not be construed to be limited to only those.

In the following description, a driving force transmission device according to a first exemplary embodiment and an image forming apparatus including the driving force transmission device are described.

[Image Forming Apparatus]

Figure 33:
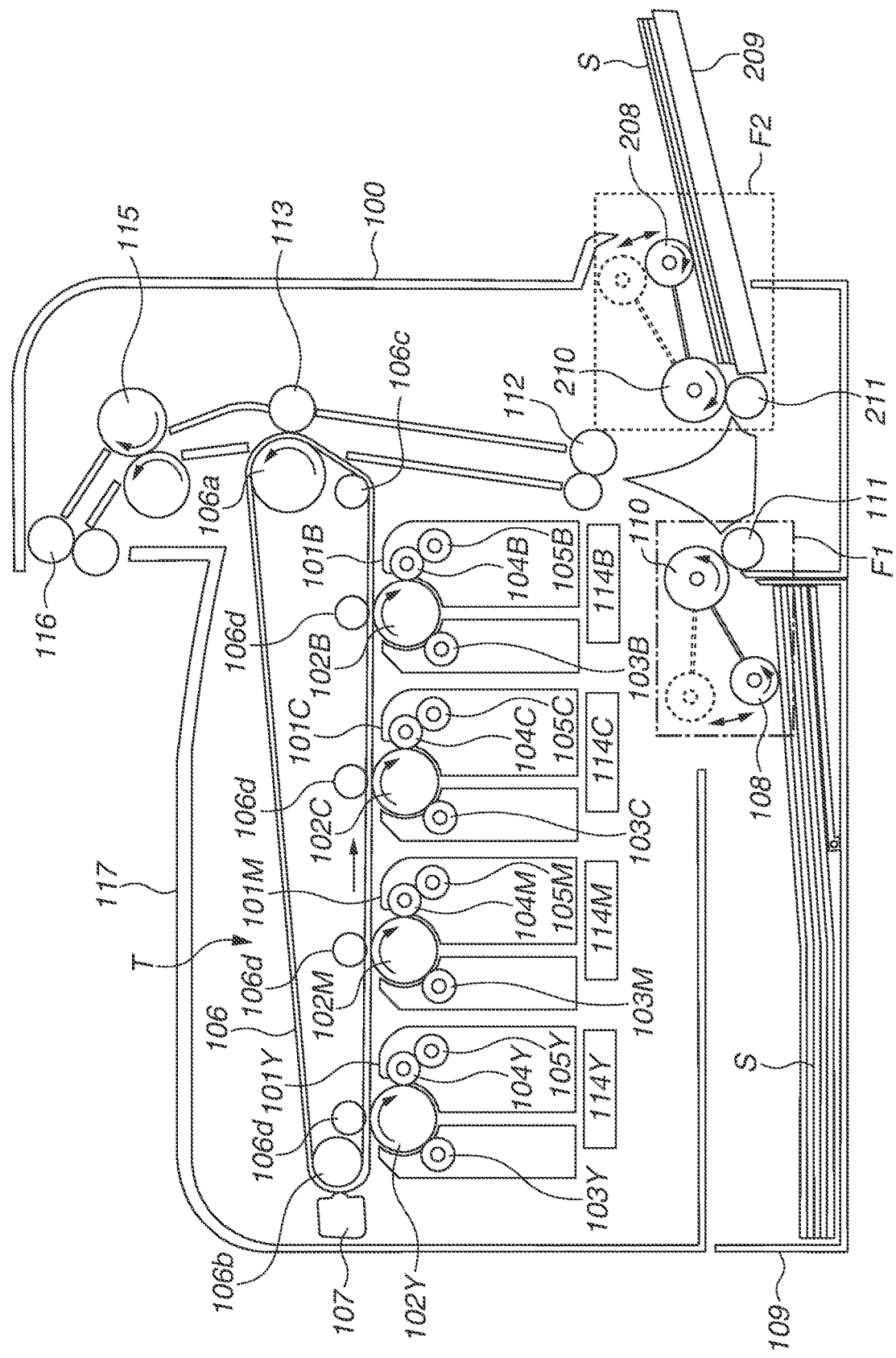
FIG. 33 is a schematic sectional view of an image forming apparatus including the first feeding portion and the second feeding portion.

First, an outline configuration of the image forming apparatus and a serial image forming operation thereof are described with reference to FIG. 33. FIG. 33 is a schematic sectional view illustrating the overall configuration of a full-color laser beam printer (hereinafter referred to as an "image forming apparatus 100") including image forming units which respectively form toner images for four colors (yellow (Y), magenta (M), cyan (C), and black (B)).

As illustrated in FIG. 33, the image forming apparatus 100 includes four cartridges 101 (101Y, 101M, 101C, and 101B) arranged side by side in the horizontal direction. The cartridges 101 respectively include photosensitive drums 102 (102Y, 102M, 102C, and 102B), charging rollers 103 (103Y, 103M, 103C, and 103B), and developing rollers 104 (104Y, 104M, 104C, and 104B) in an integrated manner. The charging roller 103 is provided near the photosensitive drum 102 to homogeneously charge the surface of the photosensitive drum 102. The developing roller 104 is provided near the photosensitive drum 102 to cause toner to adhere to the photosensitive drum 102, thus performing development to form a toner image. Moreover, predetermined color toner (not illustrated) is stored within the cartridge 101. The toner stored within the cartridge 101 is supplied to the surface of the developing roller 104 by rotation of each of supply rollers 105 (105Y, 105M, 105C, and 105B).

A belt 106, which is in the form of an endless belt, is hung and wound on a drive roller 106a, a driven roller 106b, and a tension roller 106c, and is an image bearing member serving as an intermediate transfer member capable of bearing a toner image on the surface thereof. Moreover, the belt 106 is rotationally driven by the drive roller 106a rotating counterclockwise, so that the surface of the belt 106 is moved.

In the vicinity of the belt 106, four primary transfer rollers 106d, which transfer toner images formed on the surfaces of the photosensitive drums 102 to the belt 106, are arranged at positions opposite to the respective photosensitive drums 102. Moreover, in the vicinity of the belt 106, a cleaning device 107, which removes transfer-residual toner remaining on the surface of the belt 106, is arranged.

The belt 106, the drive roller 106a, the driven roller 106b, the tension roller 106c, the four primary transfer rollers 106d, and the cleaning device 107 are configured as an intermediate transfer unit T, which is attachable to and detachable from the image forming apparatus 100.

An image forming operation to be performed on a recording material S is described. The image forming apparatus 100 includes a first feeding portion F1, which feeds recording materials S stored in a cassette 109 one by one toward a registration roller 112. The first feeding portion F1 includes a pick roller 108, a feed roller 110, and a separation roller 111. In the first feeding portion F1, the pick roller 108 is caused to descend from a position at which the pick roller 108 retreats from the recording materials S stored in the cassette 109, come into contact with a recording material S, and then rotate counterclockwise, thus feeding the recording material S to the feed roller 110 and the separation roller 111. The recording material S brought out by the pick roller 108 is separated one by one by the separation roller 111, and is then conveyed to the registration roller 112 by the feed roller 110.

The recording material S is conveyed by the registration roller 112 to a secondary transfer roller 113, which is able to come into contact with and separate from the surface of the belt 106, in synchronization with a forming operation for forming a toner image on the surface of the belt 106.

On the other hand, in synchronization with an operation in which the recording material S is fed, the photosensitive drum 102 is caused to rotate clockwise in such a way as to allow the surface thereof to be homogenously charged by the charging roller 103. Additionally, the photosensitive drum 102 is caused to rotate clockwise in such a way as to be exposed by laser scanners 114 (114Y, 114M, 114C, and 114B), which radiate light corresponding to an image signal, so that an electrostatic latent image is formed on the surface of the photosensitive drum 102.

The electrostatic latent image formed on the surface of the photosensitive drum 102 is made visible as a toner image by the developing roller 104. The photosensitive drum 102 is in contact with the belt 106, so that the toner image on the surface of the photosensitive drum 102 is sequentially multiply transferred (primarily transferred) to the belt 106 by the primary transfer roller 106d.

After that, toner images multiply developed on the belt 106 are moved to a space between the drive roller 106a and the secondary transfer roller 113 together with the belt 106, and are then collectively transferred (secondarily transferred) onto the recording material S by the secondary transfer roller 113. The toner images transferred to the recording material S are conveyed to a fixing roller pair 115, which is a toner fixing unit, and are heated, pressed, and then fixed to the recording material S when passing through a nip portion of the fixing roller pair 115. Then, the recording material S is discharged, with the toner image surface thereof facing down, to a discharge tray 117, which is an upper portion of the image forming apparatus 100, via a discharge roller pair 116, so that the image forming operation ends.

[First Feeding Portion F1]

Figure 1:
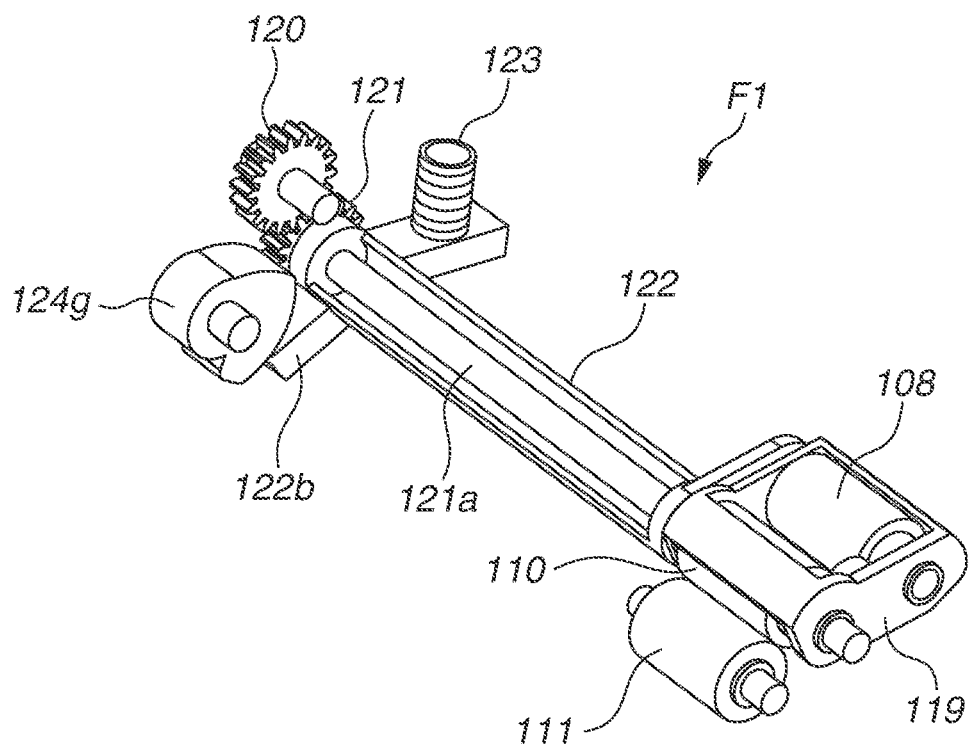
FIG. 1 is a perspective view of a first feeding portion.
Figure 2:
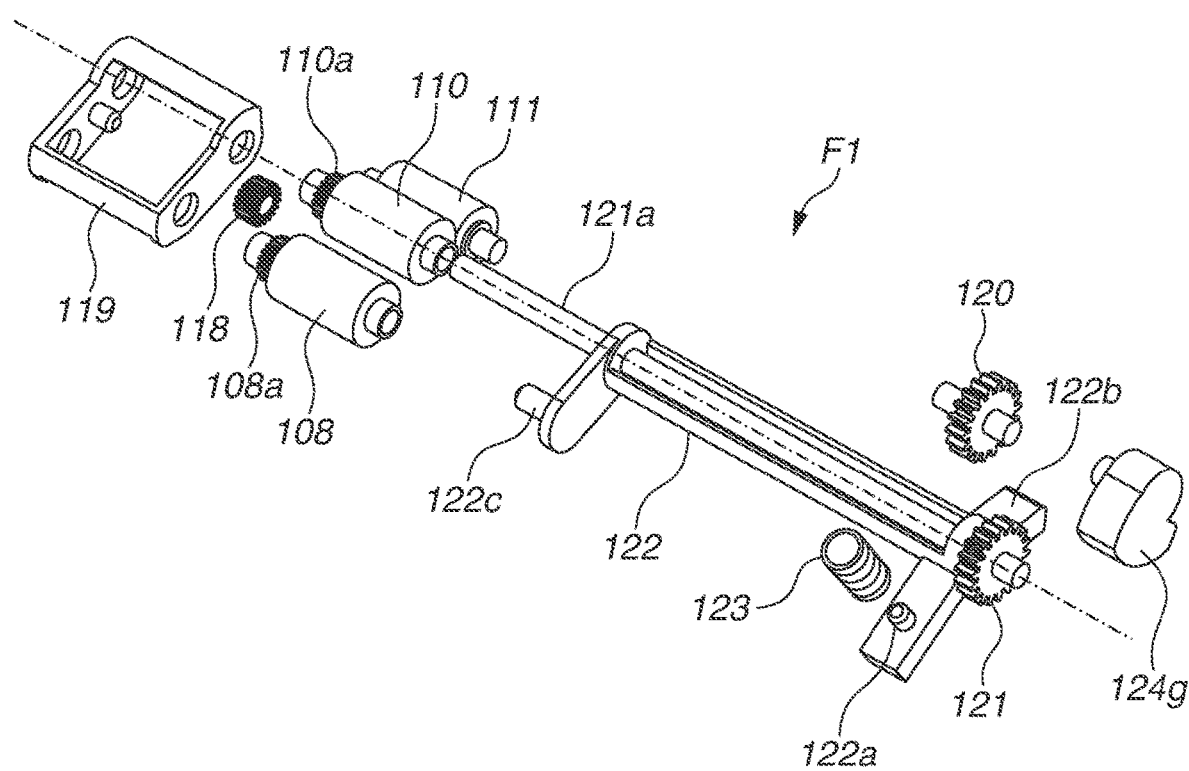
FIG. 2 is a perspective view of the first feeding portion before being assembled.
Figure 3A:
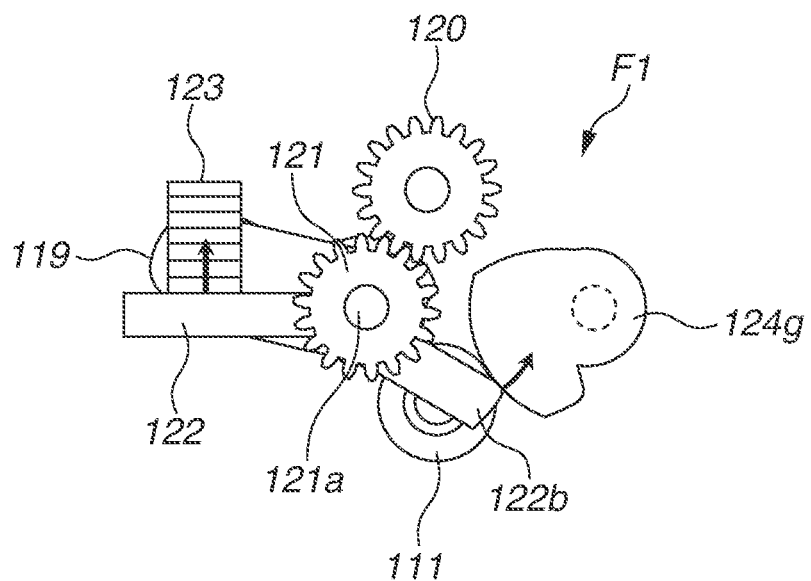
FIGS. 3A and 3B are operation explanatory diagrams of the first feeding portion.
Figure 3B:
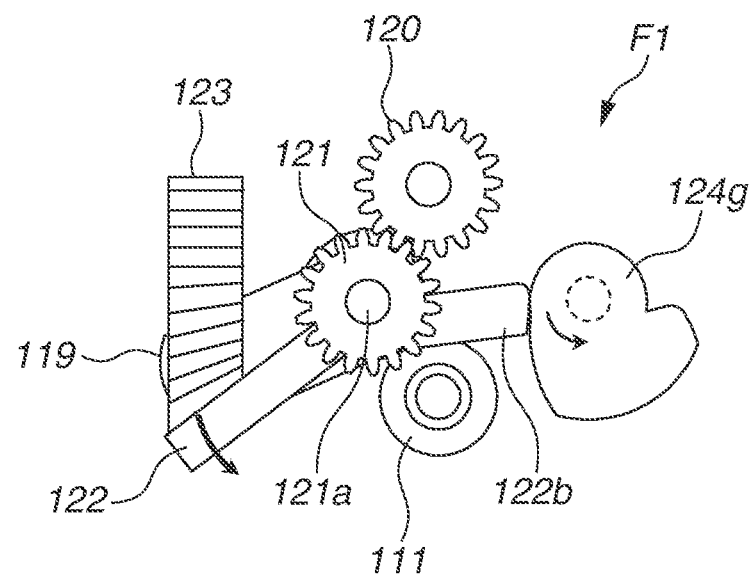

Next, the first feeding portion F1 is described with reference to FIG. 1 to FIGS. 3A and 3B. FIG. 1 is a perspective view of the first feeding portion F1, and FIG. 2 is a perspective view of the first feeding portion F1 before being assembled. FIGS. 3A and 3B are operation explanatory diagrams of the first feeding portion F1, in which FIG. 3A illustrates a pick roller ascended position and FIG. 3B illustrates a pick roller descended position. Here, the pick roller ascended position is a retreating position where the pick roller 108 has retreated from the cassette 109 (a position indicated by a dashed line illustrated in FIG. 33). Moreover, the pick roller descended position is a feeding position where the pick roller 108 is in contact with the uppermost recording material out of recording materials stored in the cassette 109 (a position indicated by a solid line illustrated in FIG. 33).

As illustrated in FIG. 1 and FIG. 2, the first feeding portion F1 includes the pick roller 108, the feed roller 110, and the separation roller 111.

In the first feeding portion F1, the pick roller 108, which has a gear portion 108a, the feed roller 110, which has a gear portion 110a, and a roller idler gear 118 are rotatably stored in a roller holder 119 in such a manner that those gears mesh with each other. In the vicinity of the feed roller 110, the separation roller 111 is rotatably arranged. An idler gear 120 meshes with a roller drive gear 121 and the feed roller 110 is coupled to a shaft 121a of the roller drive gear 121, so that, in response to the idler gear 120 rotating, the feed roller 110 and the pick roller 108 rotate.

A pick arm 122 includes a boss 122a, in which the other end of a pick spring 123 having one end thereof fixed is stored, a follower portion 122b (contact portion), which operates by coming into contact with a pick cam 124g rotating, and an engagement portion 122c, which engages with the roller holder 119. The roller holder 119 and the pick arm 122 are held in a swingable manner on the shaft 121a of the roller drive gear 121. When the pick arm 122 swings around the shaft 121a by rotation of the pick cam 124g, the roller holder 119 also swings in conjunction with the pick arm 122.

As illustrated in FIGS. 3A and 3B, the pick spring 123, which is a second elastic member, applies urging force to the follower portion 122b of the pick arm 122, which is a follower member. Accordingly, the pick spring 123 urges the roller holder 119 downward in FIGS. 3A and 3B (counterclockwise around the shaft 121a) via the follower portion 122b. The follower portion 122b, which is a follower member, is in contact with the pick cam 124g, which is a second cam member, and operates in a direction to release or charge elastic force of the pick spring 123 by rotation of the pick cam 124g.

FIG. 3A illustrates a state in which the follower portion 122b of the pick arm 122 is swung clockwise around the shaft 121a against the urging force of the pick spring 123 by rotation of the pick cam 124g and, thus, the pick arm 122 is charging the elastic force of the pick spring 123. This state is a state in which the follower portion 122b of the pick arm 122 is compressing the pick spring 123, and the roller holder 119 is in an ascended position (retreating position) where the pick roller 108 has retreated from the cassette 109 in FIG. 33.

Moreover, FIG. 3B illustrates a state in which the pick cam 124g is rotated, the follower portion 122b of the pick arm 122 is swung counterclockwise around the shaft 121a by the urging force of the pick spring 123, and the pick arm 122 is releasing the elastic force of the pick spring 123. This state is a state in which the follower portion 122b of the pick arm 122 is expanding the pick spring 123. Moreover, in this state, the roller holder 119 is in a descended position (feeding position) where the pick roller 108 is brought into contact with the recording material S in FIG. 33 by the urging force of the pick spring 123, which is a predetermined feeding pressure.

In this way, in response to the pick arm 122 swinging by rotation of the pick cam 124g, the roller holder 119 swings to cause the pick roller 108 to perform ascending and descending operations.

[First Clutch CL1]

Next, a configuration of a first clutch CL1, which is provided in a drive train for transmitting a driving force coming from a drive source to the pick roller 108 and the pick cam 124g each serving as a driven member and serves as a driving force transmission device for transmitting or blocking the driving force, is described with reference to FIGS. 4A and 4B, FIG. 5, and FIGS. 6A and 6B.

Figure 4A:
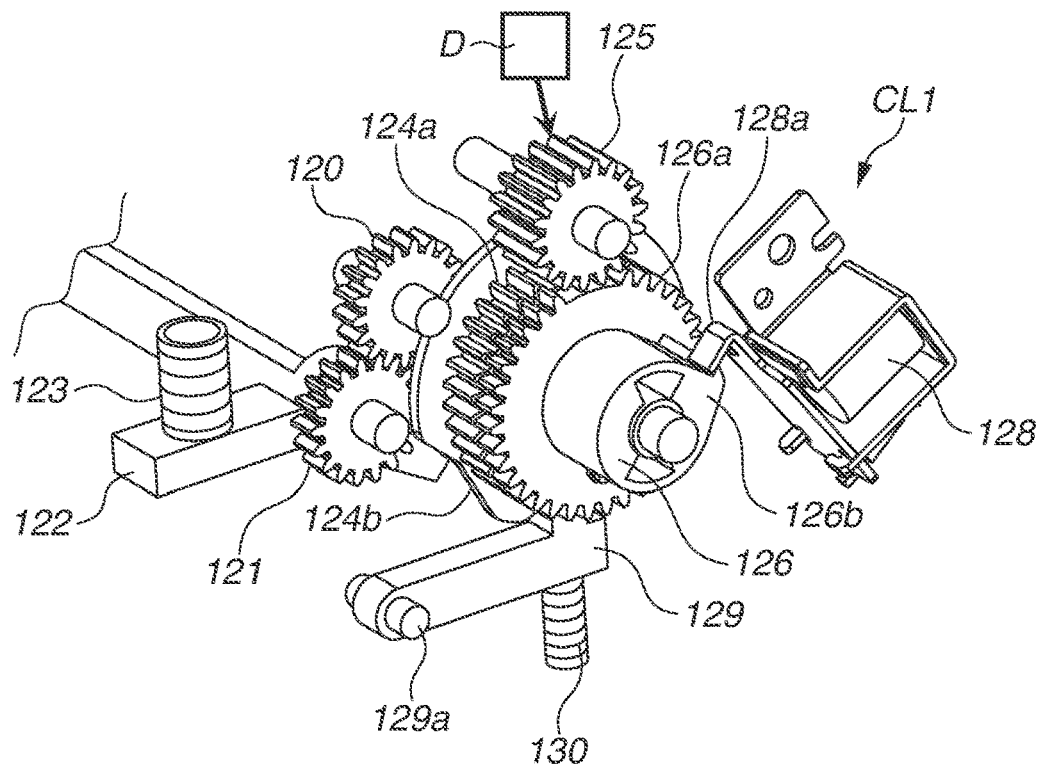
FIGS. 4A and 4B are perspective views of a first clutch.
Figure 4B:
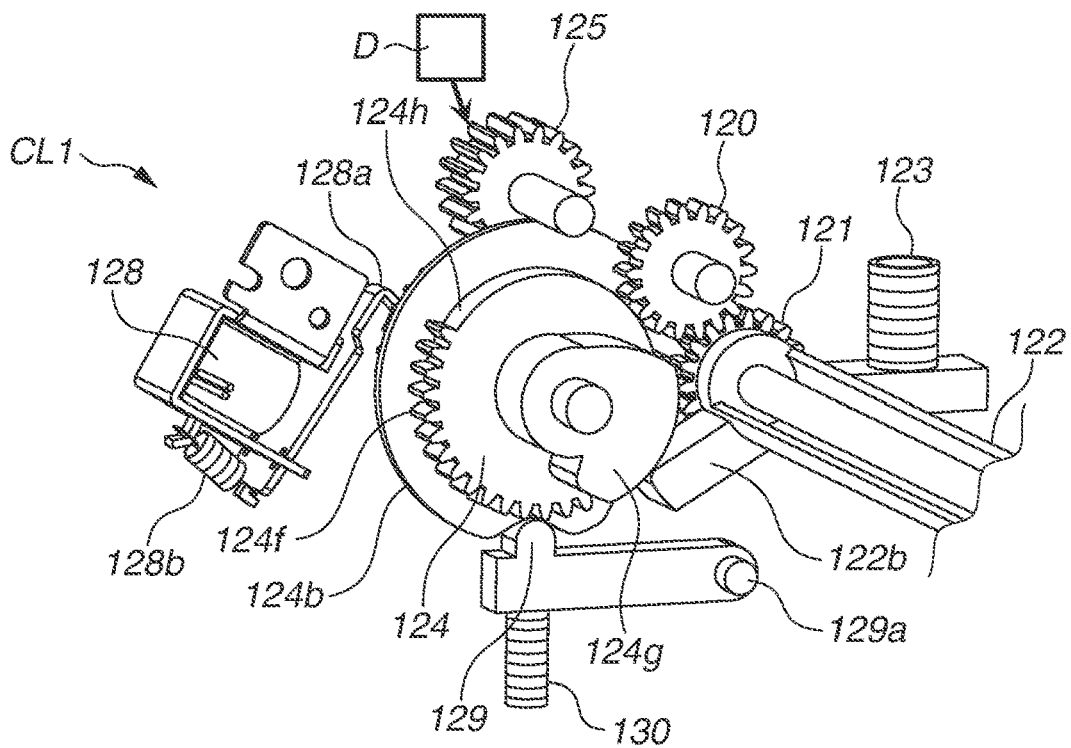
Figure 5:
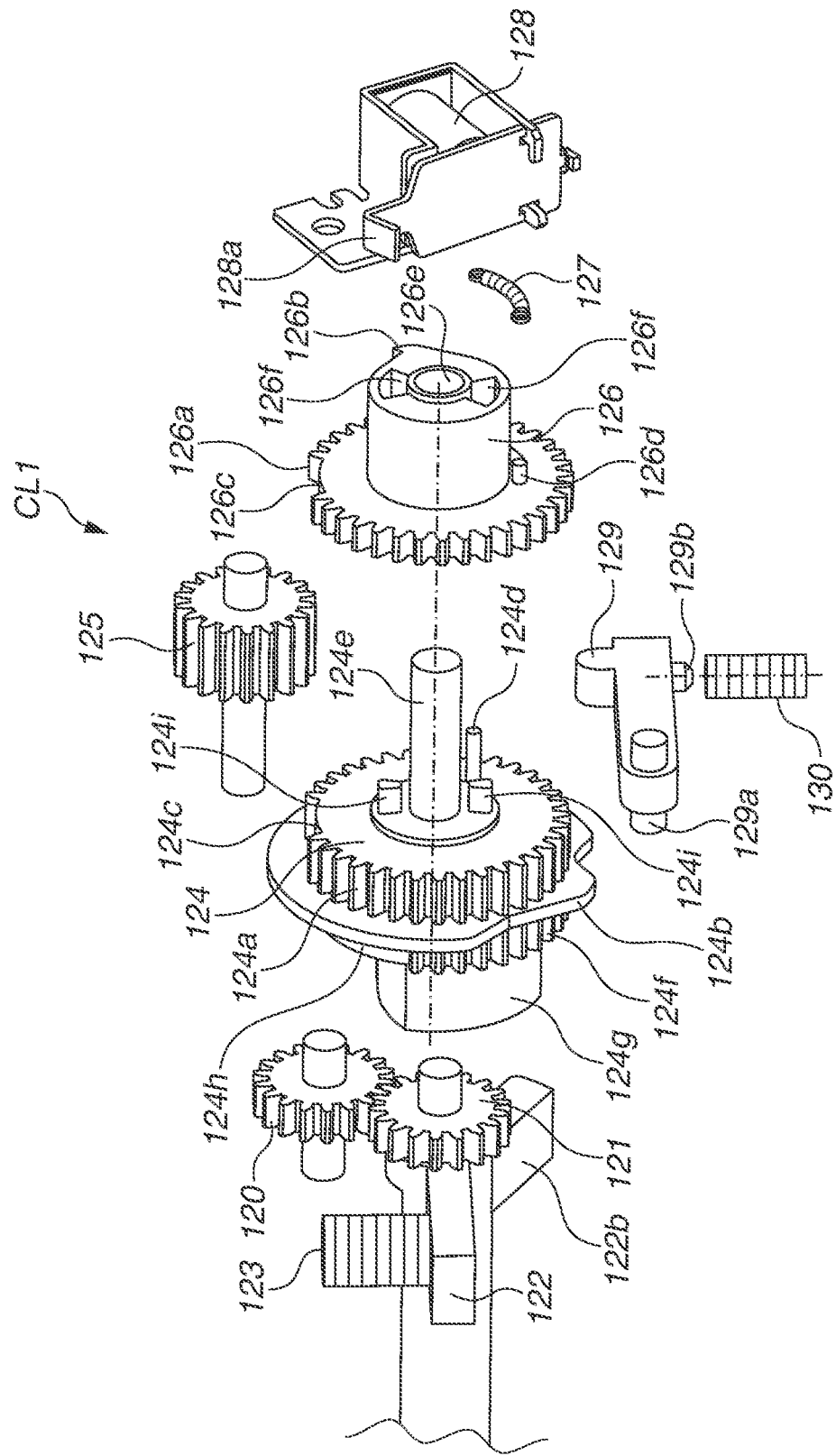
FIG. 5 is a perspective view of the first clutch before being assembled.
Figure 6A:
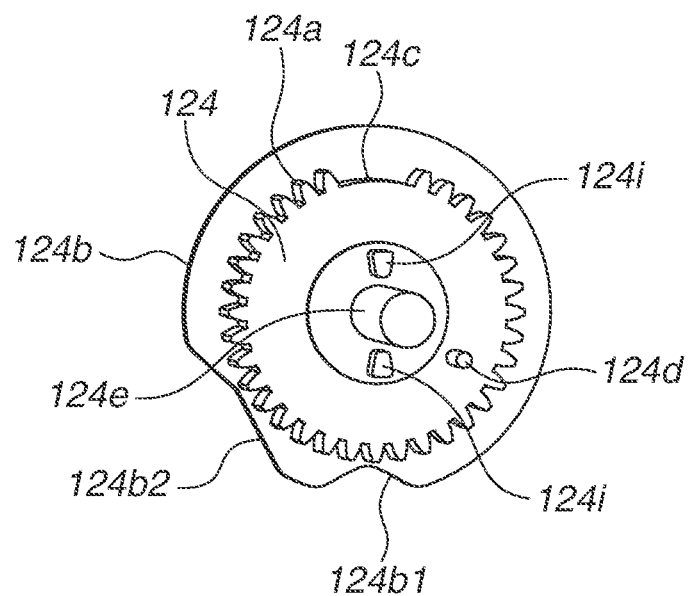
FIGS. 6A and 6B are perspective views of a driven gear in the first clutch.
Figure 6B:
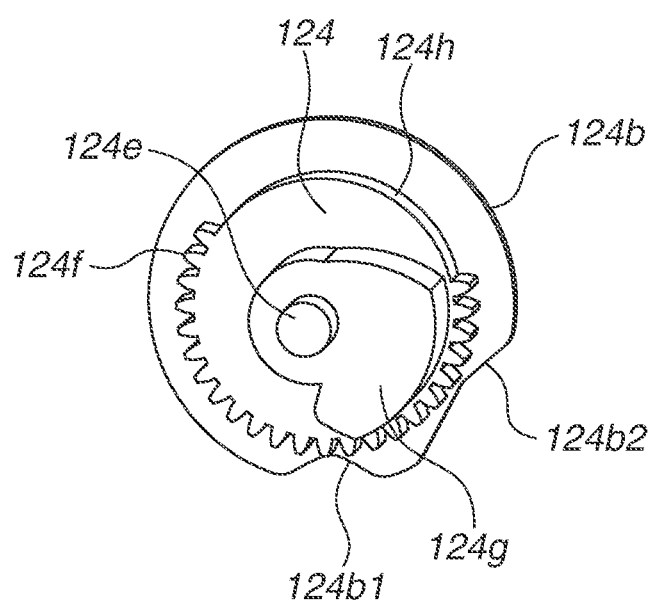

FIGS. 4A and 4B are perspective views of the first clutch CL1, in which FIG. 4A is a perspective illustration of the first clutch CL1 as viewed from one side (a side opposite to the side of the pick roller 108) in the axial direction thereof and FIG. 4B is a perspective illustration of the first clutch CL1 as viewed from the other side (the side of the pick roller 108) in the axial direction thereof. Hereinafter, one side in the axial direction of the first clutch CL1 is referred to as a "front side of the first clutch CL1", and the other side in the axial direction of the first clutch CL1 is referred to as a "back side of the first clutch CL1". FIG. 5 is a perspective view of the first clutch CL1 before being assembled. FIGS. 6A and 6B are perspective views of a driven gear 124 of the first clutch CL1.

As illustrated in FIGS. 4A and 4B, FIG. 5, and FIGS. 6A and 6B, the first clutch CL1 includes a drive gear 125, which is always coupled to a drive source D to rotate, a driven gear 124 and a trigger gear 126, each of which is able to mesh with the drive gear 125, and a trigger spring 127. Additionally, the first clutch CL1 includes an idler gear 120, which is able to mesh with the driven gear 124, on the drive downstream side of the driven gear 124, and the idler gear 120 is in mesh with the roller drive gear 121 of the first feeding portion F1 illustrated in FIG. 1. Moreover, the first clutch CL1 includes a solenoid 128, which is a regulation unit for regulating the rotation of the trigger gear 126, and a home spring 130, which is a first elastic member for applying urging force to a lever member 129. The home spring 130, which is the first elastic member, applies urging force to the lever member 129 to bring the lever member 129 into contact with the outer circumferential surface of a home cam 124b of the driven gear 124, which is described below.

Additionally, the first clutch CL1 includes the home cam 124b serving as a first cam member and the pick cam 124g serving as a second cam member, each of which rotates in conjunction with the rotation of the driven gear 124. Although described below, in the first exemplary embodiment, the home cam 124b and the pick cam 124g are configured integrally with the driven gear 124 and rotate together with the driven gear 124.

A driving force coming from the drive source D is transmitted to the roller drive gear 121 via the drive gear 125, the driven gear 124, and the idler gear 120 of the first clutch CL1 to rotate the pick roller 108 and the feed roller 110 illustrated in FIG. 1.

The trigger gear 126 includes a gear portion 126a, which meshes with the drive gear 125, a locking portion 126b, the rotation of which is restricted by being locked by a locking claw 128a of the solenoid 128, and a partially toothless gear portion 126c, which does not mesh with the drive gear 125. The trigger gear 126 integrally includes a boss 126d, at which the trigger spring 127 is arranged. The gear portion 126a has a plurality of teeth meshing with the teeth of the drive gear 125 and has a number-of-teeth diameter corresponding to 36 teeth. The partially toothless gear portion 126c is provided at a part of the gear portion 126a, is a region having no teeth meshing with the teeth of the drive gear 125, and is in the form of a partially toothless gear corresponding to three teeth of the gear portion 126a.

The driven gear 124 includes a gear portion 124a, which meshes with the drive gear 125, a home cam 124b serving as a first cam member, with which the lever member 129 comes into contact to apply urging force of the home spring 130 to the driven gear 124, and a partially toothless gear portion 124c, which does not mesh with the drive gear 125. The gear portion 124a has a plurality of teeth meshing with the teeth of the drive gear 125 and has a number-of-teeth diameter corresponding to 36 teeth. The partially toothless gear portion 124c is provided at a part of the gear portion 124a, is a region having no teeth meshing with the teeth of the drive gear 125, and is in the form of a partially toothless gear corresponding to three teeth of the gear portion 124a. Additionally, the driven gear 124 includes a boss 124d, at which the trigger spring 127 is arranged, and a rotation shaft portion 124e.

Additionally, the driven gear 124 includes a gear portion 124f, which meshes with the idler gear 120, a pick cam 124g serving as a second cam member, with which the follower portion 122b of the pick arm 122 comes into contact, and a partially toothless gear portion 124h, which does not mesh with the idler gear 120. The gear portion 124f has a plurality of teeth meshing with the teeth of the idler gear 120 and has a number-of-teeth diameter corresponding to 36 teeth. The partially toothless gear portion 124h is provided at a part of the gear portion 124f, is a region having no teeth meshing with the teeth of the idler gear 120, and is in the form of a partially toothless gear corresponding to 13 teeth of the gear portion 126a.

Moreover, as illustrated in FIGS. 6A and 6B, in the home cam 124b of the driven gear 124, a home cam surface 124b1 and a cancel cam surface 124b2 are provided at respective predetermined rotational phases. The home cam 124b has an arc surface (outer circumferential surface) which is a cam surface the line segment from the rotation center to the outer circumferential surface (hereinafter referred to as a "cam radius") of which is uniform, and the home cam surface 124b1 and the cancel cam surface 124b2 are provided at a part of the cam surface of the home cam 124b. Each of the home cam surface 124b1 and the cancel cam surface 124b2 is provided in a concave shape from the cam surface (arc surface) the cam radius of which in the home cam 124b is uniform toward the rotation center. Accordingly, each of the home cam surface 124b1 and the cancel cam surface 124b2 has a surface the cam radius of which becomes smaller on the upstream side in the rotational direction and has a surface the cam radius of which becomes larger on the downstream side in the rotational direction.

In this way, in the driven gear 124, the gear portion 124a, which meshes with the drive gear 125, the home cam 124b, the gear portion 124f, which meshes with the idler gear 120, and the pick cam 124g are configured in an integral manner, and those are caused to rotate in synchronization with each other by the driving force of the drive gear 125.

The solenoid 128 includes the locking claw 128a and a return spring 128b. The return spring 128b urges the locking claw 128a in a direction to move toward the trigger gear 126. When the solenoid 128 is not in the state of being energized and the locking portion 126b is situated at a position facing the locking claw 128a, the locking claw 128a locks the locking portion 126b to restrict rotation of the trigger gear 126. When the solenoid 128 is energized, the locking claw 128a retreats from the trigger gear 126 against the urging force of the return spring 128b, and, in a case where the locking portion 126b has been locked by the locking claw 128a until then, locking of the locking portion 126b of the trigger gear 126 by the locking claw 128a is canceled.

The trigger spring 127 has one end fixed to the bass 126d of the trigger gear 126 and the other end fixed to the boss 124d of the driven gear 124, which is inserted into a through-hole provided in the trigger gear 126, and effects urging in such a way as to rotate the locking portion 126b of the trigger gear 126 toward the locking claw 128a with respect to the driven gear 124. With this urging, when, upon energization of the solenoid 128, the locking claw 128a cancels locking of the locking portion 126b, the trigger spring 127 applies rotation-starting force to the trigger gear 126, so that the gear portion 126a of the trigger gear 126 and the drive gear 125 mesh with each other.

The lever member 129 includes a swinging shaft 129a and a boss 129b, in which the other end of the home spring 130 one end of which is fixed is stored, and swings around the swinging shaft 129a serving as a rotational center while being in contact with the home cam 124b of the driven gear 124.

Furthermore, although described below, when the driven gear 124 is at a predetermined rotational phase, the lever member 129 effects urging in such a way as to press the home cam 124b by the urging force of the home spring 130. Specifically, when the driven gear 124 is at a rotational phase illustrated in FIG. 15A, the lever member 129 effects urging in such a way as to press a surface in which the cam radius of the home cam surface 124b1 becomes smaller, by the urging force of the home spring 130. With this urging, the partially toothless gear portion 124c of the driven gear 124 becomes facing the drive gear 125, so that, even when the gear portion 124a is unable to obtain a sufficient driving force from the drive gear 125, it becomes possible to rotate the driven gear 124 by such pressing force of the home spring 130.

Moreover, when the driven gear 124 is in a home position, which is a standby state in which the gear portion 124a and the drive gear 125 do not mesh with each other, the lever member 129 comes into contact with the home cam 124b in such a way as to urge the driven gear 124 toward the center of the rotation shaft portion 124e. Therefore, the driven gear 124 is restricted from rotation by the pressing force of the home spring 130.

Next, the arrangement of the trigger gear 126 and the driven gear 124 is described. As illustrated in FIG. 5, the trigger gear 126 includes a bearing portion 126e and a plurality of groove portions 126f. The bearing portion 126e is stored on the rotation shaft portion 124e of the driven gear 124. At that time, a plurality of key portions 124i included in the driven gear 124 is stored in the groove portions 126f included in the trigger gear 126. In a state in which the key portions 124i are stored in the groove portions 126f, play (backlash) is configured to be present between the key portions 124i and the groove portions 126f, so that the trigger gear 126 is able to rotate by the amount of such play around the rotation shaft portion 124e with respect to the driven gear 124. In the first exemplary embodiment, the trigger gear 126 is configured to be able to rotate by an amount corresponding to three teeth with respect to the driven gear 124.

[Operation of First Clutch CL1]

Next, a driving force transmission operation from the first clutch CL1 to the first feeding portion F1 is described with reference to FIGS. 7A and 7B to FIGS. 15A and 15B. Figures with figure numbers having a suffix "A" out of FIGS. 7A and 7B to FIGS. 15A and 15B are views of the first clutch CL1 as viewed from the front side thereof, and figures with figure numbers having a suffix "B" out of FIGS. 7A and 7B to FIGS. 15A and 15B are views of the first clutch CL1 as viewed from the back side thereof.

Figure 7A:
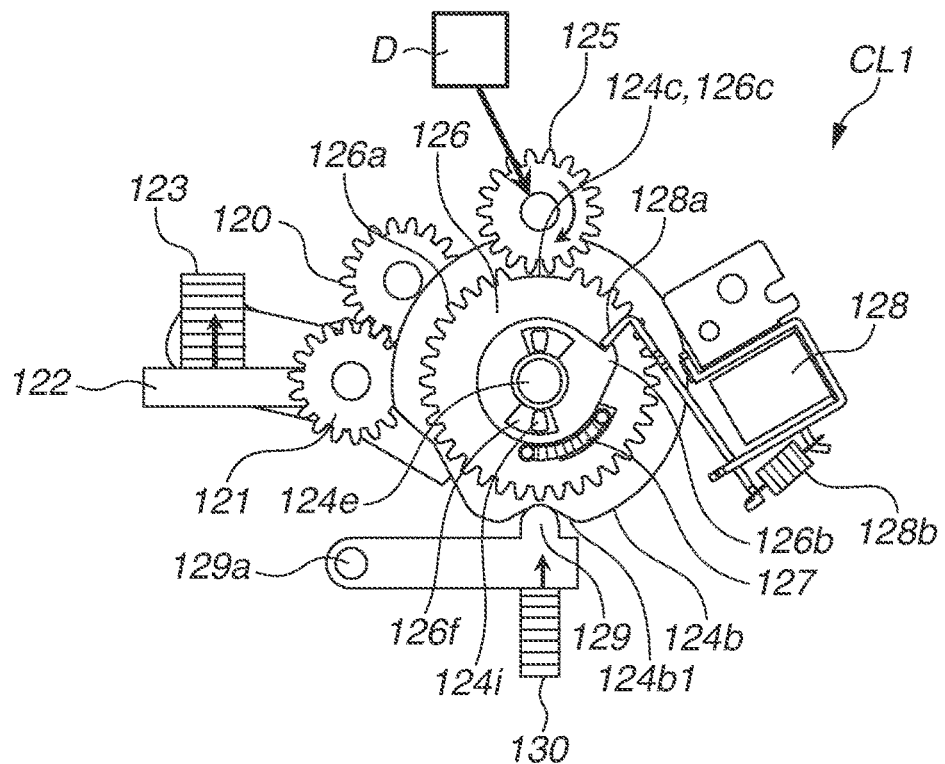
FIG. 7A is a diagram illustrating the first clutch as viewed from the front side.
Figure 7B:
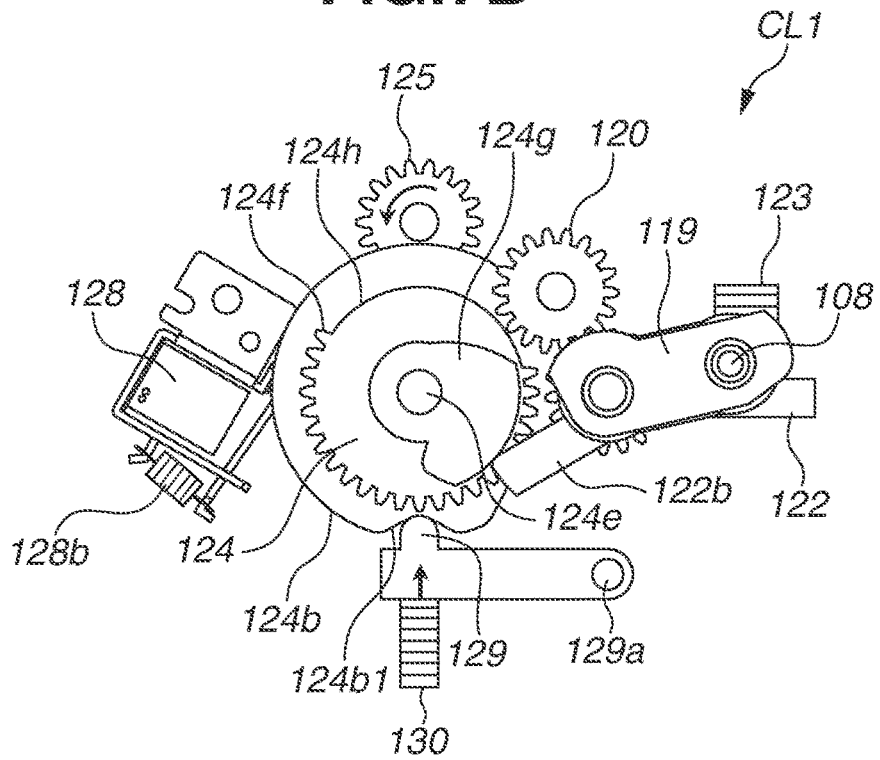
FIG. 7B is a diagram illustrating the first clutch as viewed from the back side.
Figure 8A:
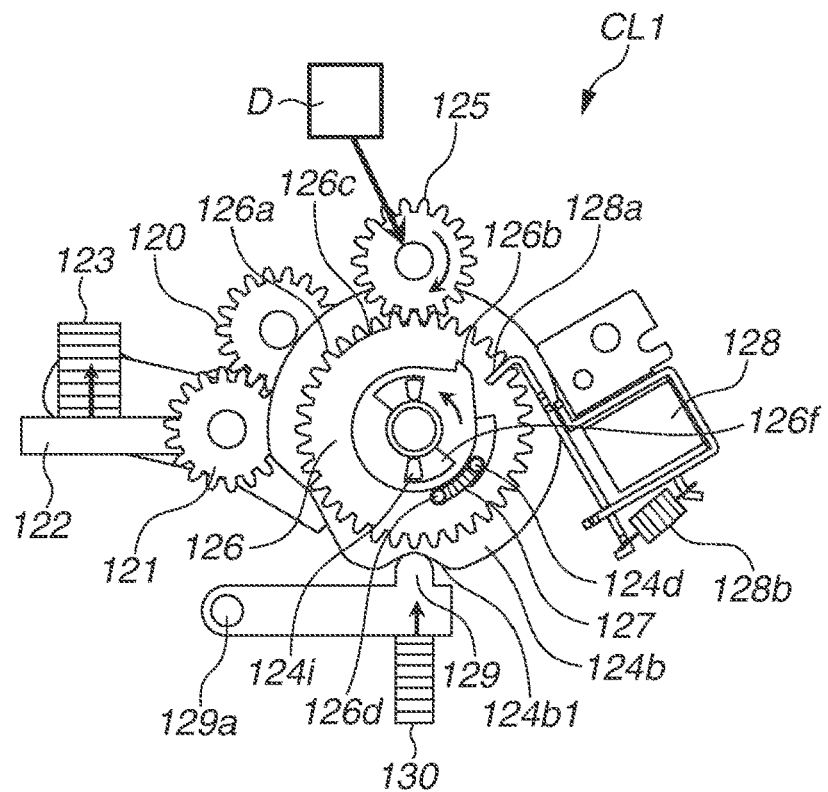
FIG. 8A is a diagram illustrating the first clutch as viewed from the front side.
Figure 8B:
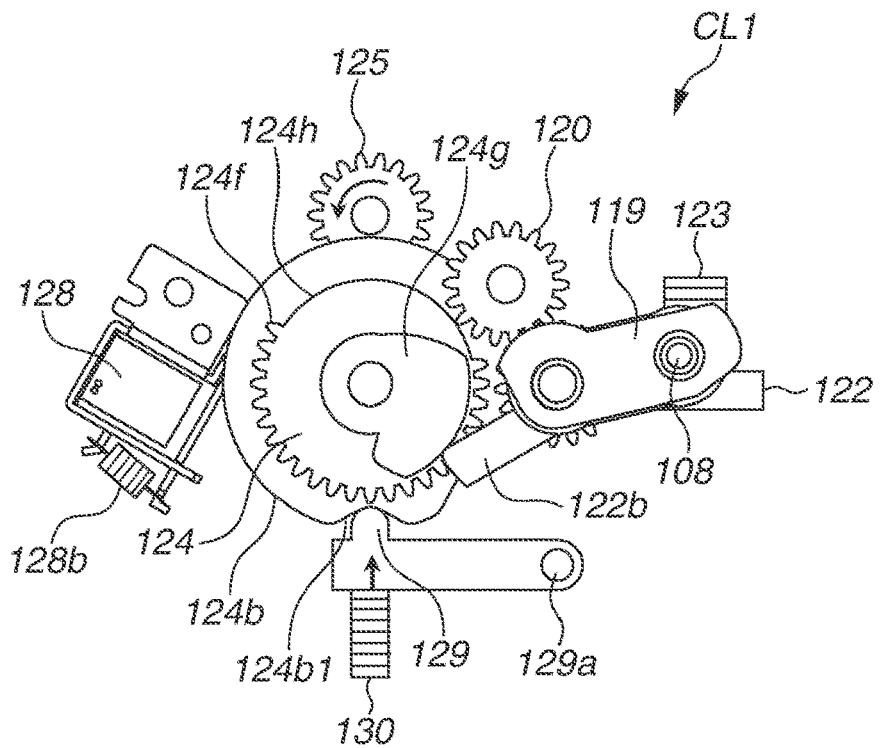
FIG. 8B is a diagram illustrating the first clutch as viewed from the back side.
Figure 9A:
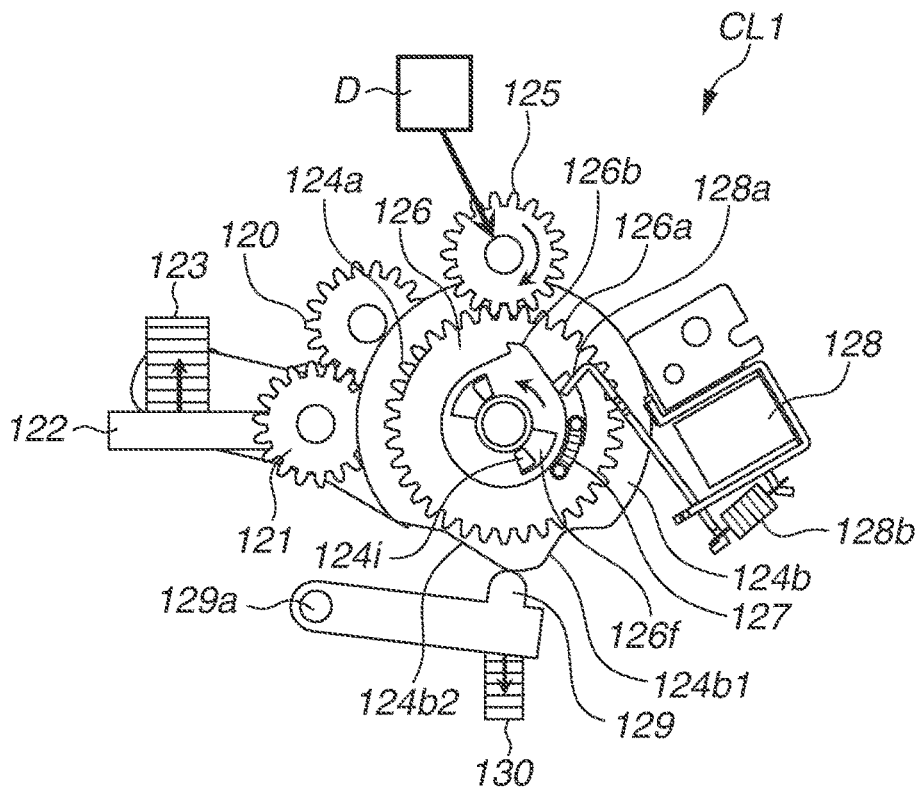
FIG. 9A is a diagram illustrating the first clutch as viewed from the front side.
Figure 9B:
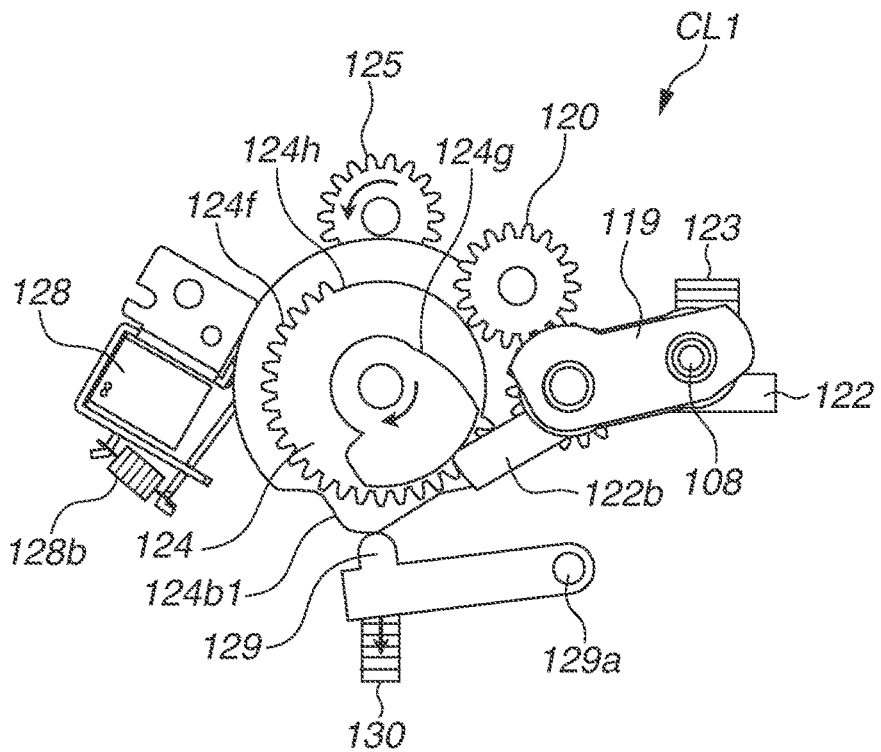
FIG. 9B is a diagram illustrating the first clutch as viewed from the back side.
Figure 10A:
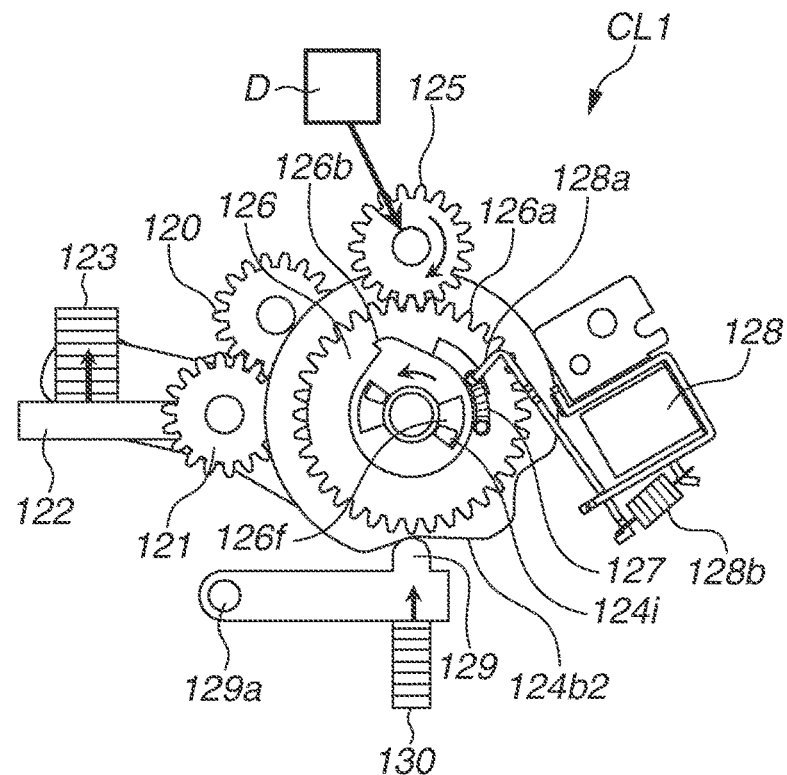
FIG. 10A is a diagram illustrating the first clutch as viewed from the front side.
Figure 10B:
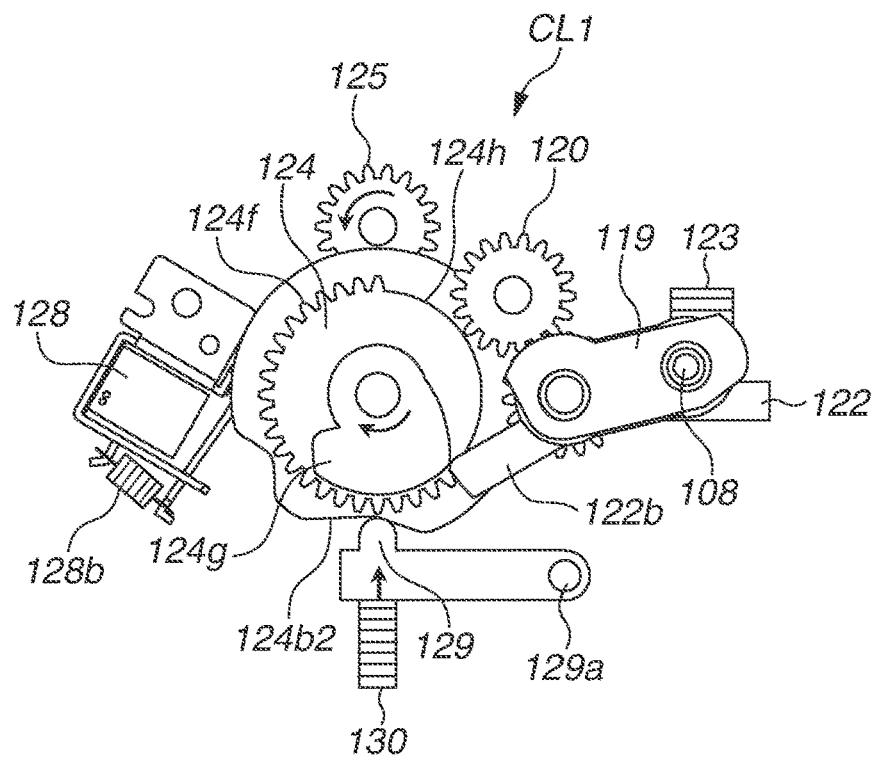
FIG. 10B is a diagram illustrating the first clutch as viewed from the back side.
Figure 11A:
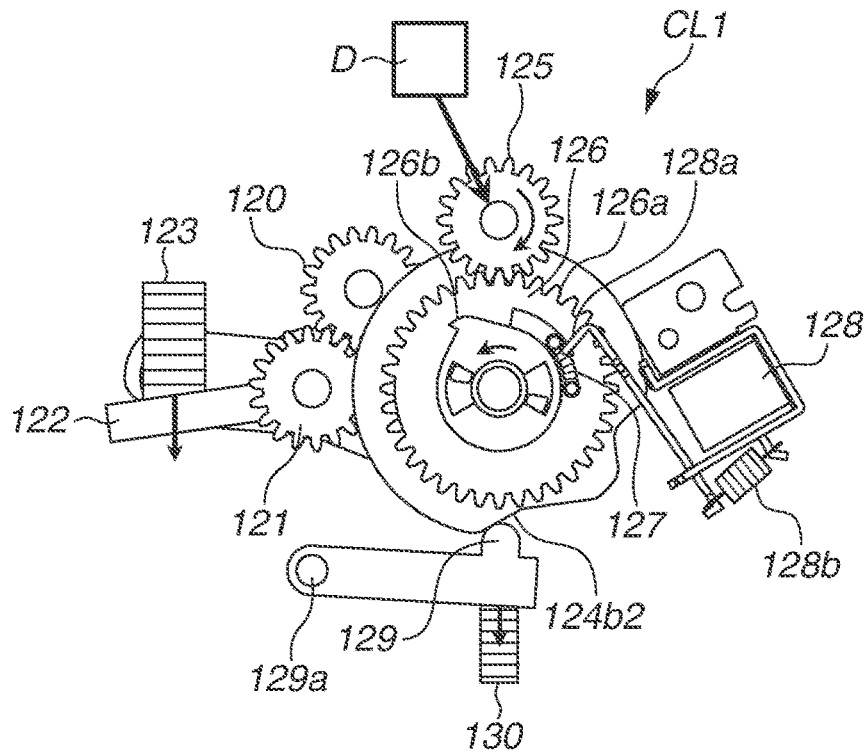
FIG. 11A is a diagram illustrating the first clutch as viewed from the front side.
Figure 11B:
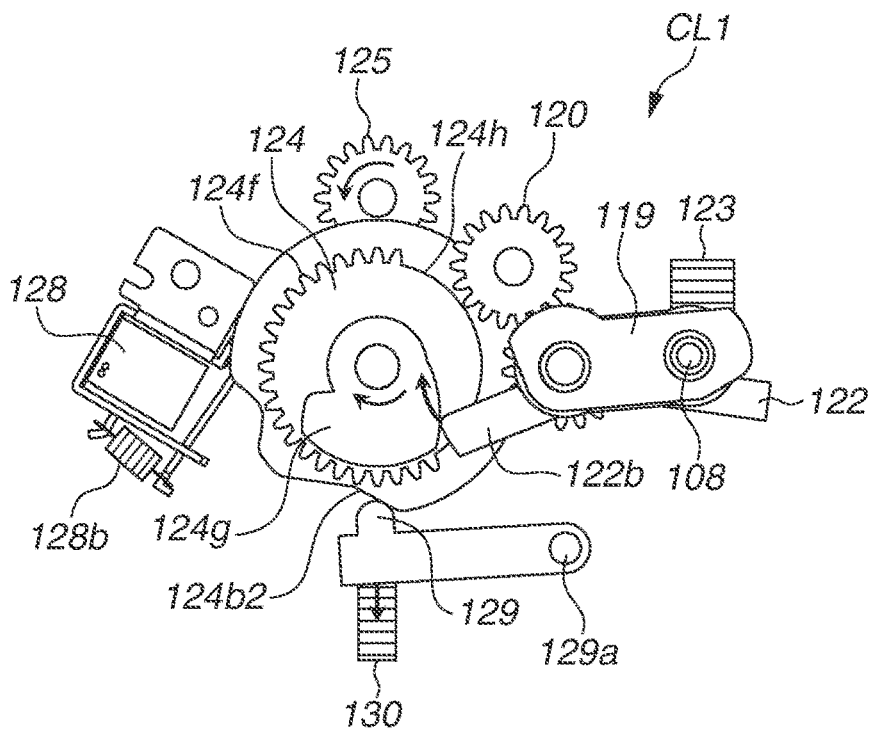
FIG. 11B is a diagram illustrating the first clutch as viewed from the back side.
Figure 12A:
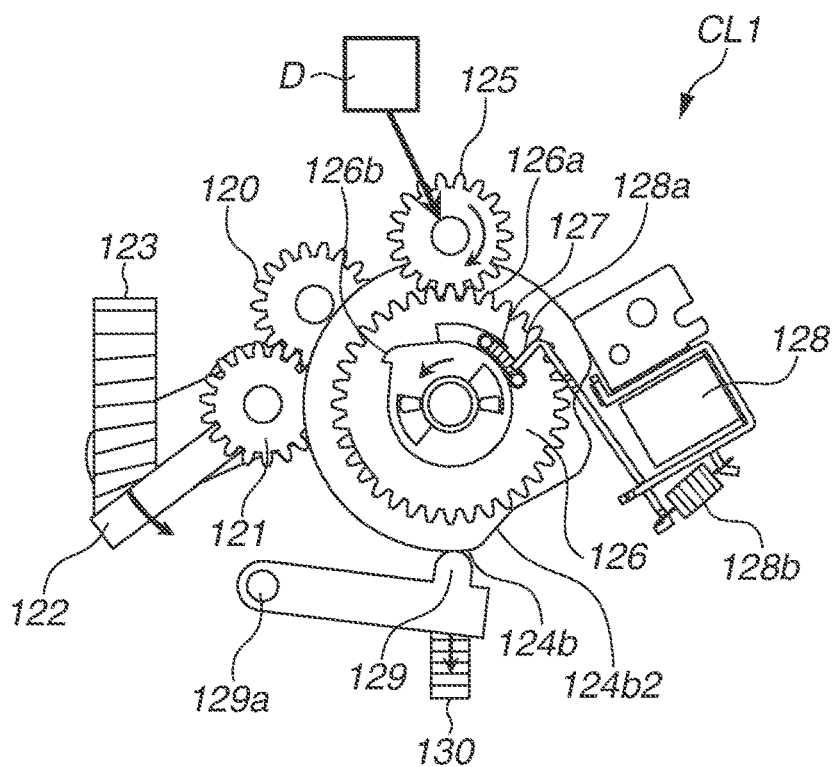
FIG. 12A is a diagram illustrating the first clutch as viewed from the front side.
Figure 12B:
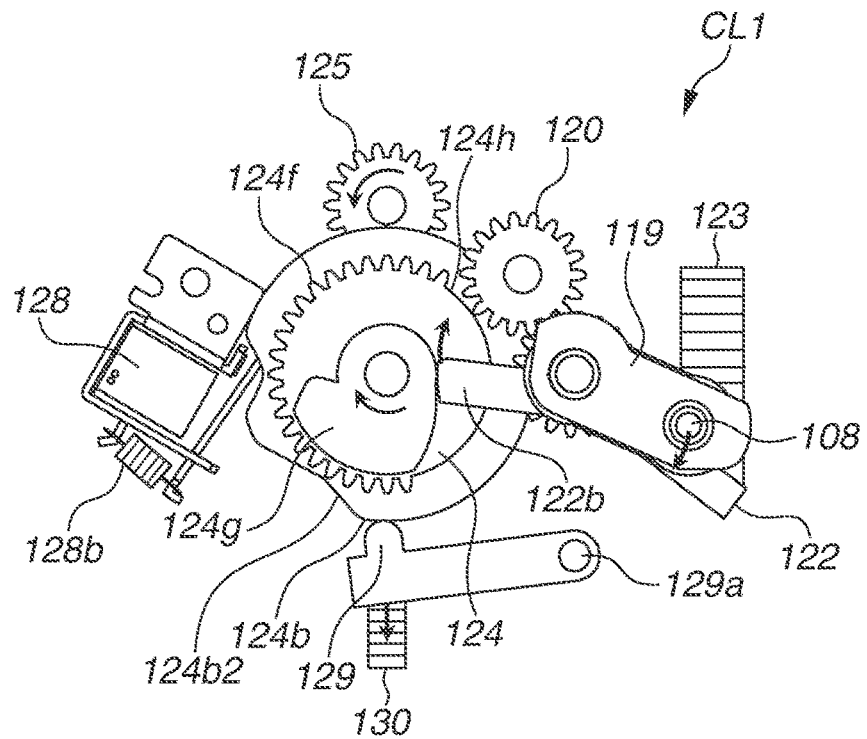
FIG. 12B is a diagram illustrating the first clutch as viewed from the back side.
Figure 13A:
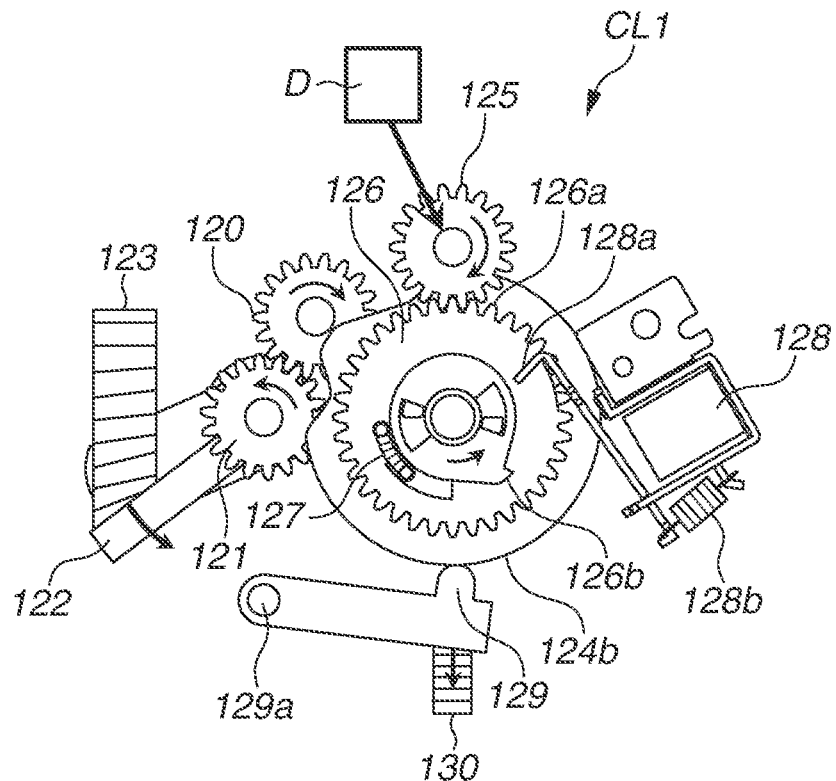
FIG. 13A is a diagram illustrating the first clutch as viewed from the front side.
Figure 13B:
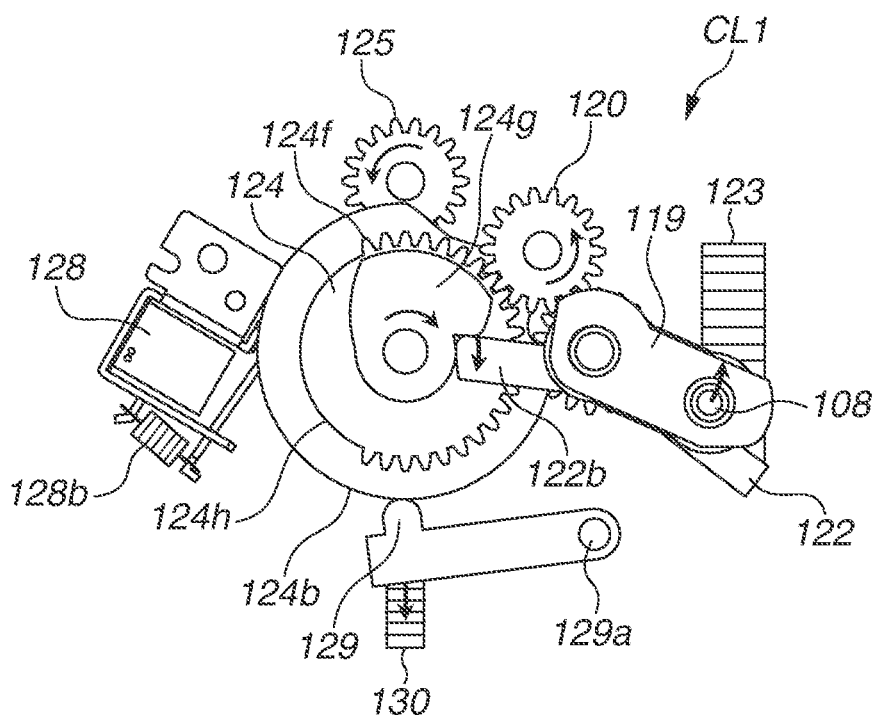
FIG. 13B is a diagram illustrating the first clutch as viewed from the back side.
Figure 14A:
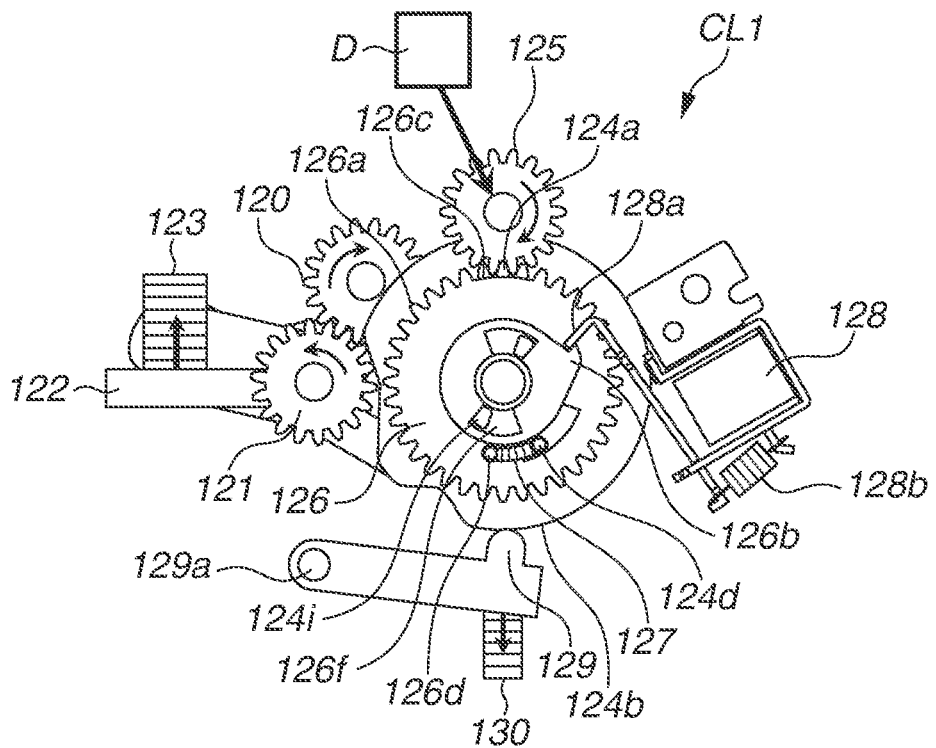
FIG. 14A is a diagram illustrating the first clutch as viewed from the front side.
Figure 14B:
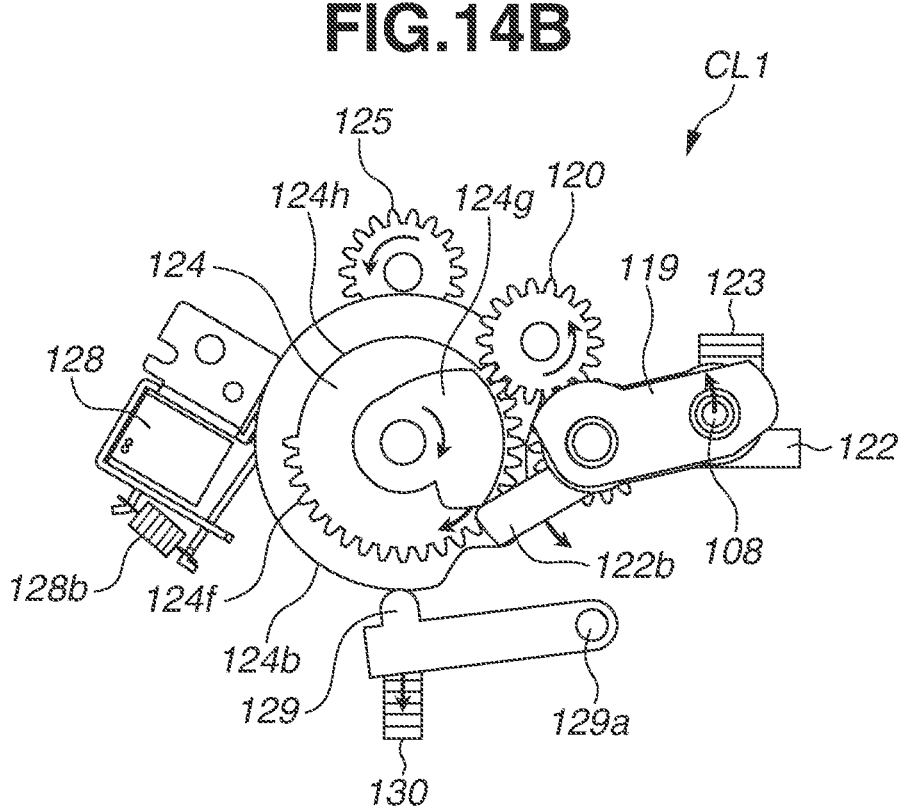
FIG. 14B is a diagram illustrating the first clutch as viewed from the back side.
Figure 15A:
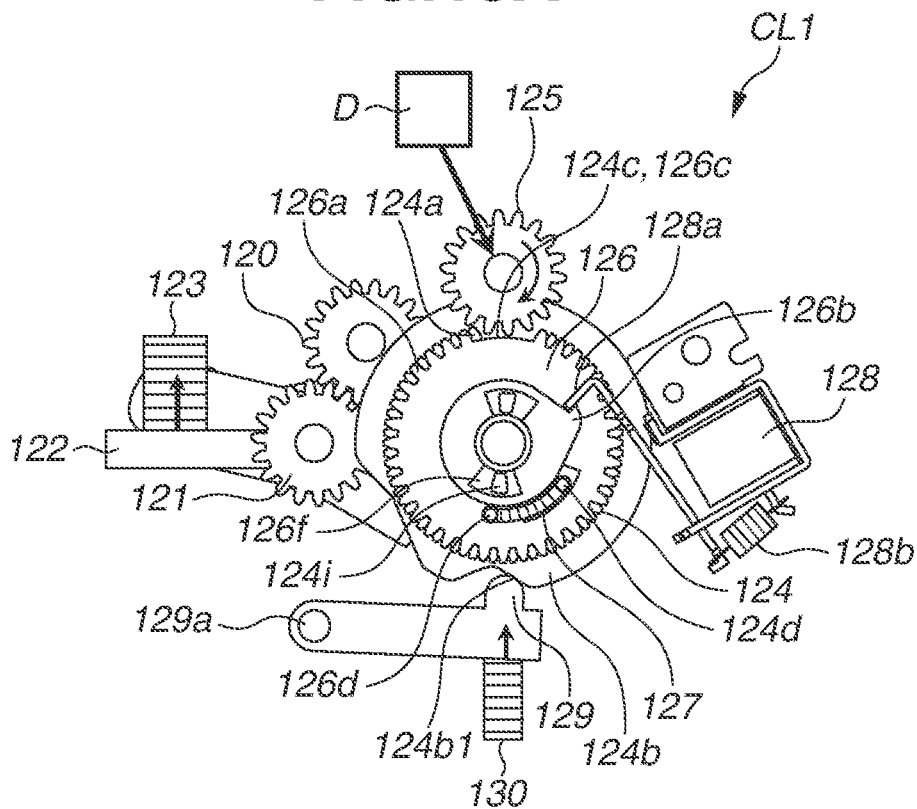
FIG. 15A is a diagram illustrating the first clutch as viewed from the front side.
Figure 15B:
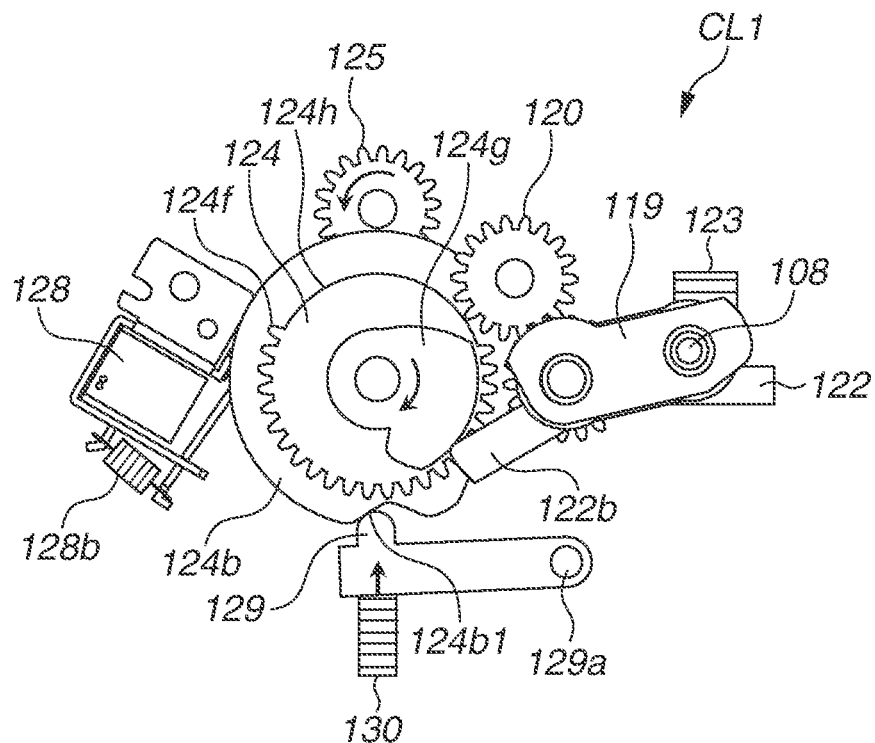
FIG. 15B is a diagram illustrating the first clutch as viewed from the back side.

FIGS. 7A and 7B illustrate a standby state of the first clutch CL1. FIGS. 8A and 8B illustrate a state of the first clutch CL1 obtained when the trigger gear 126 starts to rotate. FIGS. 9A and 9B illustrate a state of the first clutch CL1 obtained when the driven gear 124 starts to rotate. FIGS. 10A and 10B illustrate a state of the first clutch CL1 obtained when the pick cam 124g has rotated to a phase for causing the follower portion 122b of the pick arm 122 to operate. FIGS. 11A and 11B illustrate a state of the first clutch CL1 obtained when the pick arm 122 starts to swing. FIGS. 12A and 12B illustrate a state of the first clutch CL1 obtained when the pick roller 108 is in a descended position. FIGS. 13A and 13B illustrate a state of the first clutch CL1 obtained when the pick roller 108 starts ascending. FIGS. 14A and 14B illustrate a state of the first clutch CL1 obtained when the pick roller 108 ends ascending and the trigger gear 126 is in a stopped state. FIGS. 15A and 15B illustrate a state of the first clutch CL1 obtained immediately before the driven gear 124 ends rotating. Rotational directions and operational directions of the respective members illustrated in FIGS. 7A and 7B to FIGS. 15A and 15B are represented by arrows drawn near the respective members.

In the standby state of the first clutch CL1, as illustrated in FIGS. 7A and 7B, the drive gear 125 rotates, and the lever member 129 is in contact with the home cam surface 124b1 of the home cam 124b to urge the driven gear 124 toward the center of the rotation shaft portion 124e. At this time, the lever member 129 is in contact with a portion of the home cam 124b in which the cam radius is the smallest between a surface the cam radius of which becomes smaller and a surface the cam radius of which becomes larger out of the home cam surface 124b1. In this state, the driven gear 124 is held at the home position, in which the partially toothless gear portion 124c faces the drive gear 125, so that driving force is not transmitted from the drive gear 125 to the driven gear 124. Moreover, the partially toothless gear portion 124h of the driven gear 124 also faces the idler gear 120, so that the gear portion 124f of the driven gear 124 does not mesh with the idler gear 120. Moreover, in this state, there is play between the groove portions 126f of the trigger gear 126 and the key portion 124i of the driven gear 124.

Moreover, as illustrated in FIG. 7A, while the trigger gear 126 is urged in such a way as to rotate counterclockwise by the trigger spring 127, since the locking portion 126b is locked by the locking claw 128a of the solenoid 128, the trigger gear 126 is at a stop. In this state, since the partially toothless gear portion 126c of the trigger gear 126 faces the drive gear 125, driving force of the drive gear 125 is not transmitted to the trigger gear 126.

As illustrated in FIG. 7B, the follower portion 122b of the pick arm 122 is in contact with the pick cam 124g of the driven gear 124 by the urging force of the pick spring 123. In this state, as with FIG. 3A, the pick roller 108 is in the ascended position, in which the pick roller 108 has retreated from the cassette 109, illustrated in FIG. 33, and is thus in a position separating from the recording material S.

Next, to perform driving force transmission by the first clutch CL1, first, it is necessary to rotate the trigger gear 126. Therefore, as illustrated in FIG. 8A, the solenoid 128 is energized to cause the locking claw 128a to retreat from the locking portion 126b of the trigger gear 126, so that locking of the locking portion 126b by the locking claw 128a is canceled. Then, the boss 126d of the trigger gear 126 is moved in a direction to come close to the boss 124d of the driven gear 124 by the urging force of the trigger spring 127, so that the trigger gear 126 starts to rotate counterclockwise. At this time, the home cam surface 124b1 of the home cam 124b is pressed toward the center of the rotation shaft portion 124e by the lever member 129, so that the driven gear 124 is restricted from rotation. Thus, the driven gear 124 is restricted from rotation by the pressing force (urging force) of the home spring 130. Therefore, the driven gear 124 does not rotate even when receiving the urging force of the trigger spring 127. When the trigger gear 126 rotates, the gear portion 126a of the trigger gear 126 and the drive gear 125 mesh with each other, so that the trigger gear 126 rotates by receiving driving force from the drive gear 125.

When the trigger gear 126 rotates by receiving driving force from the drive gear 125, as illustrated in FIG. 9A, play between the groove portions 126f and the key portions 124i disappears, so that edge portions of the groove portions 126f press the key portions 124i. With this pressing, the driven gear 124 starts to rotate. With this rotation, the gear portion 124a of the driven gear 124 and the drive gear 125 mesh with each other, so that driving force is transmitted from the drive gear 125 to the driven gear 124. When the driven gear 124 rotates by being driven by the rotation of the drive gear 125, the lever member 129 swings in a direction to come into sliding contact with a surface in which the cam radius in the home cam surface 124b1 of the home cam 124b becomes larger. With this swinging, the lever member 129 compresses the home spring 130, so that the elastic force of the home spring 130 is charged.

Furthermore, after the locking claw 128a of the solenoid 128 cancels locking of the locking portion 126b and the trigger gear 126 rotates, energization of the solenoid 128 is stopped as illustrated in FIG. 9A. Therefore, the locking claw 128a is moved by the return spring 128b in a direction to come close to the trigger gear 126, so that the locking claw 128a stands by at a position where the locking claw 128a is able to lock the locking portion 126b.

Next, as illustrated in FIGS. 10A and 10B, the driven gear 124 continues rotating until a phase immediately before the pick cam 124g causes the follower portion 122b of the pick arm 122 to operate from the ascended position to the descended position. Until the phase immediately before that, the lever member 129 performs sliding contact up to a portion in which the cam radius is the smallest along a surface in which the cam radius in the cancel cam surface 124b2 of the home cam 124b becomes smaller, thus expanding the home spring 130 to make the urging force of the home spring 130 smaller.

Next, in a state illustrated in FIGS. 11A and 11B, the driven gear 124 rotates, so that the pick cam 124g causes the follower portion 122b of the pick arm 122 to operate. With this rotation, the pick arm 122 is swung by the urging force of the pick spring 123, so that the pick roller 108 starts descending. At this time, the follower portion 122b of the pick arm 122 causes an inverse input torque to be generated at the driven gear 124, which is on the side of the pick cam 124g, by the urging force of the pick spring 123. Here, the inverse input torque is a torque in which, when the pick arm 122 starts descending by the rotation of the pick cam 124g, the urging force of the pick spring 123 for urging the pick arm 122 in a direction to descend acts on the pick cam 124g further in a rotational direction.

At this time, the lever member 129 starts coming into contact with a surface in which the cam radius in the cancel cam surface 124b2 becomes larger. With this contact, the lever member 129 swings in such a way as to compress the home spring 130 to charge the elastic force of the home spring 130, according to an operation in which the pick spring 123 is expanded. Thus, the cancel cam surface 124*b*2 acts on the home spring 130 (the lever member 129) in such a way as to charge the elastic force of the home spring 130 according to an operation in which the follower portion 122*b* releases the elastic force of the pick spring 123 by the rotation of the pick cam 124*g*. In this way, the home spring 130 is compressed by a surface in which the cam radius in the cancel cam surface 124*b*2 becomes larger, so that a cancel torque which is opposite to the inverse input torque is generated. Therefore, it is possible to reduce a torque variation of the pick cam 124*g*, which is rotated by receiving driving force from the drive source D.

Next, in a state illustrated in FIGS. 12A and 12B, the driven gear 124 rotates and the pick cam 124*g* completes an operation of the follower portion 122*b* of the pick arm 122, so that the pick roller 108 is in the descended position. In this state, no inverse input torque is generated at the driven gear 124, which is on the side of the pick cam 124*g*, by the urging force of the pick spring 123. Moreover, the lever member 129 swings in a direction to come into sliding contact from the cancel cam surface 124*b*2 of the home cam 124*b* to an arc surface which is a cam surface in which the cam radius of the home cam 124*b* is uniform. With this swinging, the lever member 129 compresses the home spring 130 again to charge the elastic force of the home spring 130. After that, when the driven gear 124 further rotates, the gear portion 124*f* starts meshing with the idler gear 120, so that the pick roller 108 and the feed roller 110 illustrated in FIG. 33 start rotating.

Next, in a state illustrated in FIGS. 13A and 13B, the driven gear 124 rotates, the pick cam 124*g* comes into contact with the follower portion 122*b* of the pick arm 122, thus causing the pick arm 122 to operate, so that the pick roller 108 is in a state immediately before being caused to ascend. Moreover, the gear portion 124*f* and the idler gear 120 mesh with each other, and the pick roller 108 and the feed roller 110 (see FIG. 33) are rotating.

Next, in a state illustrated in FIGS. 14A and 14B, the driven gear 124 rotates, and the pick cam 124*g* causes the follower portion 122*b* of the pick arm 122 to swing, thus causing the pick roller 108 to be situated again at the ascended position where the pick roller 108 has retreated from the cassette 109 illustrated in FIG. 33. With this swinging, the pick spring 123 is compressed again, so that the elastic force of the pick spring 123 is charged.

Moreover, as illustrated in FIG. 14A, when the partially toothless gear portion 126*c* of the trigger gear 126 rotates up to a position where the partially toothless gear portion 126*c* faces the drive gear 125, the gear portion 126*a* becomes not meshing with the drive gear 125, so that the trigger gear 126 becomes unable to receive driving force from the drive gear 125. At this time, the gear portion 124*a* included in the driven gear 124 is still meshing with the drive gear 125. Therefore, the gear portion 124*a* presses the boss 126*d* of the trigger gear 126 in a rotational direction via the trigger spring 127 arranged at the boss 124*d* of the driven gear 124, so that the trigger gear 126 rotates. Then, when the trigger gear 126 has made one revolution, the locking portion 126*b* collides with and is locked by the locking claw 128*a* of the solenoid 128, so that the trigger gear 126 stops.

Furthermore, as illustrated in FIG. 14A, at a point of time when the trigger gear 126 has stopped with the locking portion 126*b* being locked by the locking claw 128*a* of the solenoid 128, a state in which there is play between the groove portions 126*f* and the key portions 124*i* appears again. Accordingly, the driven gear 124 is able to rotate by a predetermined amount from the state in which the trigger gear 126 has stopped.

Next, in a state illustrated in FIGS. 15A and 15B, the partially toothless gear portion 124*h* of the driven gear 124 is facing the idler gear 120, and the gear portion 124*f* and the idler gear 120 are not meshing with each other. Therefore, the pick roller 108 and the feed roller 110 (see FIG. 33) are stopping rotating.

Moreover, when the driven gear 124 is at a rotational phase illustrated in FIG. 15A, the partially toothless gear portion 124*c* of the driven gear 124 faces the drive gear 125, and the gear portion 124*a* and the drive gear 125 are not meshing with each other. Therefore, the driven gear 124 is unable to receive driving force coming from the drive gear 125. At this time, if the partially toothless gear portion 124*c* of the driven gear 124 stops before moving to a position where the partially toothless gear portion 124*c* completely faces the drive gear 125, some sound may be generated by a slight collision between tooth tips of the drive gear 125 and the gear portion 124*a* of the driven gear 124 rotating. To prevent such an issue from occurring, it is necessary to further rotate the driven gear 124 without recourse to driving force coming from the drive gear 125.

Specifically, by the urging force of the home spring 130, the lever member 129 presses the home cam 124*b* in a rotational direction along a surface in which the cam radius in the home cam surface 124*b*1 becomes smaller. With this pressing, it is possible to rotate the partially toothless gear portion 124*c* of the driven gear 124 up to the home position, in which the partially toothless gear portion 124*c* completely faces the drive gear 125, and cause the teeth of the gear portion 124*a* to completely retreat from the drive gear 125 with respect to the rotational direction of the driven gear 124. Moreover, during a period in which the driven gear 124 continues rotating in a state in which the rotation of the trigger gear 126 is stopped (the key portions 124*i* move inside the groove portions 126*f*), the boss 124*d* of the driven gear 124 is moving away from the boss 126*d* of the trigger gear 126. Therefore, the trigger spring 127 is being expanded, so that the elastic force of the trigger spring 127 is charged again.

After that, as illustrated in FIGS. 8A and 8B, when the solenoid 128 is energized again to cancel locking of the locking portion 126*b* by the locking claw 128*a*, the trigger gear 126 rotates, so that the above-described driving force transmission operation is performed. In this way, when the driven gear 124 is in the home position, the first clutch CL1 transmits the driving force of the drive gear 125 to the driven gear 124 by energizing the solenoid 128 at predetermined timing. This enables performing rotation of the pick roller 108 and the feed roller 110 and ascending and descending operations of the pick roller 108.

As described above, according to the first exemplary embodiment, in the first clutch CL1, the pick cam 124*g* of the driven gear 124 rotates to cause the follower portion 122*b* of the pick arm 122 to operate. At this time, the follower portion 122*b* of the pick arm 122 swings by the urging force of the pick spring 123, so that the elastic force of the home spring 130 is charged in conjunction with an inverse input torque being generated at the driven gear 124. A force for charging the elastic force of the home spring 130 causes a cancel torque opposite to the inverse input torque generated at the driven gear 124 to be generated. This enables reducing the inverse input torque. Then, it is possible to reduce clogging of backlash in gear meshing between the driven gear 124 and the drive gear 125, which would occur when an inverse input torque has been generated in a conventional configuration, and reduce striking sound caused by the pick arm 122 suddenly operating.

Moreover, in the driven gear 124, the gear portion 124a, which meshes with the drive gear 125, the home cam surface 124b1 and the cancel cam surface 124b2 included in the home cam 124b, the gear portion 124f, which meshes with the idler gear 120, and the pick cam 124g are configured in an integral manner. This enables reducing component dimension variations and improving an accuracy in rotational phase.

Then, the urging force of the home spring 130 is also used for other than restricting the rotation of the driven gear when the partially toothless gear portion of the driven gear is situated at the home position where the partially toothless gear portion of the driven gear faces the drive gear. Specifically, a cancel torque which is opposite to an inverse input torque generated at the driven cam is caused to be generated. Therefore, it is not necessary to arrange a dedicated member for reducing the inverse input torque, so that there is no increase in the number of components.

While the first clutch CL1 in the first exemplary embodiment is used for ascending and descending operations of the pick roller 108, the first exemplary embodiment is not limited to this, but the first clutch CL1 can also be applied to a mechanism in which a cam member arranged in a clutch using a gear having a partially toothless gear portion causes a follower member to operate.

Furthermore, the shape of the cancel cam surface 124b2 in the home cam 124b described in the first exemplary embodiment has relevance to the urging force of the home spring 130.

The cam gradient of a surface in which the cam radius in the cancel cam surface 124b2 of the home cam 124b becomes smaller, with which the lever member 129 is in contact during a period from the state illustrated in FIGS. 9A and 9B to the state illustrated in FIGS. 10A and 10B, is configured to be a gradient moderate within the realm of possibility. This is for reducing an inverse input torque which is generated at the driven gear 124 due to an elastic force associated with the expansion of the home spring 130.

Moreover, the cam gradient of a surface in which the cam radius in the cancel cam surface 124b2 of the home cam 124b becomes larger, with which the lever member 129 is in contact during a period from the state illustrated in FIGS. 10A and 10B to the state illustrated in FIGS. 11A and 11B, is configured to be a gradient steep as compared with the above-mentioned surface in which the cam radius becomes smaller. This is for reducing torque variations by causing a cancel torque opposite to an inverse input torque which the follower portion 122b generates at the driven gear 124, which is on the side of the pick cam 124g, to be generated.

[Second Clutch CL2]

Next, a configuration of a second clutch CL2 serving as a driving force transmission device according to a second exemplary embodiment is described with reference to FIGS. 16A and 16B.

Figure 16A:
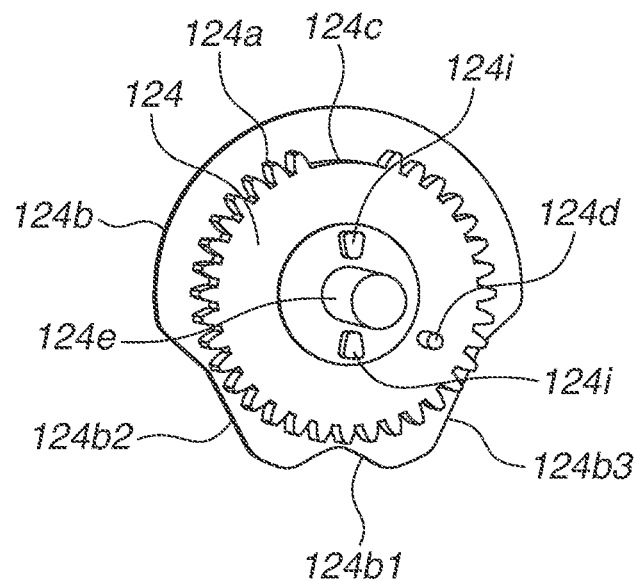
FIGS. 16A and 16B are perspective views of a driven gear in a second clutch.
Figure 16B:
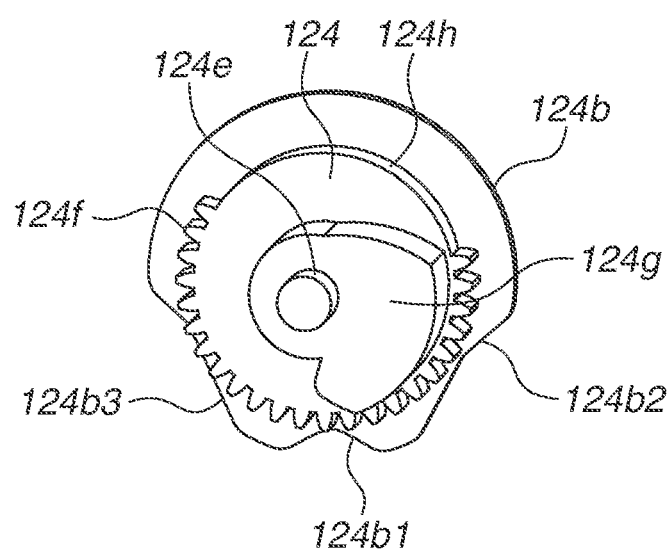

FIGS. 16A and 16B are perspective views of the driven gear 124 of the second clutch CL2 according to the second exemplary embodiment. Furthermore, constituent elements similar to those in the above-described first exemplary embodiment are assigned the respective same reference characters as those in the first exemplary embodiment, and are omitted from description here.

A driven gear 124 of the second clutch CL2 in the second exemplary embodiment is described. The driven gear 124 of the second clutch CL2 illustrated in FIGS. 16A and 16B is different in only a part of the shape from the driven gear 124 of the first clutch CL1 in the first exemplary embodiment, and constituent elements other than the driven gear 124 are similar to those of the first clutch CL1 and are, therefore, omitted from description.

In the home cam 124b of the driven gear 124 of the second clutch CL2 illustrated in FIGS. 16A and 16B, in addition to the above-mentioned home cam surface 124b1 and cancel cam surface 124b2, an assist cam surface 124b3 is provided at a predetermined rotational phase. The home cam 124b has an arc surface (outer circumferential surface) which is a cam surface in which the cam radius is uniform, and the home cam surface 124b1, the cancel cam surface 124b2, and the assist cam surface 124b3 are provided in parts of the cam surface of the home cam 124b. Each of the home cam surface 124b1, the cancel cam surface 124b2, and the assist cam surface 124b3 is provided in a concave shape from the cam surface in which the cam radius is uniform of the home cam 124b toward the rotation center thereof. Accordingly, each of the home cam surface 124b1, the cancel cam surface 124b2, and the assist cam surface 124b3 includes a surface in which the cam radius becomes smaller on the upstream side in the rotational direction and a surface in which the cam radius becomes larger on the downstream side in the rotational direction.

[Operation of Second Clutch CL2]

Next, a driving force transmission operation from the second clutch CL2 to the first feeding portion F1 in the second exemplary embodiment is described with reference to FIGS. 17A and 17B to FIGS. 21A and 21B. Figures with figure numbers having a suffix "A" out of FIGS. 17A and 17B to FIGS. 21A and 21B are views of the second clutch CL2 as viewed from the front side thereof, and figures with figure numbers having a suffix "B" out of FIGS. 17A and 17B to FIGS. 21A and 21B are views of the second clutch CL2 as viewed from the back side thereof.

Figure 17A:
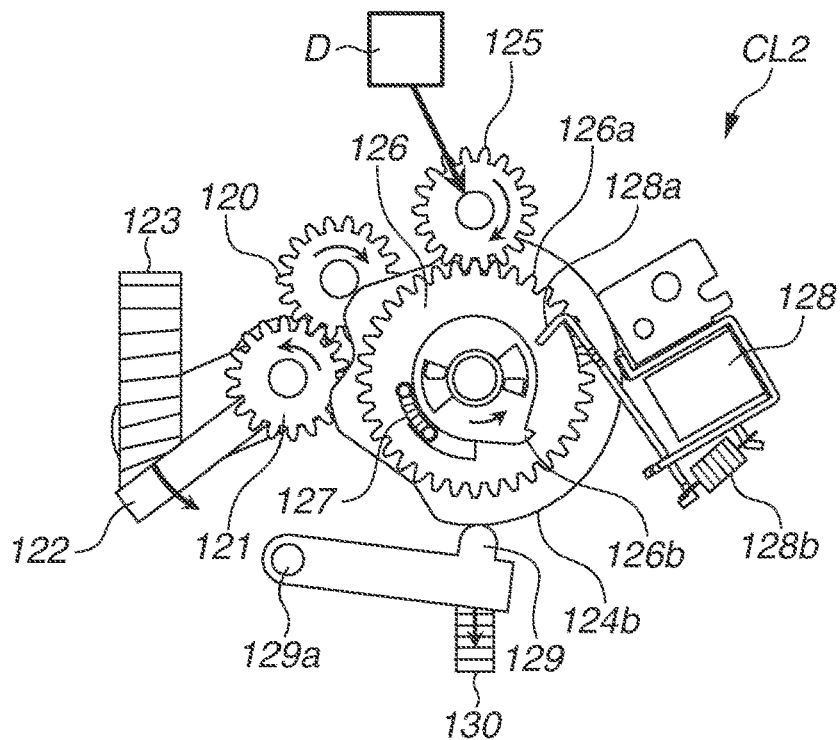
FIG. 17A is a diagram illustrating the second clutch as viewed from the front side.
Figure 17B:
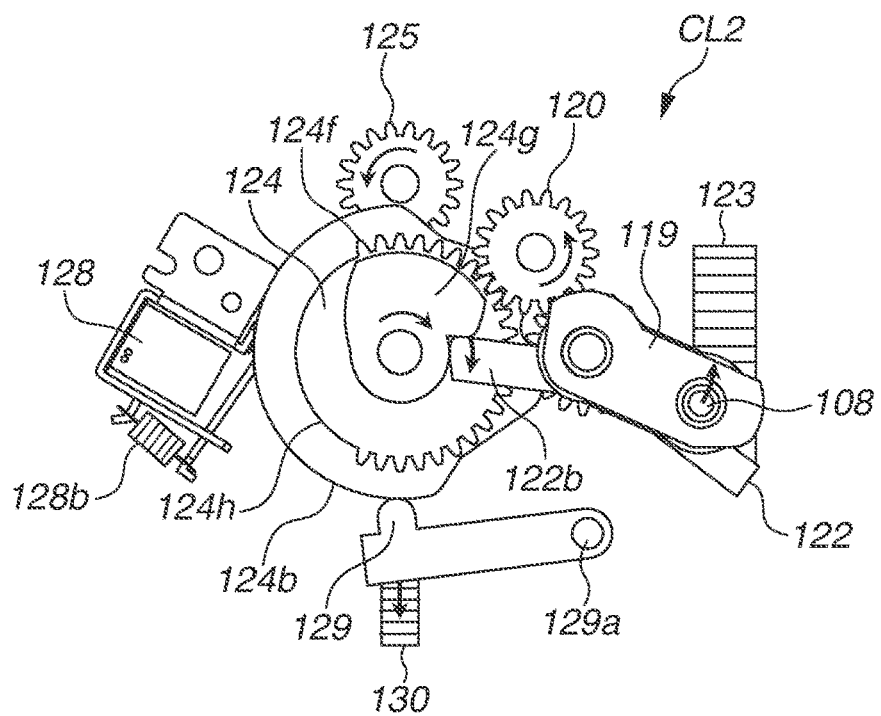
FIG. 17B is a diagram illustrating the second clutch as viewed from the back side.
Figure 20A:
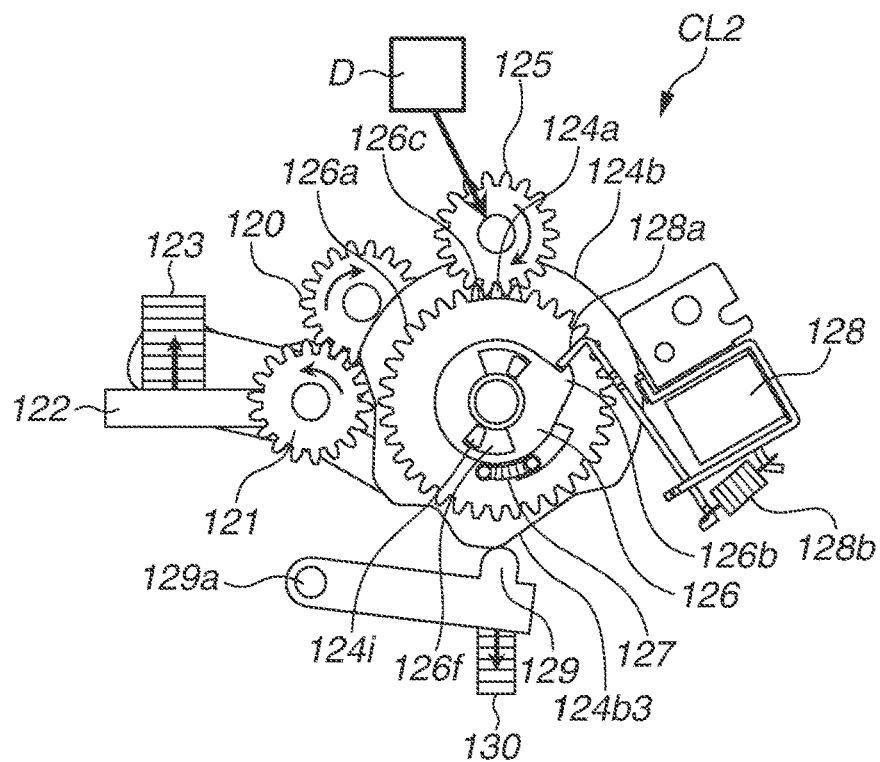
FIG. 20A is a diagram illustrating the second clutch as viewed from the front side.
Figure 20B:
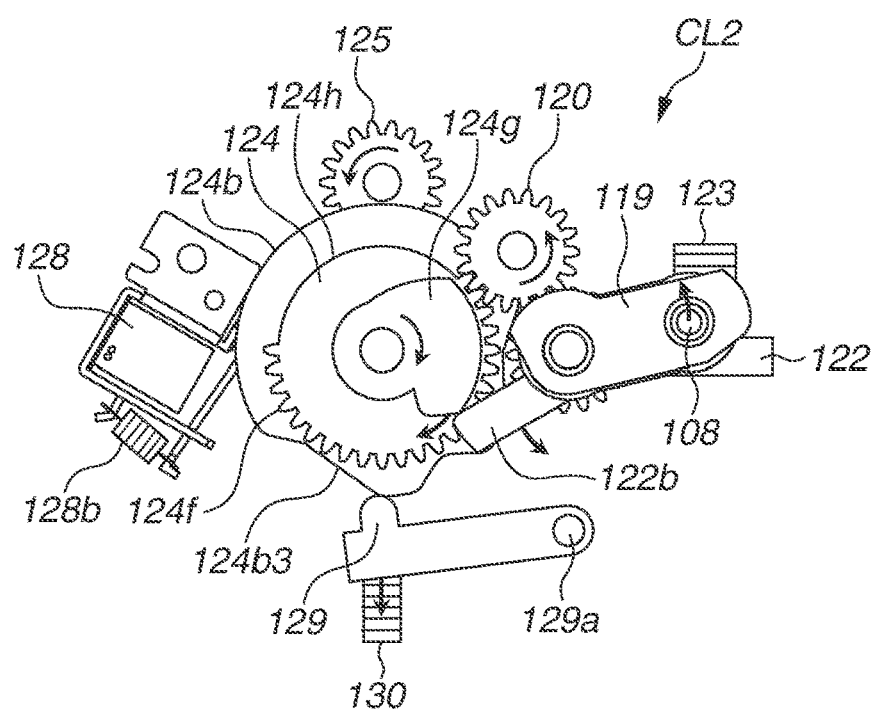
FIG. 20B is a diagram illustrating the second clutch as viewed from the back side.
Figure 21A:
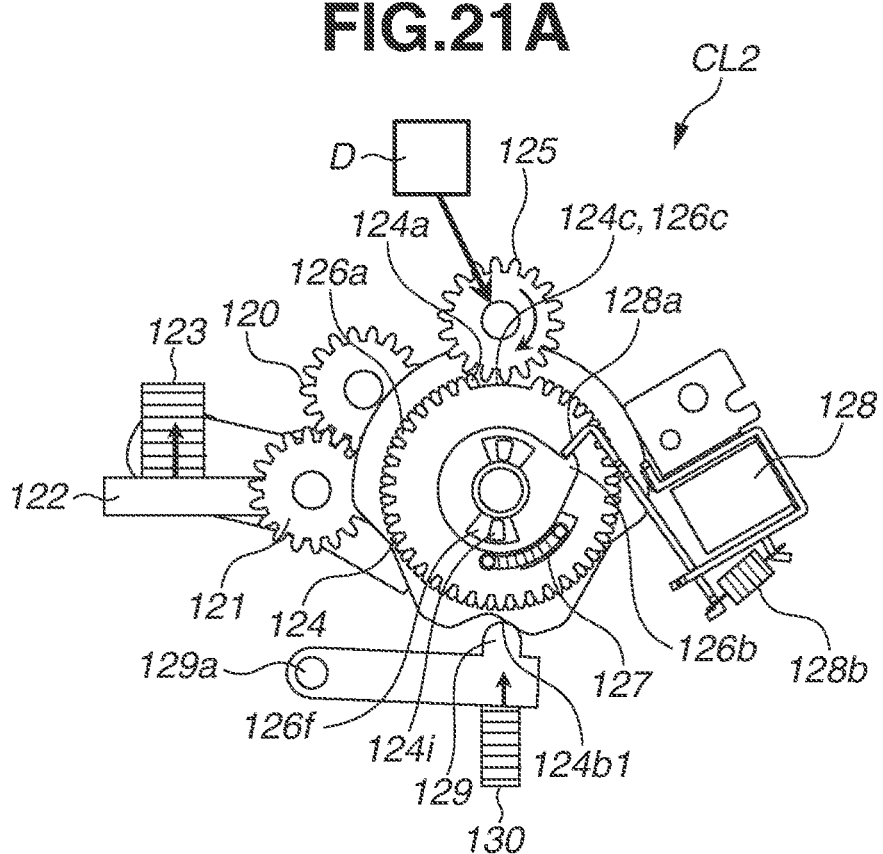
FIG. 21A is a diagram illustrating the second clutch as viewed from the front side.
Figure 21B:
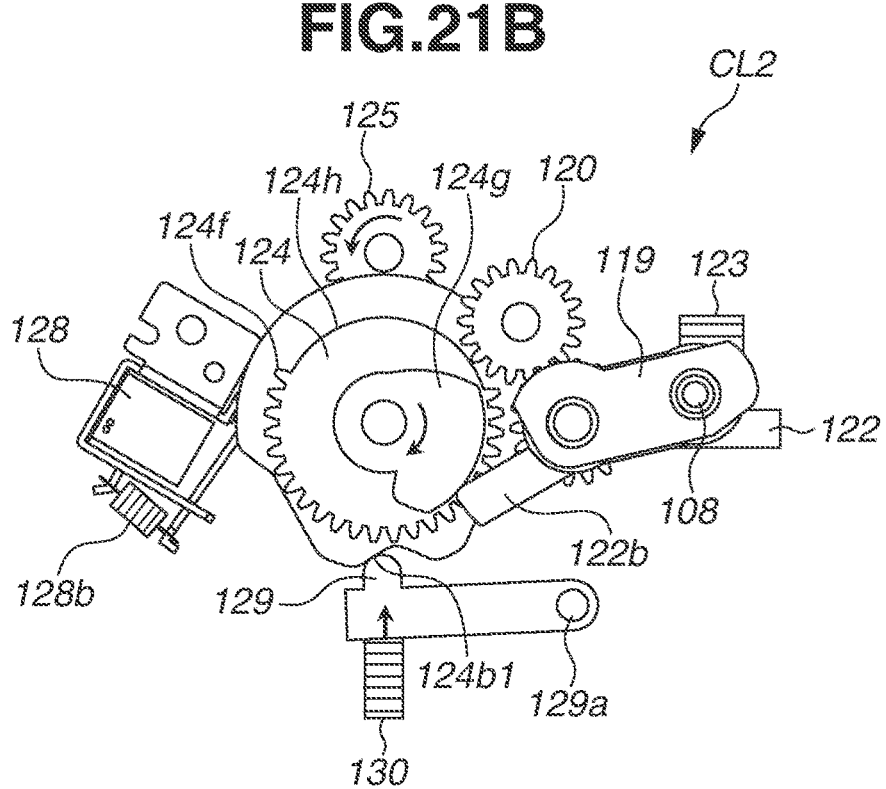
FIG. 21B is a diagram illustrating the second clutch as viewed from the back side.

FIGS. 17A and 17B illustrate a state of the second clutch CL2 obtained when the pick roller 108 starts ascending. FIGS. 18A and 18B and FIGS. 19A and 19B illustrate a state of the second clutch CL2 obtained when the pick roller 108 is in the process of starting ascending. FIGS. 20A and 20B illustrate a state of the second clutch CL2 obtained when the pick roller 108 ends ascending and the trigger gear 126 is in a stopped state. FIGS. 21A and 21B illustrate a state of the second clutch CL2 obtained immediately before the driven gear 124 ends rotating. Rotational directions and operational directions of the respective members illustrated in FIGS. 17A and 17B to FIGS. 21A and 21B are represented by arrows drawn near the respective members.

Furthermore, states of the second clutch CL2 obtained from when the second clutch CL2 is in a standby state to when the pick roller 108 has moved to the descended position are similar to those of the first clutch CL1 described in the first exemplary embodiment with reference to FIGS. 7A and 7B to FIGS. 12A and 12B, and are, therefore, omitted from description here.

Next, in a state illustrated in FIGS. 17A and 17B, the driven gear 124 rotates, the pick cam 124g comes into contact with the follower portion 122b of the pick arm 122, thus causing the pick arm 122 to operate, so that the pick roller 108 is in a state immediately before being caused to ascend from the descended position.

At this time, the lever member 129 is in sliding contact with a cam surface (outer circumferential surface) in which the cam radius is uniform of the home cam 124b, and the home spring 130 is compressed by the lever member 129, so that the elastic force of the home spring 130 is charged. Moreover, the gear portion 124f of the driven gear 124 and the idler gear 120 is meshing with each other, and the pick roller 108 and the feed roller 110 (see FIG. 33) are rotating.

Figure 18A:
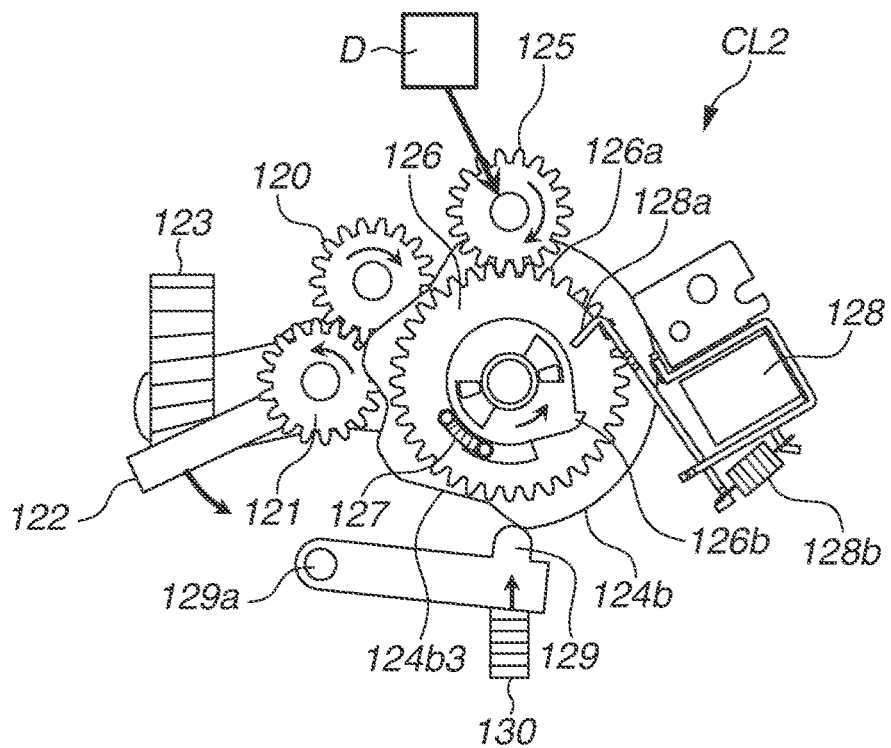
FIG. 18A is a diagram illustrating the second clutch as viewed from the front side.
Figure 18B:
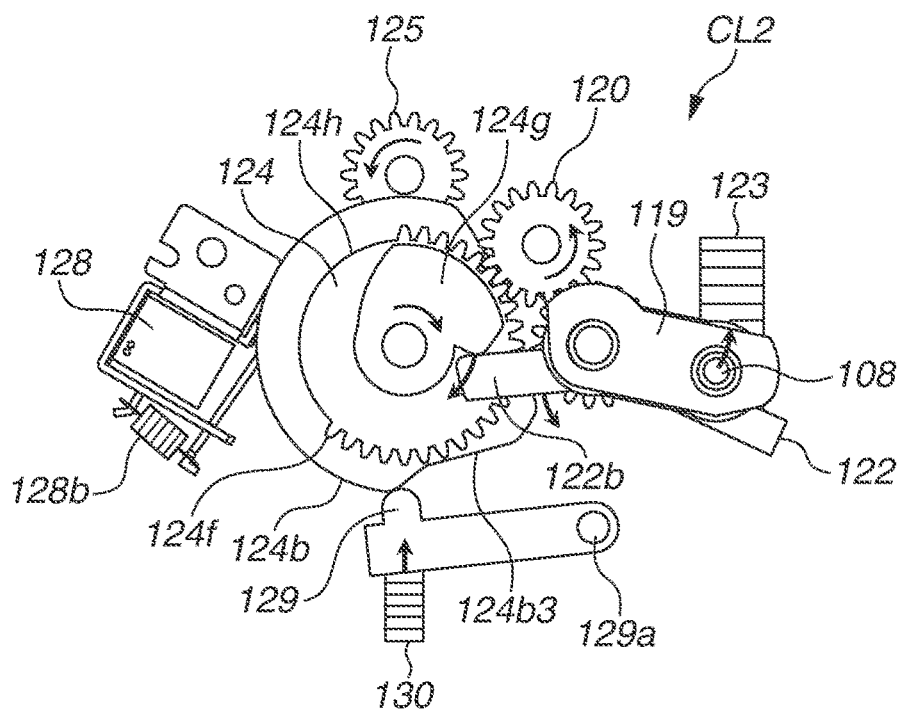
FIG. 18B is a diagram illustrating the second clutch as viewed from the back side.

Next, in a state illustrated in FIGS. 18A and 18B, the driven gear 124 rotates, and the pick cam 124g causes the follower portion 122b of the pick arm 122 to swing, so that the pick roller 108 is currently in the process of ascending.

At this time, a drive torque which causes the follower portion 122b to swing is generated at the driven gear 124. Here, the drive torque is a torque generated in a case where, when the pick arm 122 starts ascending by the rotation of the pick cam 124g, a force for moving the pick arm 122 in a direction to ascend against the urging force of the pick spring 123 acts on the pick cam 124g in a direction opposite to the rotational direction. Since the drive torque compresses the pick spring 123 to charge the elastic force of the pick spring 123, the drive torque gradually increases in proportion to the angle of swinging of the pick arm 122, and, after the pick arm 122 has swung by a predetermined angle, the drive torque decreases up to a drive torque corresponding to a sliding contact resistance between the pick cam 124g and the follower portion 122b.

In conformity with the rotational phase of the driven gear 124 in which the drive torque becomes larger, the lever member 129 comes into contact with a surface in which the cam radius in the assist cam surface 124b3 of the home cam 124b becomes smaller and performs sliding contact along the surface in which the cam radius becomes smaller in a direction according to which the cam radius becomes smaller. With this sliding contact, as the pick spring 123 is compressed, the lever member 129 swings in such a way as to expand the home spring 130 to release the elastic force of the home spring 130. Thus, the assist cam surface 124b3 acts on the home spring 130 (the lever member 129) in such a way as to release the elastic force of the home spring 130 according to an operation in which the follower portion 122b charges the elastic force of the pick spring 123 by the rotation of the pick cam 124g. In this way, the home spring 130 is expanded by the surface in which the cam radius of the assist cam surface 124b3 becomes smaller, so that an assist torque for canceling out a drive torque generated at the driven gear 124 is generated. Therefore, it is possible to reduce torque variations of the pick cam 124g, which is rotated by receiving driving force from the drive source D.

Figure 19A:
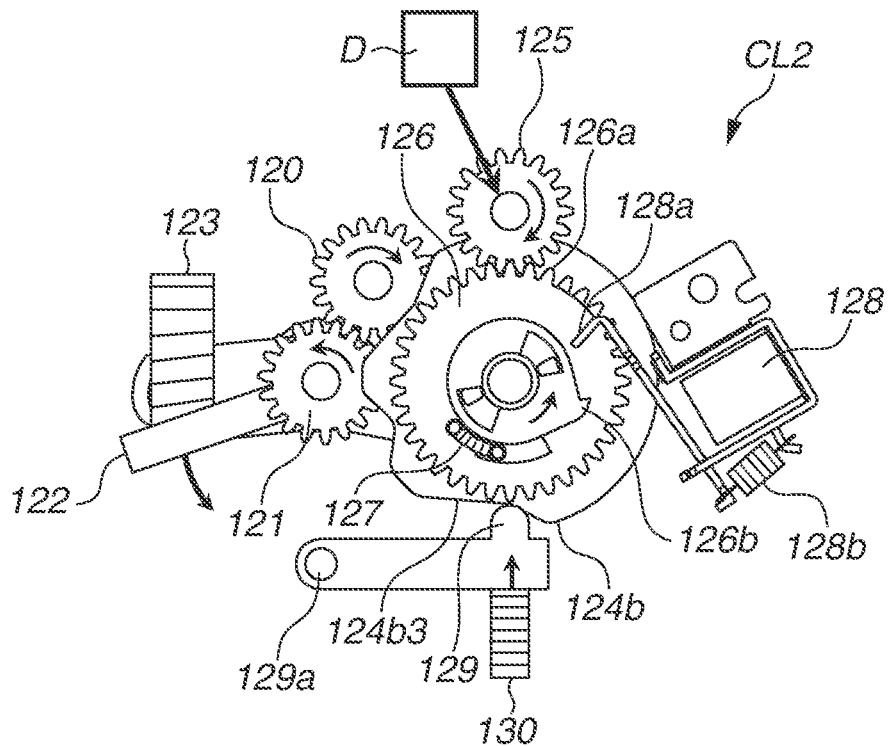
FIG. 19A is a diagram illustrating the second clutch as viewed from the front side.
Figure 19B:
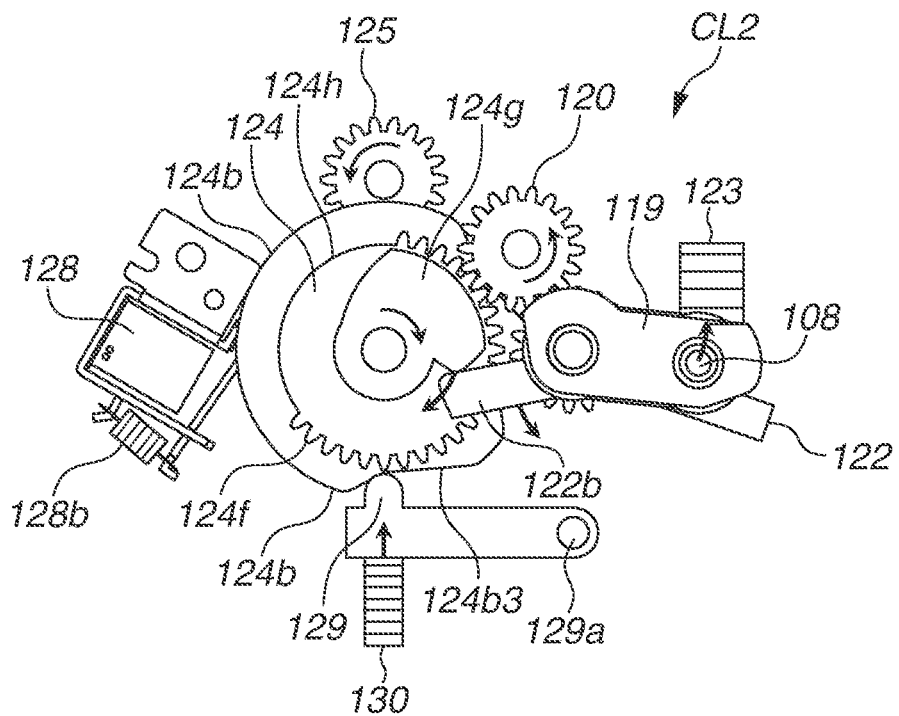
FIG. 19B is a diagram illustrating the second clutch as viewed from the back side.

In a state illustrated in FIGS. 19A and 19B, the driven gear 124 rotates, the pick cam 124g causes the follower portion 122b of the pick arm 122 to swing, and the pick roller 108 is in a state of having ascended from the position illustrated in FIGS. 18A and 18B.

At this time, the drive torque for causing the follower portion 122b acting on the driven gear 124 to swing is in a state of being smaller than the maximum value thereof. Moreover, the lever member 129 is in contact with a portion in which the cam radius in the assist cam surface 124b3 is the smallest, so that the home spring 130 is expanded to make the elastic force of the home spring 130 smaller.

In a state illustrated in FIGS. 20A and 20B, the driven gear 124 rotates, the pick cam 124g causes the follower portion 122b of the pick arm 122 to swing, and the pick roller 108 is in a state of being situated in the ascended position again. With this state, the pick spring 123 is compressed again to charge the elastic force of the pick spring 123.

At this time, the lever member 129 is in sliding contact with the outer circumferential surface of the home cam 124b, and the home spring 130 is compressed by the lever member 129, so that the elastic force of the home spring 130 is charged. Here, when the driven gear 124 rotates from the state illustrated in FIGS. 19A and 19B to the state illustrated in FIGS. 20A and 20B, the drive torque for causing the follower portion 122b acting on the driven gear 124 to swing decreases gradually. On the other hand, the lever member 129 performs sliding contact along a surface in which the cam radius in the assist cam surface 124b3 becomes larger from a portion in which the cam radius is small, in a direction according to which the cam radius becomes larger. Therefore, a drive torque for charging the elastic force of the home spring 130 is added to the driven gear 124.

Moreover, as with the first clutch CL1 described in the first exemplary embodiment with reference to FIGS. 14A and 14B, when the trigger gear 126 has made one revolution, the locking portion 126b collides with the locking claw 128a of the solenoid 128 and is thus locked and stopped.

Next, in a state illustrated in FIGS. 21A and 21B, as with the first clutch CL1 described in the first exemplary embodiment with reference to FIGS. 15A and 15B, the partially toothless gear portion 124h of the driven gear 124 faces the idler gear 120, and the gear portion 124f and the idler gear 120 are not meshing with each other. Therefore, the pick roller 108 and the feed roller 110 (see FIG. 33) are stopping rotating.

Moreover, the lever member 129 presses the home cam 124b in a rotational direction along a surface in which the cam radius in the home cam surface 124b1 becomes smaller, by the urging force of the home spring 130. With this pressing, the driven gear 124 is rotated up to the home position, in which the partially toothless gear portion 124c completely aces the drive gear 125.

As described above, according to the second exemplary embodiment, in the second clutch CL2, the pick cam 124g of the driven gear 124 rotates to cause the follower portion 122b of the pick arm 122 to operate. In conjunction with the timing at which a drive torque applied to the driven gear 124 when the pick cam 124g causes the pick arm 122 to perform an ascending operation becomes the maximum value, the pick cam 124g expands the home spring 130 to apply the urging force of the home spring 130 to the driven gear 124. This enables reducing the maximum value of the drive torque and thus decreasing the amount of increasing variation of a drive torque of the drive source D, which drives the driven gear 124.

Moreover, since only the assist cam surface 124b3 needs to be added to the home cam 124b of the driven gear 124 even with respect to the first clutch CL1 described in the first exemplary embodiment, there is no increase in the number of components, and, since the assist cam surface 124b3 is configured integrally with the home cam 124b, a good accuracy in rotational phase is obtained.

Furthermore, the shape of the assist cam surface 124b3 in the home cam 124b described in the second exemplary embodiment has relevance to the elastic force of the home spring 130, as with the cancel cam surface 124b2 described in the first exemplary embodiment.

The cam gradient of a surface in which the cam radius in the assist cam surface 124b3 of the home cam 124b becomes smaller, with which the lever member 129 is in contact during a period from the state illustrated in FIGS. 18A and 18B to the state illustrated in FIGS. 19A and 19B, is configured to be a gradient steep as compared with the surface in which the cam radius on the downstream side in the rotational direction becomes larger. This is for generating an assist torque capable of coping with the maximum value of a drive torque applied to the driven gear 124.

Moreover, the cam gradient of a surface in which the cam radius in the assist cam surface 124b3 of the home cam 124b becomes larger, with which the lever member 129 is in contact during a period from the state illustrated in FIGS. 19A and 19B to the state illustrated in FIGS. 20A and 20B, is configured to be a gradient moderate within the realm of possibility. This is reducing the amount of increasing variation of a drive torque which is generated at the driven gear 124 by the elastic force charged by the home spring 130 being compressed.

Next, a second feeding portion F2 in an image forming apparatus 100 according to a third exemplary embodiment is described with reference to FIG. 33 and FIG. 22 to FIGS. 24A and 24B.

As illustrated in FIG. 33, the image forming apparatus 100 includes the second feeding portion F2, which feeds recording materials S stacked in a stacking tray 209 one by one toward the registration roller 112. The second feeding portion F2 includes a pick roller 208, a feed roller 210, and a separation roller 211. In the second feeding portion F2, the pick roller 208 is caused to descend from a position at which the pick roller 208 retreats from the recording materials S stacked in the stacking tray 209, come into contact with a recording material S, and then rotate clockwise, thus feeding the recording material S to the feed roller 210 and the separation roller 211. The recording material S brought out by the pick roller 208 is separated one by one by the separation roller 211, and is then conveyed to the registration roller 112 by the feed roller 210. An image forming operation to be performed subsequently on the recording material S is similar to that in the above-described first exemplary embodiment.

[Second Feeding Portion F2]

Figure 24A:
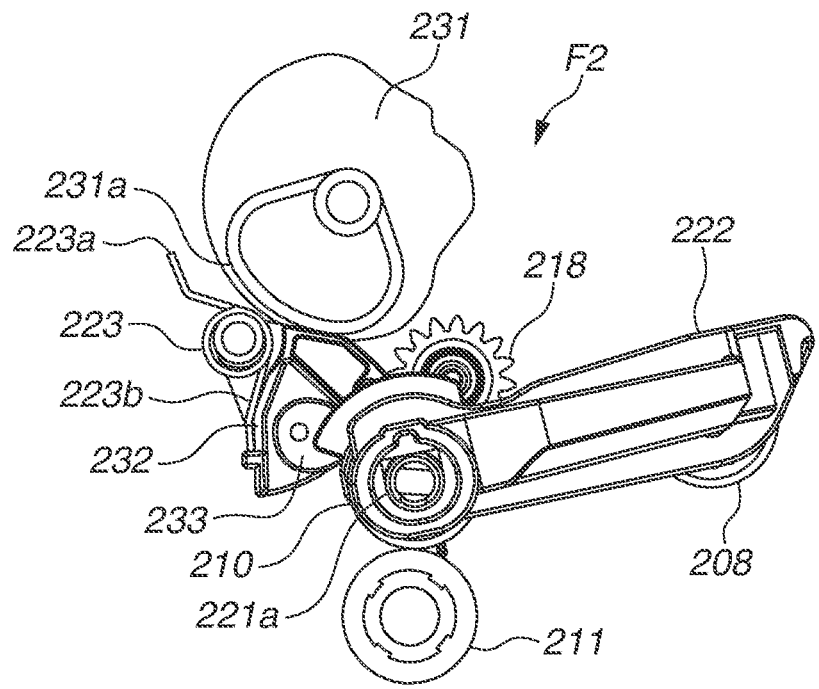
FIGS. 24A and 24B are operation explanatory diagrams of the second feeding portion.
Figure 24B:
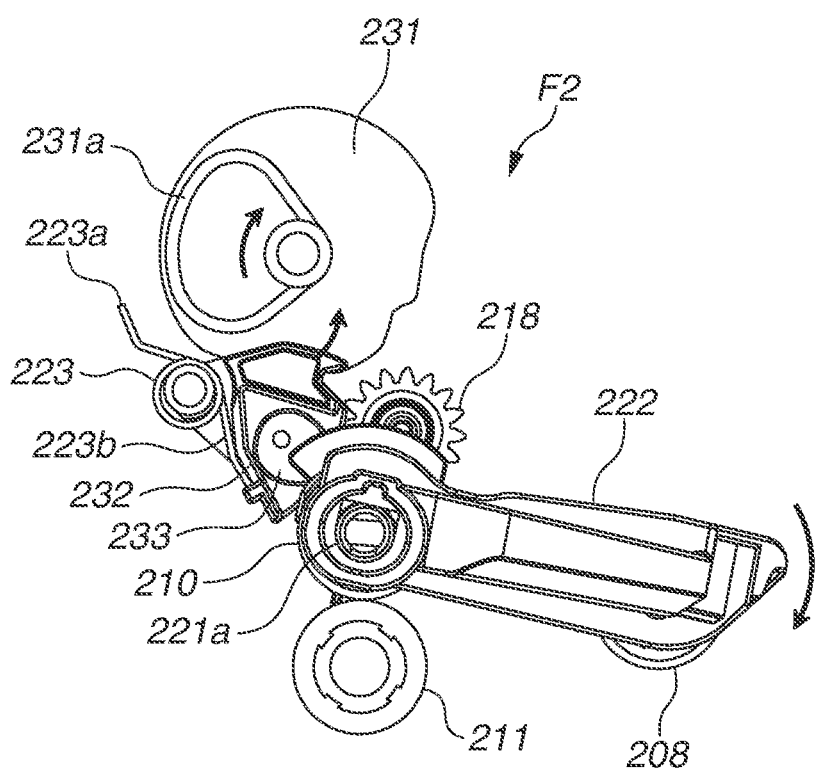

Next, the second feeding portion F2 is described with reference to FIG. 22 to FIGS. 24A and 24B. FIG. 22 is a perspective view of the second feeding portion F2, and FIG. 23 is a perspective view of the second feeding portion F2 before being assembled. FIGS. 24A and 24B are operation explanatory diagrams of the second feeding portion F2, in which FIG. 24A illustrates a state in which the pick roller 208 is in the ascended position and FIG. 24B illustrates a state in which the pick roller 208 is in the descended position. Here, the pick roller ascended position is a retreating position where the pick roller 208 has retreated from the stacking tray 209 (a position indicated by a dashed line illustrated in FIG. 33). Moreover, the pick roller descended position is a feeding position where the pick roller 208 is in contact with the uppermost recording material out of recording materials stored in the stacking tray 209 (a position indicated by a solid line illustrated in FIG. 33).

As illustrated in FIG. 22 and FIG. 23, the second feeding portion F2 includes the pick roller 208, the feed roller 210, and the separation roller 211.

In the second feeding portion F2, the pick roller 208, which has a gear portion 208a, the feed roller 210, which has a gear portion 210a, and a roller idler gear 218 are rotatably stored in a pick arm 222 in such a manner that those gears mesh with each other. In the vicinity of the feed roller 210, the separation roller 211 is rotatably arranged in a roller guide 219. An idler gear 220 meshes with a roller drive gear 221 and the feed roller 210 is coupled to a shaft 221a of the roller drive gear 221, so that, in response to the idler gear 220 rotating, the feed roller 210 and the pick roller 208 rotate.

The pick arm 222 includes a recessed portion 222a, which engages with a raising portion 233a of a second follower 233. The pick arm 222 and the second follower 233 are held in a swingable manner on the shaft 221a, and, when the second follower 233 swings, the pick arm 222 also swings in conjunction with the pick arm 222.

Next, as illustrated in FIGS. 24A and 24B, the other arm 223b of a pick spring 223 having one arm 223a fixed is in contact with a first follower 232, and the first follower 232 is urged counterclockwise by the pick spring 223. The first follower 232 is arranged to swing and come into contact with a second cam portion 231a of a cam member 231. Moreover, the first follower 232 is engaging with the second follower 233, and, the second follower 233 is configured to swing clockwise when the first follower 232 swings counterclockwise.

As illustrated in FIGS. 24A and 24B, the pick spring 223, which is a second elastic member, applies urging force to the first follower 232, which is a follower member. Accordingly, the pick spring 223 urges the pick arm 222 downward in FIGS. 24A and 24B (clockwise around the shaft 221a) via the first follower 232 and the second follower 233. The first follower 232, which is a follower member, is in contact with the second cam portion 231a, which is a second cam member, and operates in a direction to release or charge elastic force of the pick spring 223 by rotation of the second cam portion 231a.

FIG. 24A illustrates a state in which, in the state of being in contact with the second cam portion 231a of the cam member 231, the first follower 232 charges elastic force of the pick spring 223. A pick roller 208, which is stored in the pick arm 222, is in an ascended position (retreating position) where the pick roller 208 has retreated from the stacking tray 209 in FIG. 33.

FIG. 24B illustrates a state in which, when the cam member 231 rotates clockwise, the first follower 232 swings and then releases the elastic force of the pick spring 223. When the first follower 232 swings, the second follower 233 also swings in conjunction with the first follower 232, and the pick arm 222 is in a descended position (feeding position) where the pick roller 208 is brought into contact with the recording material S in FIG. 33 by the urging force of the pick spring 223, which is a predetermined feeding pressure.

In this way, in response to the first follower 232 and the second follower 233 swinging by rotation of the cam member 231, the pick arm 222 swings to cause the pick roller 208 to perform ascending and descending operations.

[Third Clutch CL3]

Next, a configuration of a third clutch CL3, which is provided in a drive train for transmitting a driving force coming from a drive source D to the pick roller 208 and the cam member 231 each serving as a driven member and serves as a driving force transmission device for transmitting or blocking the driving force, is described with reference to FIGS. 25A and 25B, FIG. 26, and FIGS. 27A and 27B.

Figure 25A:
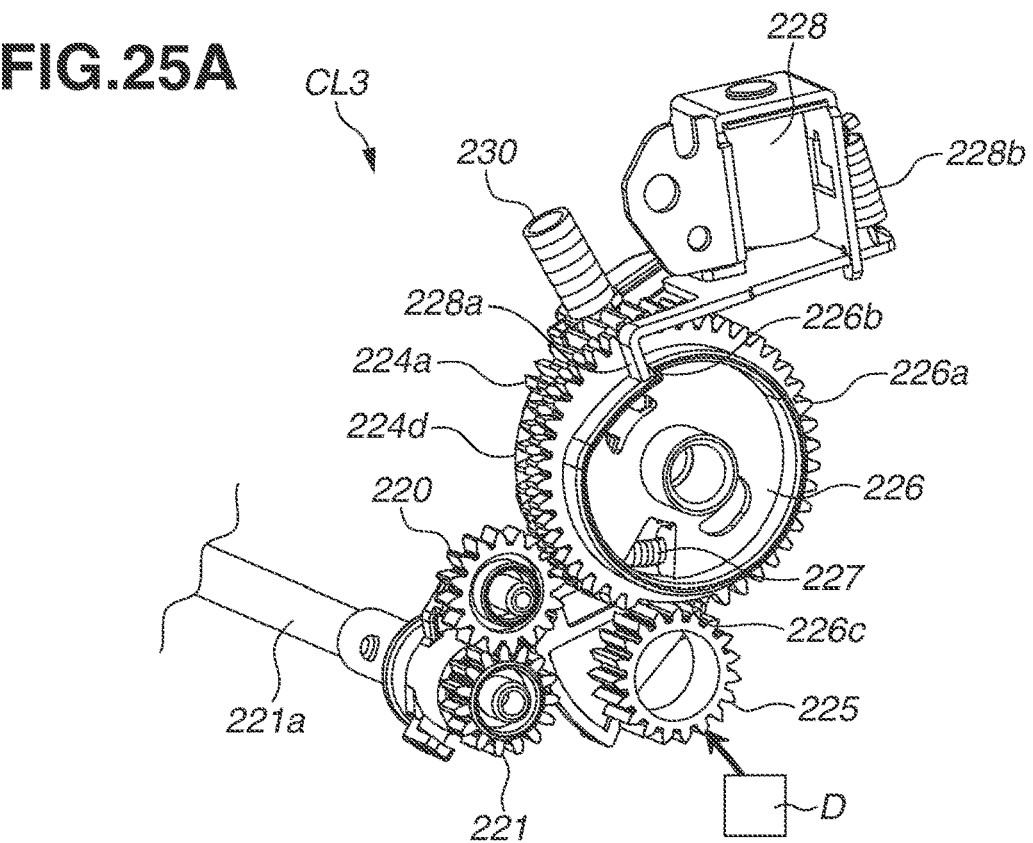
FIGS. 25A and 25B are perspective views of a third clutch.
Figure 25B:
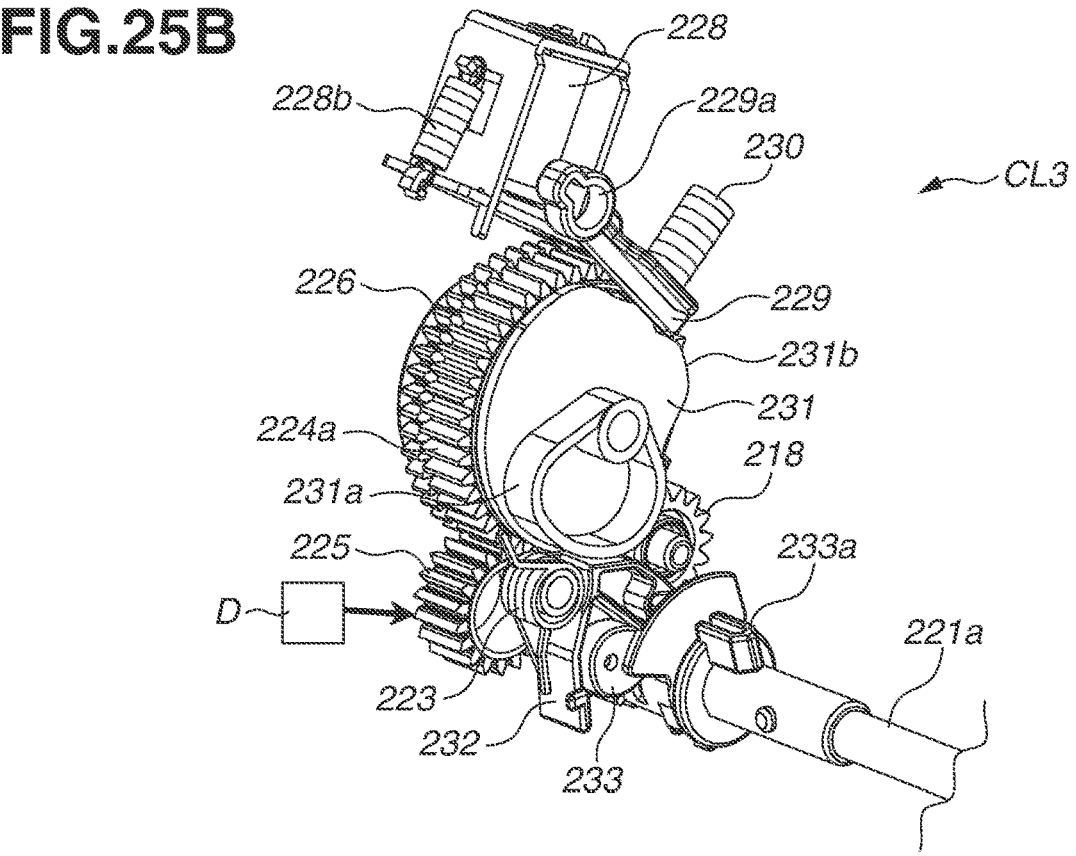
Figure 26:
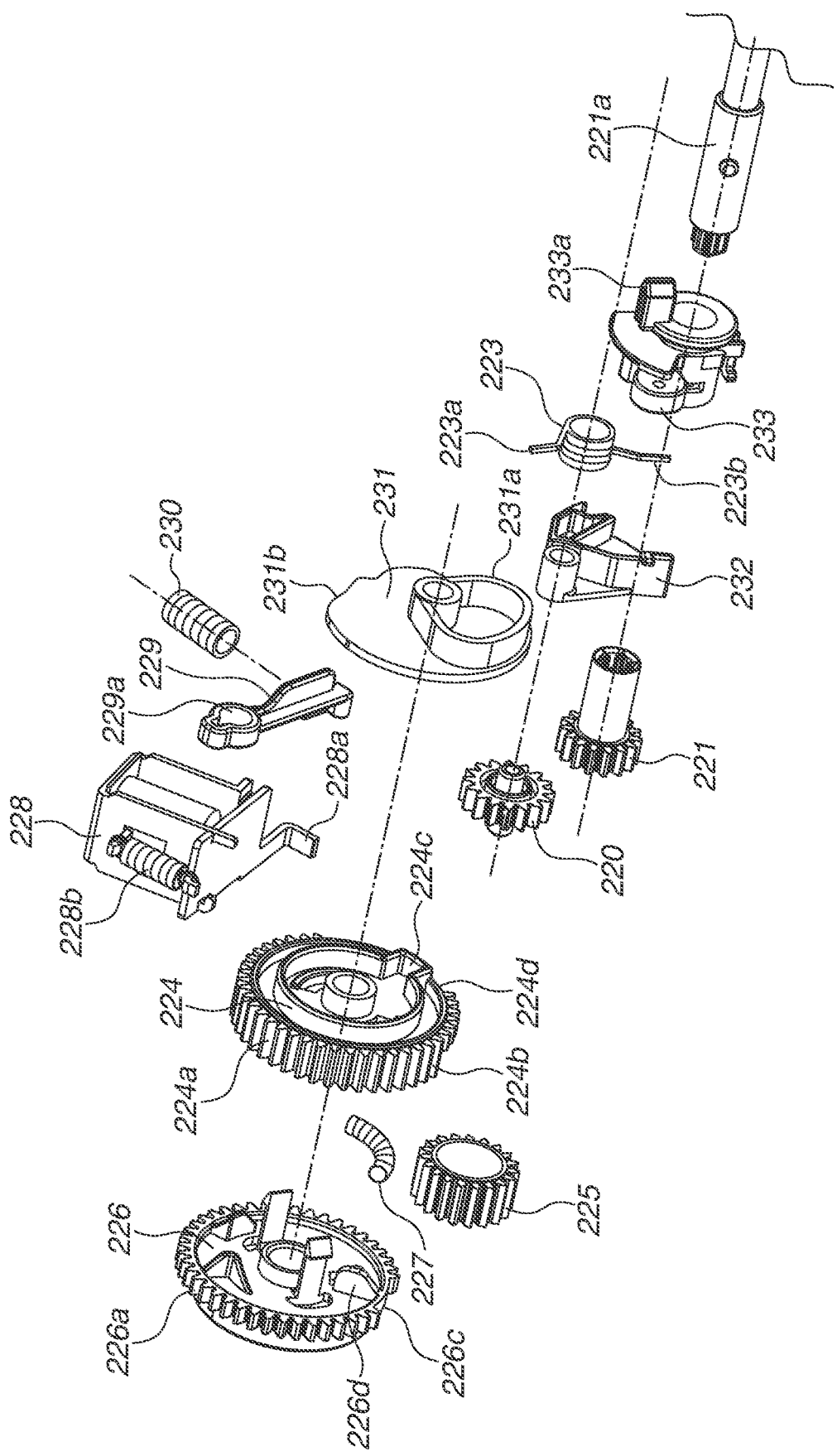
FIG. 26 is a perspective view of the third clutch before being assembled.
Figure 27A:
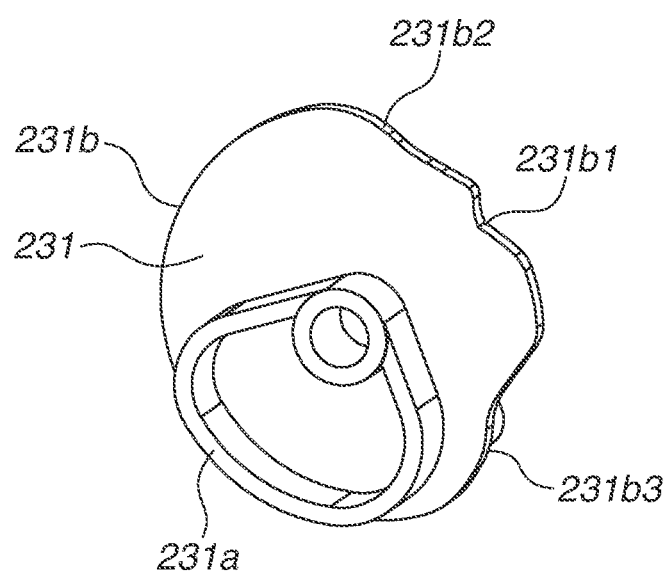
FIGS. 27A and 27B are perspective views of a cam member in the third clutch.
Figure 27B:
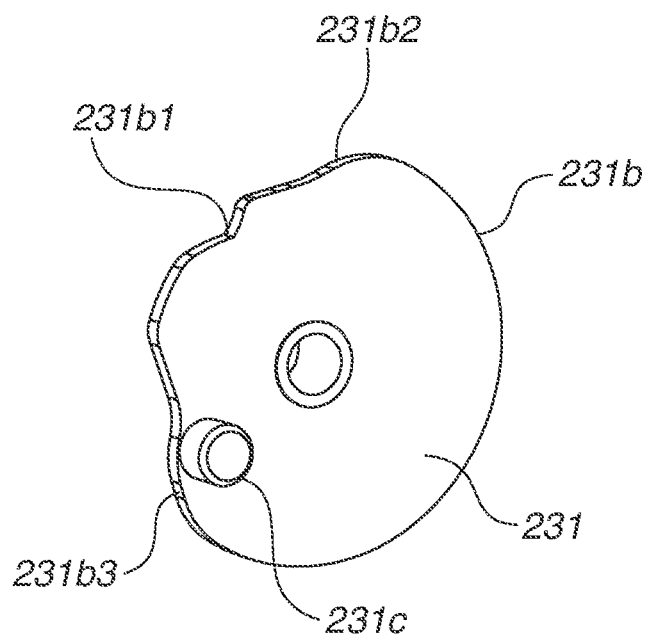

FIGS. 25A and 25B are perspective views of the third clutch CL3, in which FIG. 25A is a perspective illustration of the third clutch CL3 as viewed from one side (a side opposite to the side of the pick roller 208) in the axial direction thereof and FIG. 25B is a perspective illustration of the third clutch CL3 as viewed from the other side (the side of the pick roller 208) in the axial direction thereof. Hereinafter, one side in the axial direction of the third clutch CL3 is referred to as a "front side of the third clutch CL3", and the other side in the axial direction of the third clutch CL3 is referred to as a "back side of the third clutch CL3". FIG. 26 is a perspective view of the third clutch CL3 before being assembled. FIGS. 27A and 27B are perspective views of the cam member 231 of the third clutch CL3.

As illustrated in FIGS. 25A and 25B, FIG. 26, and FIGS. 27A and 27B, the third clutch CL3 includes a drive gear 225, which is always coupled to the drive source D to rotate, a driven gear 224 and a trigger gear 226, each of which is able to mesh with the drive gear 225, and a trigger spring 227. Additionally, the third clutch CL3 includes an idler gear 220, which is able to mesh with the driven gear 224, on the drive downstream side of the driven gear 224, and the idler gear 220 is in mesh with the roller drive gear 221 of the second feeding portion F2 as mentioned above. Moreover, the third clutch CL3 includes a solenoid 228, which is a regulation unit for regulating the rotation of the trigger gear 226, and a home spring 230, which is a first elastic member for applying urging force to a lever member 229. The home spring 230, which is the first elastic member, applies urging force to the lever member 229 to bring the lever member 229 into contact with a first cam portion 231b of the cam member 231, which is described below.

Additionally, the third clutch CL3 includes the first cam portion 231b serving as a first cam member and the second cam portion 231a serving as a second cam member, each of which rotates in conjunction with the rotation of the driven gear 224. In the third exemplary embodiment, the first cam portion 231b and the second cam portion 231a are configured integrally as the cam member 231 and rotate in conjunction with the rotation of the driven gear 224.

A driving force coming from the drive source D is transmitted to the roller drive gear 221 via the drive gear 225, the driven gear 224, and the idler gear 220 of the third clutch CL3 to rotate the pick roller 208 and the feed roller 210 illustrated in FIGS. 24A and 24B.

The trigger gear 226 includes a gear portion 226a, which meshes with the drive gear 225, a locking portion 226b, the rotation of which is restricted by being locked by a locking claw 228a of the solenoid 228, and a partially toothless gear portion 226c, which does not mesh with the drive gear 225. The trigger gear 226 integrally includes a spring storage portion 226d, at which the trigger spring 227 is arranged. The gear portion 226a has a plurality of teeth meshing with the teeth of the drive gear 225 and has a number-of-teeth diameter corresponding to 44 teeth. The partially toothless gear portion 226c is provided at a part of the gear portion 226a, is a region having no teeth meshing with the teeth of the drive gear 225, and is in the form of a partially toothless gear corresponding to four teeth of the gear portion 226a.

The driven gear 224 includes a gear portion 224a, which meshes with the drive gear 225, and a partially toothless gear portion 224b, which does not mesh with the drive gear 225. The driven gear 224 includes a spring storage portion (not illustrated), at which the trigger spring 227 is arranged, and an engagement portion 224c, which engages with the cam member 231. The gear portion 224a has a plurality of teeth meshing with the teeth of the drive gear 225 and has a number-of-teeth diameter corresponding to 44 teeth. The partially toothless gear portion 224b is provided at a part of the gear portion 224a, is a region having no teeth meshing with the teeth of the drive gear 225, and is in the form of a partially toothless gear corresponding to four teeth of the gear portion 224a.

Moreover, the gear portion 224a of the driven gear 224 is also able to mesh with the idler gear 220, and a partially toothless gear portion 224d, which does not mesh with the idler gear 220, is provided at a part of the gear portion 224a. The partially toothless gear portion 224d is provided at a part of the gear portion 224a separately from the partially toothless gear portion 224b, is a region having no teeth meshing with the teeth of the idler gear 220, and is in the form of a partially toothless gear corresponding to 10 teeth of the gear portion 224a.

Moreover, as illustrated in FIGS. 27A and 27B, the cam member 231 includes a second cam portion 231a, which comes into contact with the first follower 232 to cause the first follower 232 to operate, and a first cam portion 231b, with which the lever member 229 comes into contact to apply urging force of the home spring 230 to the cam member 231. Additionally, the cam member 231 includes a boss 231c, which engages with the engagement portion 224c of the driven gear 224.

As illustrated in FIGS. 27A and 27B, in the first cam portion 231b, a home cam surface 231b1, a cancel cam surface 231b2, and an assist cam surface 231b3 are provided at respective predetermined rotational phases. The first cam portion 231b has an arc surface (outer circumferential surface) which is a cam surface in which the cam radius is uniform, and the home cam surface 231b1, the cancel cam surface 231b2, and the assist cam surface 231b3 are provided at a part of the cam surface of the first cam portion 231b. The home cam surface 231b1 is in the form of a concave shape including a surface in which the cam radius becomes smaller as the first cam portion 231b rotates and a surface in which the cam radius becomes larger as the first cam portion 231b rotates. The cancel cam surface 231b2 includes a surface in which the cam radius becomes larger as the first cam portion 231b rotates. The assist cam surface 231b3 includes a surface in which the cam radius becomes smaller as the first cam portion 231b rotates, at a portion different from the home cam surface 231b1.

The trigger gear 226, the driven gear 224, and the cam member 231 are arranged to be rotatable on the same axis, and the cam member 231 rotates in conjunction with the driven gear 224 due to the engagement portion 224c and the boss 231c engaging with each other.

The solenoid 228 includes the locking claw 228a and a return spring 228b. The return spring 228b urges the locking claw 228a in a direction to move toward the trigger gear 226. When the solenoid 228 is not in the state of being energized and the locking portion 226b is situated at a position facing the locking claw 228a, the locking claw 228a locks the locking portion 226b to restrict rotation of the trigger gear 226. When the solenoid 228 is energized, the locking claw 228a retreats from the trigger gear 226 against the urging force of the return spring 228b, and, in a case where the locking portion 226b has been locked by the locking claw 228a until then, locking of the locking portion 226b of the trigger gear 226 by the locking claw 228a is canceled.

The trigger spring 227 has one end fixed to the spring storage portion 226d of the trigger gear 226 and the other end fixed to a spring storage portion (not illustrated) of the driven gear 224, and effects urging in such a way as to rotate the locking portion 226b of the trigger gear 226 toward the locking claw 228a with respect to the driven gear 224. With this urging, when, upon energization of the solenoid 228, the locking claw 228a cancels locking of the locking portion 226b of the trigger gear 226, the trigger spring 227 applies rotation-starting force to the trigger gear 226, so that the gear portion 226a of the trigger gear 226 and the drive gear 225 mesh with each other.

The lever member 229 includes a swinging shaft 229a, and swings around the swinging shaft 229a serving as a rotational center while being in contact with the first cam portion 231b of the cam member 231 by the urging force of the home spring 230 having one end fixed.

Furthermore, although described below, when the cam member 231 is at a predetermined rotational phase, the lever member 229 effects urging in such a way as to press a surface in which the cam radius becomes smaller as the home cam surface 231b1 rotates by the urging force of the home spring 230. With this urging, the partially toothless gear portion 224b of the driven gear 224, which operates in conjunction with the cam member 231, becomes facing the drive gear 225, so that, even when the gear portion 224a is unable to obtain a sufficient driving force from the drive gear 225, it becomes possible to rotate the driven gear 224 by such pressing force of the home spring 230.

Moreover, when the driven gear 224 is in a home position, which is a standby state in which the gear portion 224a and the drive gear 225 do not mesh with each other, the lever member 229 comes into contact with a surface in which the cam radius is the smallest of the home cam surface 231b1 in such a way as to urge the surface toward the center of the cam member 231. Therefore, the cam member 231 and the driven gear 224 are restricted from rotation by the pressing force of the home spring 230.

Next, the arrangement of the trigger gear 226 and the driven gear 224 is described. As with the first clutch CL1 in the first exemplary embodiment, the trigger gear 226 and the driven gear 224 engage with each other in such a manner that there is play between them in the rotational direction, and the trigger gear 226 is able to rotate by the amount of play around the rotation center with respect to the driven gear 224. Here, in a case where the trigger gear 226 and the driven gear 224 are situated in the standby position (home position), there is a phase difference corresponding to 0.5 teeth between the gear portion 226a of the trigger gear 226 and the gear portion 224a of the driven gear 224, and the trigger gear 226 is configured to be able to rotate by an amount corresponding to 2.5 teeth with respect to the driven gear 224.

[Operation of Third Clutch CL3]

Next, a driving force transmission operation from the third clutch CL3 to the second feeding portion F2 is described with reference to FIGS. 25A and 25B and FIGS. 28A and 28B to FIG. 32. Figures with figure numbers having a suffix "A" out of FIGS. 28A and 28B to FIGS. 31A and 31B are views of an operation relationship between the cam member, the lever member, the first follower, and the second follower in the third clutch CL3 as viewed from the front side thereof, and figures with figure numbers having a suffix "B" out of 28A and 28B to FIGS. 31A and 31B are views of those in the third clutch CL3 as viewed from the back side thereof. FIG. 32 is a relationship diagram between a rotation torque of the cam member 231 and a cam radius of the first cam portion 231b.

Rotational directions and operational directions of the respective members illustrated in FIGS. 28A and 28B to FIG. 32 are represented by arrows drawn near the respective members.

FIGS. 25A and 25B and FIGS. 28A and 28B illustrate a standby state of the third clutch CL3.

Figure 28A:
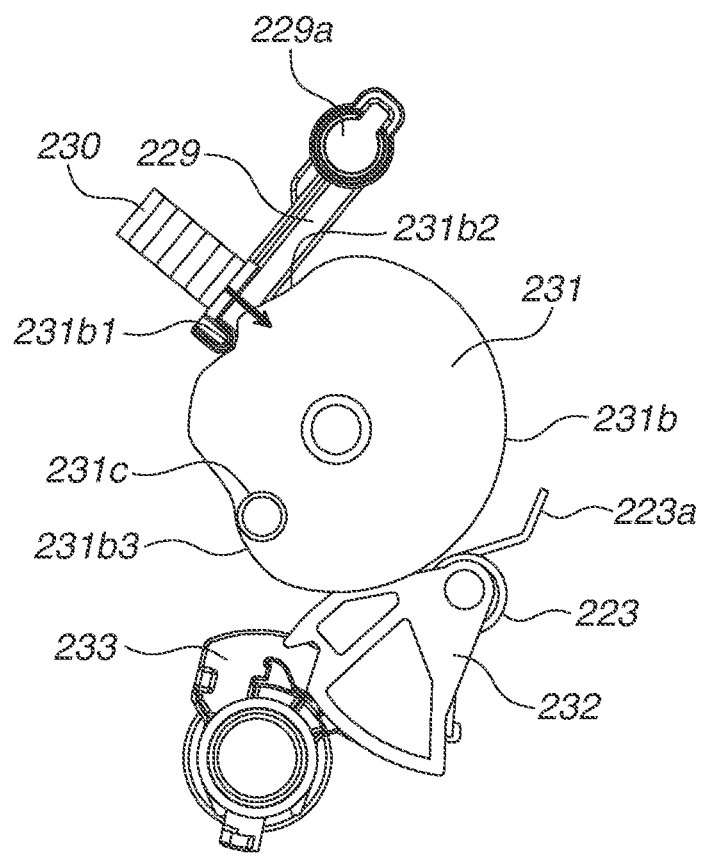
FIG. 28A is a diagram illustrating the third clutch as viewed from the front side.

In the standby state of the third clutch CL3, as illustrated in FIG. 28A, the drive gear 225 rotates, and the lever member 229 is in contact with a surface in which the cam radius in the home cam surface 231b1 is the smallest of the first cam portion 231b to urge the cam member 231 toward the rotation center thereof. In this state, the driven gear 224, which operates in conjunction with the cam member 231, is held at a home position (not illustrated), in which the partially toothless gear portion 224b faces the drive gear 225, so that driving force is not transmitted from the drive gear 225 to the driven gear 224. The partially toothless gear portion 224d of the driven gear 224 also faces the idler gear 220, so that the gear portion 224a of the driven gear 224 does not mesh with the idler gear 220.

Moreover, as illustrated in FIG. 25A, while the trigger gear 226 is urged in such a way as to rotate counterclockwise by the trigger spring 227, since the locking portion 226b is locked by the locking claw 228a of the solenoid 228, the trigger gear 226 is at a stop. In this state, since the partially toothless gear portion 226c of the trigger gear 226 faces the drive gear 225, driving force of the drive gear 225 is not transmitted to the trigger gear 226.

Figure 28B:
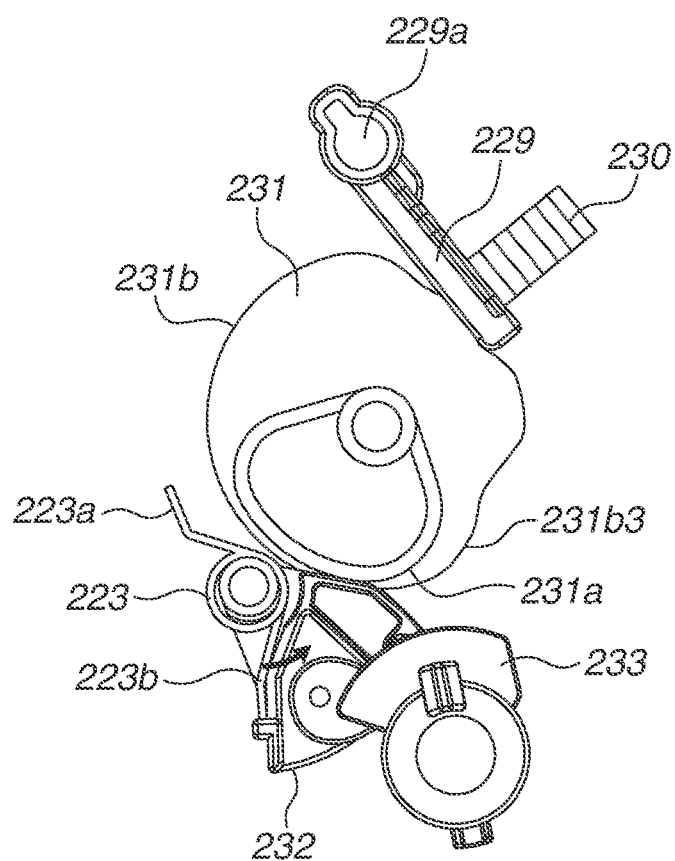
FIG. 28B is a diagram illustrating the third clutch as viewed from the back side.

As illustrated in FIG. 28B, the first follower 232 is in contact with the second cam portion 231a of the cam member 231 by the urging force of the pick spring 223. In this state, as with FIG. 24A, the pick roller 208 is in the ascended position, in which the pick roller 208 has retreated from the stacking tray 209, illustrated in FIG. 33, and is thus in a position separating from the recording material S.

Next, to perform driving force transmission by the third clutch CL3, as with the first clutch CL1 in the above-described first exemplary embodiment, first, it is necessary to rotate the trigger gear 226. Therefore, the solenoid 228 is energized to cause the locking claw 228a to retreat from the locking portion 226b of the trigger gear 226, so that locking of the locking portion 226b by the locking claw 228a is canceled. Then, the trigger gear 226 starts to rotate counterclockwise by the elastic force of the trigger spring 227. At this time, the home cam surface 231b1 of the cam member 231 is pressed toward the rotation center thereof by the lever member 229, so that the driven gear 224 is restricted from rotation. Thus, the driven gear 224 is restricted from rotation by the pressing force (urging force) of the home spring 230. Therefore, the driven gear 224 does not rotate even when receiving the urging force of the trigger spring 227. When the trigger gear 226 rotates, the gear portion 226a of the trigger gear 226 and the drive gear 225 mesh with each other, so that the trigger gear 226 rotates by receiving driving force from the drive gear 225.

When the trigger gear 226 rotates by receiving driving force from the drive gear 225, play between the trigger gear 226 and the driven gear 224 in the rotational direction disappears, so that the gear portion 224a of the driven gear 224 starts to rotate after a delay of three teeth with respect to the gear portion 226a of the trigger gear 226. After that, the gear portion 224a of the driven gear 224 and the drive gear 225 mesh with each other, so that driving force is transmitted from the drive gear 225 to the driven gear 224. When the driven gear 224 rotates by being driven by the rotation of the drive gear 225, the lever member 229 swings in a direction to compress the home spring 230 while being in sliding contact with a surface in which the cam radius in the home cam surface 231b1 becomes larger, so that the elastic force of the home spring 230 is charged.

Furthermore, after the locking claw 228a of the solenoid 228 cancels locking of the locking portion 226b and the trigger gear 226 rotates, energization of the solenoid 228 is stopped. Therefore, the locking claw 228a is moved by the return spring 228b in a direction to come close to the trigger gear 226, so that the locking claw 228a stands by at a position where the locking claw 228a is able to lock the locking portion 226b.

Figure 29A:
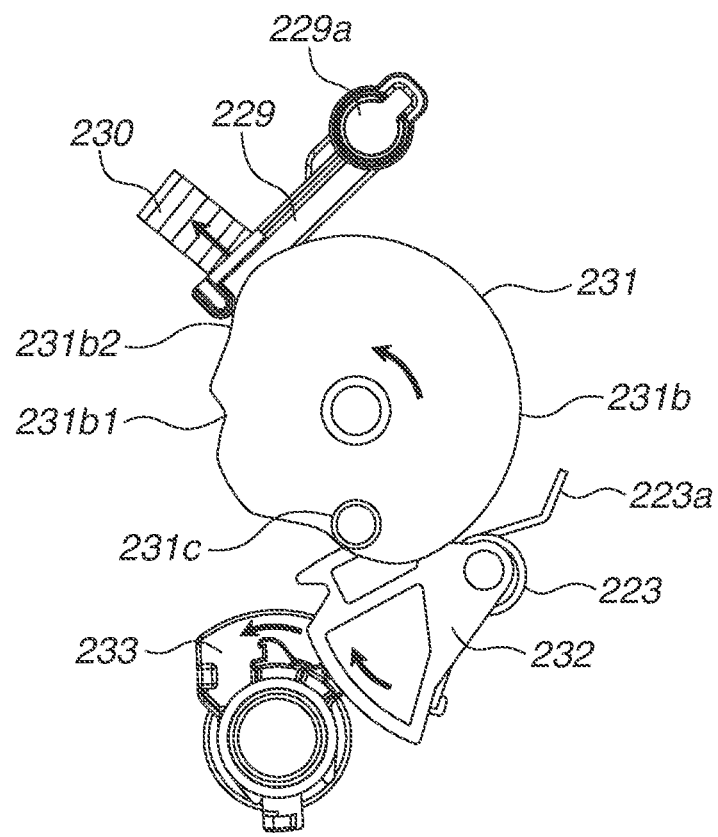
FIG. 29A is a diagram illustrating the third clutch as viewed from the front side.
Figure 29B:
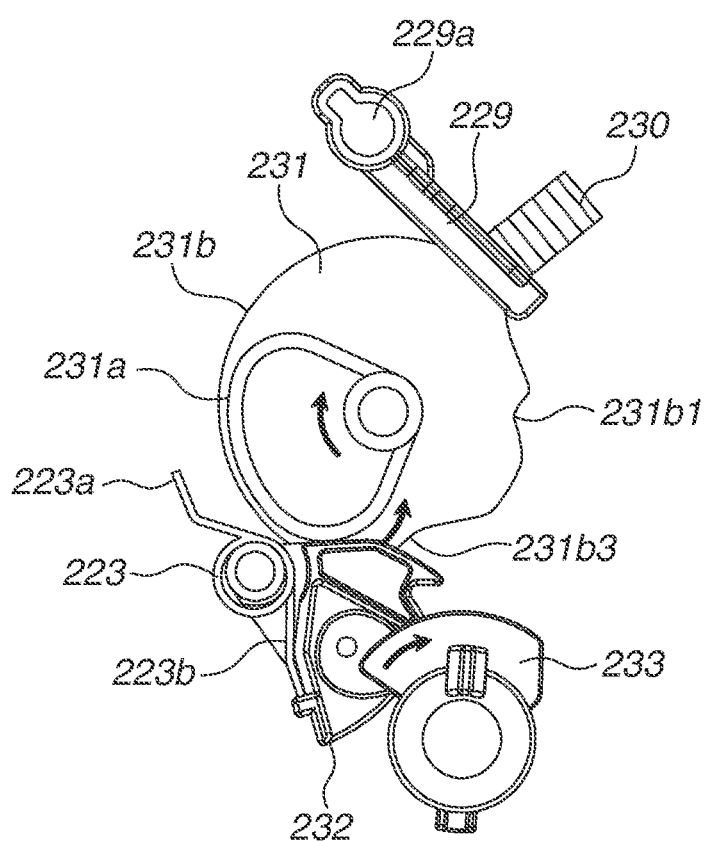
FIG. 29B is a diagram illustrating the third clutch as viewed from the back side.

Next, in a state illustrated in FIGS. 29A and 29B, the cam member 231 rotates, so that the second cam portion 231a of the cam member 231 causes the first follower 232 to operate. With this rotation, the first follower 232 is swung by the urging force of the pick spring 223, so that the second follower 233 swings in conjunction with the first follower 232. At this time, the first follower 232 causes an inverse input torque to be generated at the driven gear 224, which is on the side of the cam member 231, by the urging force of the pick spring 223. Here, the inverse input torque is a torque in which, when the pick arm 222 starts descending by the rotation of the first follower 232, the urging force of the pick spring 223 for urging the pick arm 222 in a direction to descend acts on the cam member 231 further in a rotational direction.

When the first follower 232 operates, the lever member 229 starts coming into contact with the cancel cam surface 231b2, in which the cam radius becomes larger as the first cam portion 231b rotates. With this contact, the lever member 229 swings in such a way as to further compress the home spring 230 to charge the elastic force of the home spring 230. Thus, the cancel cam surface 231b2 acts on the home spring 230 (the lever member 229) in such a way as to charge the elastic force of the home spring 230 according to an operation in which the first follower 232 releases the elastic force of the pick spring 223 by the rotation of the second cam portion 231a. In this way, a force for charging the elastic force of the home spring 230 causes a cancel torque which is opposite to the inverse input torque generated at the cam member 231 to be generated. Therefore, it is possible to reduce a torque variation of the cam member 231, which is rotated by receiving driving force from the drive source D.

Figure 30A:
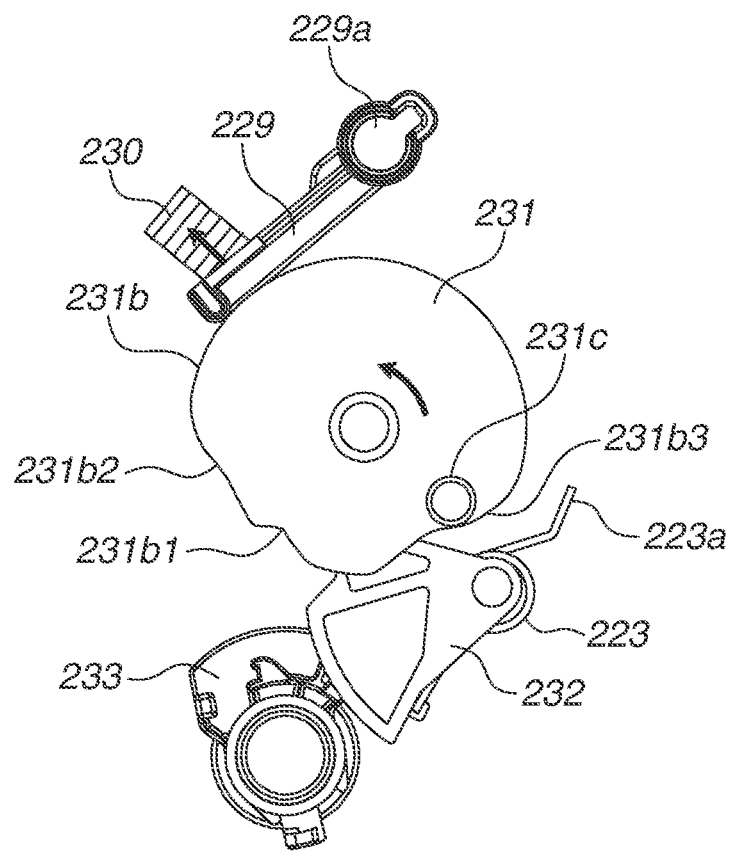
FIG. 30A is a diagram illustrating the third clutch as viewed from the front side.
Figure 30B:
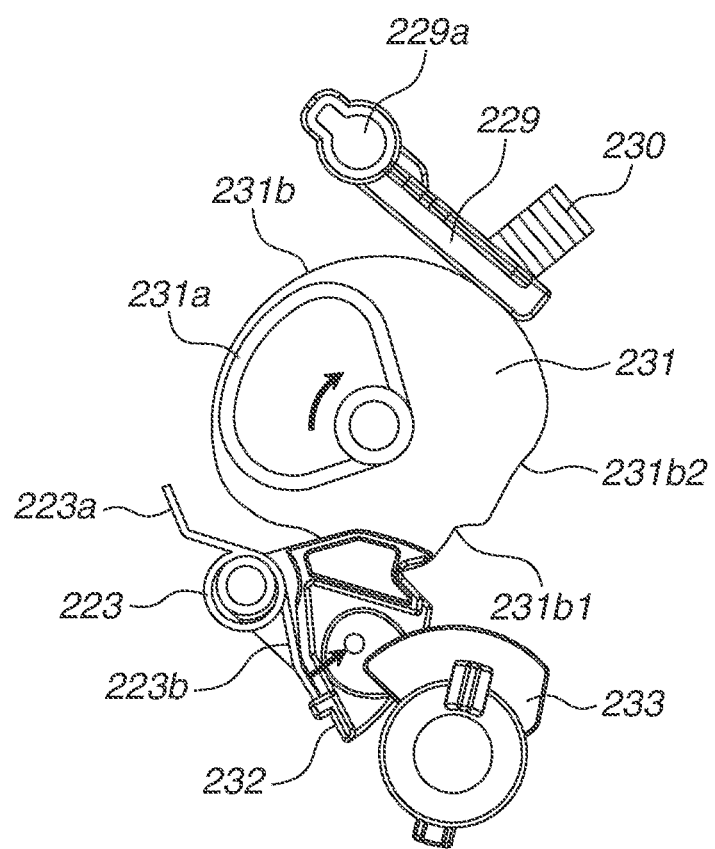
FIG. 30B is a diagram illustrating the third clutch as viewed from the back side.
Figure 31A:
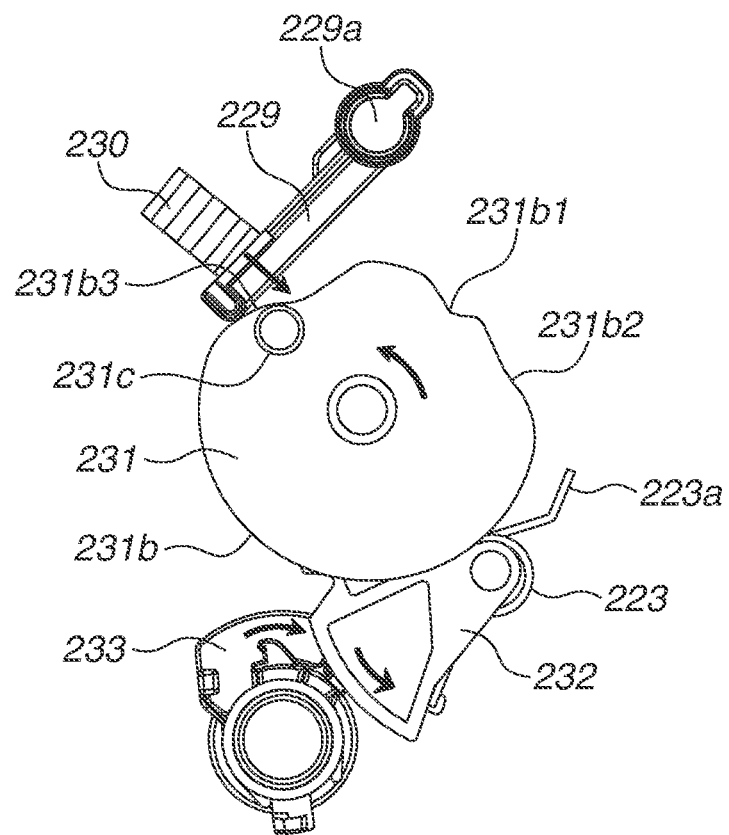
FIG. 31A is a diagram illustrating the third clutch as viewed from the front side.
Figure 31B:
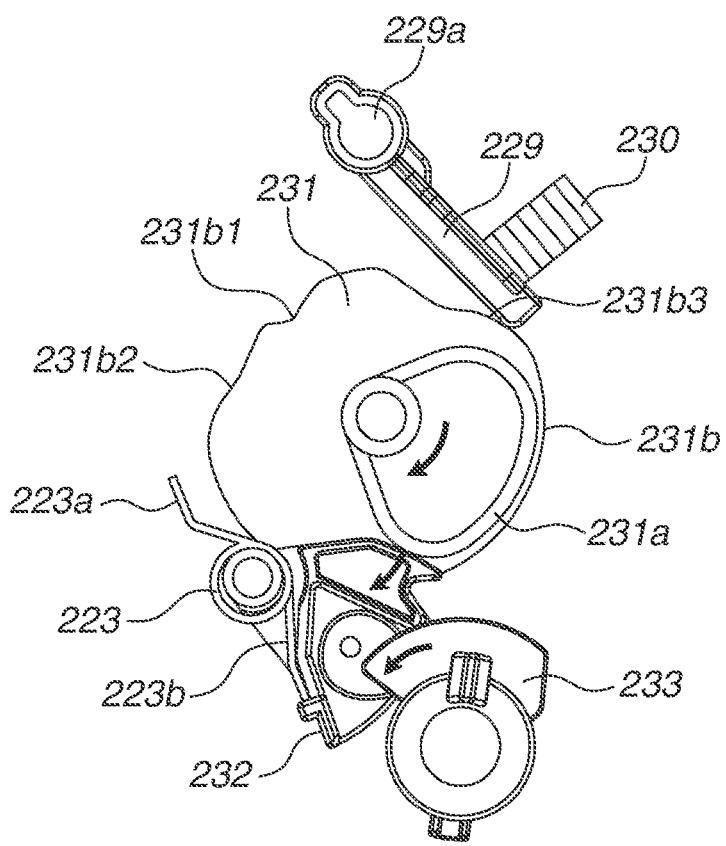
FIG. 31B is a diagram illustrating the third clutch as viewed from the back side.

Next, in a state illustrated in FIGS. 30A and 30B, the cam member 231 further rotates from the state illustrated in FIGS. 29A and 29B, so that the second cam portion 231a of the cam member 231 completes an operation of the first follower 232.

In this state, since the pick roller 208 illustrated in FIG. 24B is in the state of being in the descended position, no inverse input torque is generated at the cam member 231 by the urging force of the pick spring 223. Moreover, the lever member 229 is in contact with a surface in which the cam radius of the first cam portion 231b is the largest. With this contact, the elastic force obtained by the lever member 229 most compressing the home spring 230 is charged. When the cam member 231 further rotates, the gear portion 224a illustrated in FIG. 26 starts meshing with the idler gear 220, so that the pick roller 208 (see FIG. 33) starts rotating.

Next, in a state illustrated in FIGS. 31A and 31B, the cam member 231 rotates, the second cam portion 231a of the cam member 231 further causes the first follower 232 to swing, and the pick roller 208 (see FIG. 33) starts an ascending operation. At this time, a drive torque for causing the first follower 232 to swing is generated at the cam member 231. Here, the drive torque is a torque generated in a case where, when the pick arm 222 starts ascending by the rotation of the cam member 231, a force for moving the pick arm 222 in a direction to ascend against the urging force of the pick spring 223 acts on the cam member 231 in a direction opposite to the rotational direction.

Since the drive torque charges the elastic force of the pick spring 223, the drive torque gradually increases in proportion to the angle of swinging of the first follower 232, and, after the first follower 232 has swung by a predetermined angle, the drive torque decreases up to a drive torque corresponding to a sliding contact resistance between the second cam portion 231a and the first follower 232.

In conformity with the rotational phase of the cam member 231 in which the drive torque becomes larger, the lever member 229 starts coming into contact with the assist cam surface 231b3 in which the cam radius becomes smaller as the first cam portion 231b rotates. With this contact, the assist cam surface 231b3 acts on the home spring 230 (the lever member 229) in such a way as to release the elastic force of the home spring 230 according to an operation in which the first follower 232 charges the elastic force of the pick spring 223 by the second cam portion 231a. In this way, the home spring 230 is expanded by the assist cam surface 231b3 in which the cam radius becomes smaller, so that an assist torque for canceling out a drive torque generated at the cam member 231 is generated. Therefore, it is possible to reduce torque variations of the cam member 231, which is rotated by receiving driving force from the drive source D.

When the cam member 231 further rotates, the partially toothless gear portion 224d faces the idler gear 220 as illustrated in FIG. 25A, so that the gear portion 224a becomes not meshing with the idler gear 220 and the pick roller 208 (see FIG. 33) stops rotating. Moreover, when the trigger gear 226 has made one revolution, the locking portion 226b collides with the locking claw 228a of the solenoid 228 and is thus locked and stopped from rotation.

Next, in the state illustrated in FIGS. 31A and 31B, when the cam member 231 further rotates, the lever member 229 presses a surface in which the cam radius becomes smaller as the first cam portion 231b in the home cam surface 231b1 rotates, by the urging force of the home spring 230. With this pressing, the lever member 229 causes the driven gear 224 to rotate up to the home position, in which the partially toothless gear portion 224b faces the drive gear 225.

As described above, according to the third exemplary embodiment, when causing the first follower 232 to operate by the rotation of the cam member 231, the third clutch CL3 is able to reduce an inverse input torque generated at the cam member 231 with a cancel torque. Moreover, the third clutch CL3 is able to reduce striking sound caused by the generation of an inverse input torque.

Moreover, when the cam member 231 rotates and the second cam portion 231a causes the first follower 232 to operate again to charge the elastic force of the pick spring 223, the third clutch CL3 is able to reduce a drive torque generated at the cam member 231 with an assist torque. This enables reducing, in the state illustrated in FIGS. 25A and 25B, the amount of increasing variation of drive torque of the drive source D, which drives the driven gear 224.

Furthermore, the shape and arrangement position of the cancel cam surface 231b2 and the assist cam surface 231b3 in the first cam portion 231b described in the third exemplary embodiment have relevance to the timing at which the second cam portion 231a of the cam member 231 causes the first follower 232 to swing.

Such relevance is described with reference to FIG. 32. First, a rotation torque shown in FIG. 32 is a torque which the cam member 231 receives from the first follower 232.

As illustrated in FIG. 32, at the timing of an operation 1 of the first follower, in which the cam member 231 rotates to cause the pick arm 222 to descend, an inverse input torque is generated at the cam member 231.

At the time of the operation 1 of the first follower, as long as a surface in which the cam radius becomes larger as the first cam portion 231b rotates is used, a cancel torque opposite to an inverse input torque generated at the cam member 231 is able to be generated. Thus, the cancel cam surface 231b2 can be adjacent to a surface in which the cam radius of the home cam surface 231b1 becomes larger. The cancel cam surface 231b2 does not necessarily need to have a cam shape in which, for example, a surface in which the cam radius of the cancel cam surface 124b2 is large shifts to a surface in which the cam radius becomes smaller as in the first clutch CL1 in the above-described first exemplary embodiment. Moreover, if the cancel cam surface 231b2 is larger than the range of the operation 1 of the first follower, an inverse input torque becomes unlikely to be generated.

Next, when the cam member 231 further rotates, at the timing of an operation 2 of the first follower, which is an operation to cause the pick arm 222 to ascend, a large drive torque is generated at the cam member 231.

At the time of the operation 2 of the first follower, as long as a surface in which the cam radius becomes smaller as the first cam portion 231b rotates is used, a drive torque generated at the cam member 231 is able to be reduced. Thus, the assist cam surface 231b3 can be adjacent to a surface in which the cam radius of the home cam surface 231b1 becomes smaller. The assist cam surface 231b3 does not necessarily need to have a cam shape in which, for example, a surface in which the cam radius of the assist cam surface 124b3 is small shifts to a surface in which the cam radius becomes larger as in the second clutch CL2 in the above-described second exemplary embodiment. Moreover, if the assist cam surface 231b3 is arranged in the vicinity of the timing at which the drive torque becomes largest in the range of the operation 2 of the first follower, the maximum value of the drive torque is able to be reduced.

[Intermediate Transfer Unit T]

Figure 34A:
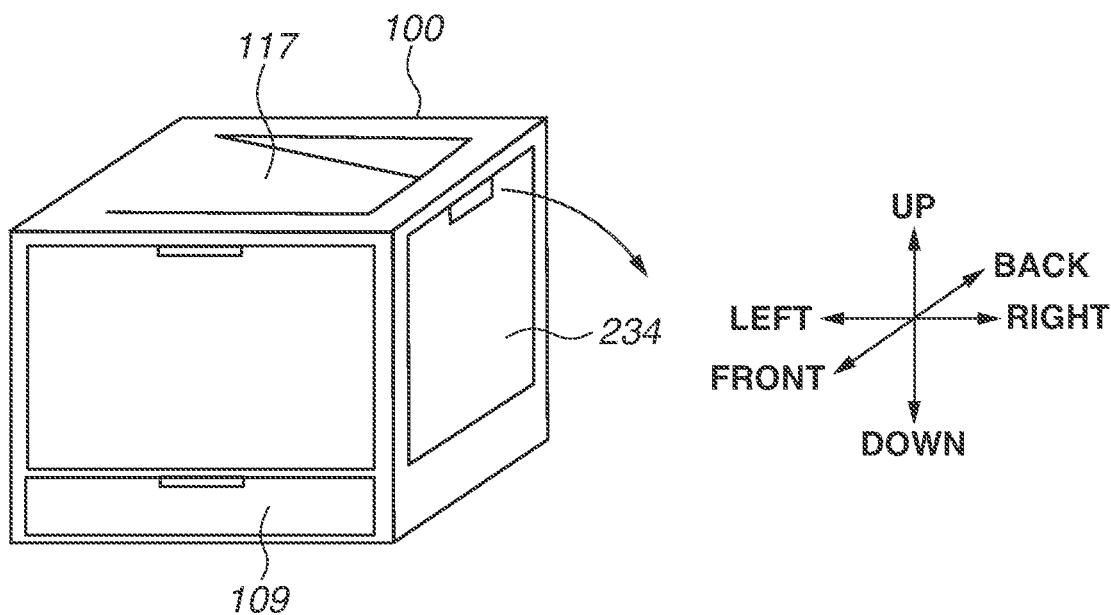
FIGS. 34A and 34B are replacement explanatory diagrams of an intermediate transfer unit in the image forming apparatus.
Figure 34B:
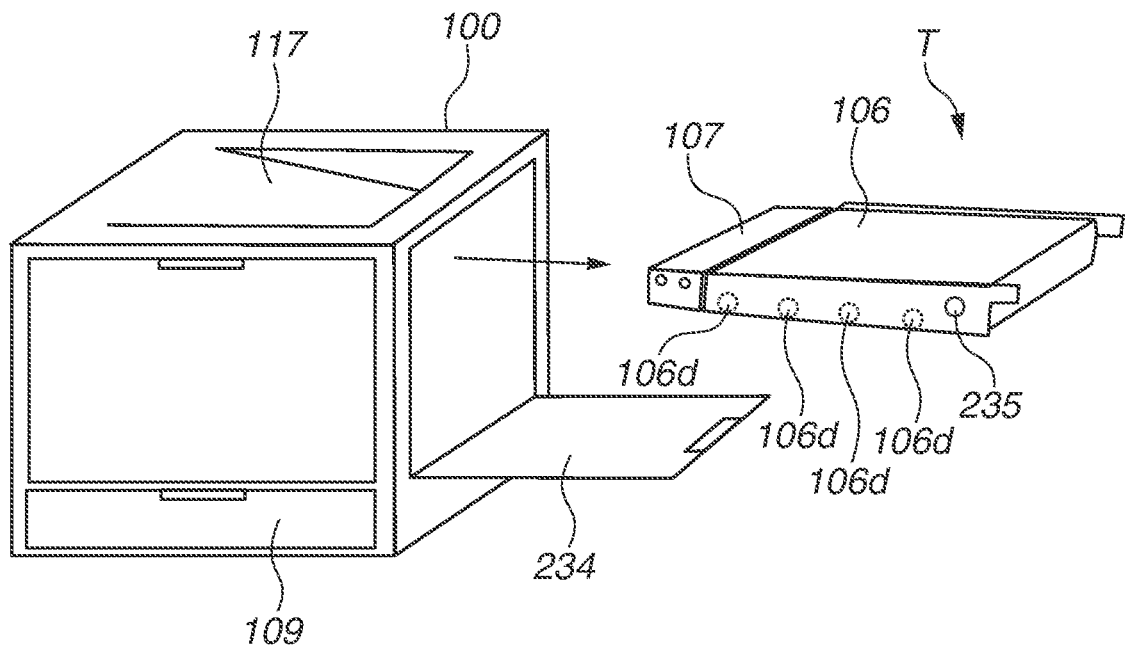

Next, an intermediate transfer unit T included in an image forming apparatus 100 according to a fourth exemplary embodiment is described with reference to FIGS. 34A and 34B to FIGS. 37A and 37B. FIGS. 34A and 34B are replacement explanatory diagrams of the intermediate transfer unit T in the image forming apparatus 100, and FIGS. 35A and 35B to FIGS. 37A and 37B are operation explanatory diagrams of an inner portion of the intermediate transfer unit T.

As illustrated in FIGS. 34A and 34B, in the image forming apparatus 100, when a right door 234 provided on the right side surface of the image forming apparatus 100 is opened, the intermediate transfer unit T is able to be pulled out rightward as viewed in FIGS. 34A and 34B, so that the intermediate transfer unit T is configured to be replaceable.

The intermediate transfer unit T is composed of, for example, a belt 106 and four primary transfer rollers 106d, and includes a drive shaft 235, to which driving force is transmitted from a drive source (not illustrated) included in the image forming apparatus 100.

As illustrated in FIGS. 35A and 35B to FIGS. 37A and 37B, the intermediate transfer unit T includes, besides the above-mentioned components, a drive cam 236, a slider 237, and a slider spring 238, and further includes four primary transfer roller supporting members 239 and four transfer roller pressure springs 240.

The drive cam 236 is coaxially coupled to the rotation shaft of the drive shaft 235, and includes three actuation surfaces 236a, 236b, and 236c. The first actuation surface 236a, the second actuation surface 236b, and the third actuation surface 236c are arranged at intervals of 120 degrees in the rotational direction. The cam radii of the respective actuation surfaces (each of which is a radius from the center of the drive shaft 235 to the circumferential surface of the drive cam 236) are in a relationship of "the first actuation surface 236a>the second actuation surface 236b>the third actuation surface 236c".

Next, an operation of the intermediate transfer unit T is described. In the intermediate transfer unit T, the primary transfer rollers 106d, which are supported by the primary transfer roller supporting members 239 in such a way as to be rotatable, are arranged in such a way as to respectively face the photosensitive drums 102Y, 102M, 102C, and 102B.

The slider 237 includes three ascending and descending cams 237a and one ascending and descending cam 237b, with which the primary transfer roller supporting members 239 come into contact. The interval between the rightmost ascending and descending cam 237a and the ascending and descending cam 237b is set larger than the interval between the ascending and descending cam 237a and the ascending and descending cam 237a adjacent to each other. Moreover, the slider 237 is able to slide (able to move) in the left-right directions as viewed in FIGS. 35A and 35B (in directions along which a plurality of photosensitive drums is arranged side by side), and one end of the slider 237 in the moving direction is pressed toward the other end (rightward) by the slider spring 238 and the other end is in contact with the drive cam 236.

Each primary transfer roller supporting member 239 includes a swinging shaft 239a and is configured to be able to swing in such a way as to press, by the transfer roller pressure spring 240, the primary transfer roller 106d toward the associated photosensitive drum 102Y, 102M, 102C, or 102B with a predetermined urging force.

With such a configuration, the intermediate transfer unit T includes a mechanism in which, in response to the slider 237 operating by the rotation of the drive cam 236, the primary transfer rollers 106d ascend and descend with respect to the belt 106 according to an image forming operation of the image forming apparatus 100.

First, an operation for causing the primary transfer rollers 106d of the intermediate transfer unit T to ascend and descend with respect to the belt 106 is described.

As illustrated in FIGS. 35A and 35B to FIGS. 37A and 37B, the intermediate transfer unit T has three operation modes of the primary transfer roller 106d corresponding to an image forming operation of the image forming apparatus 100.

Figure 35A:
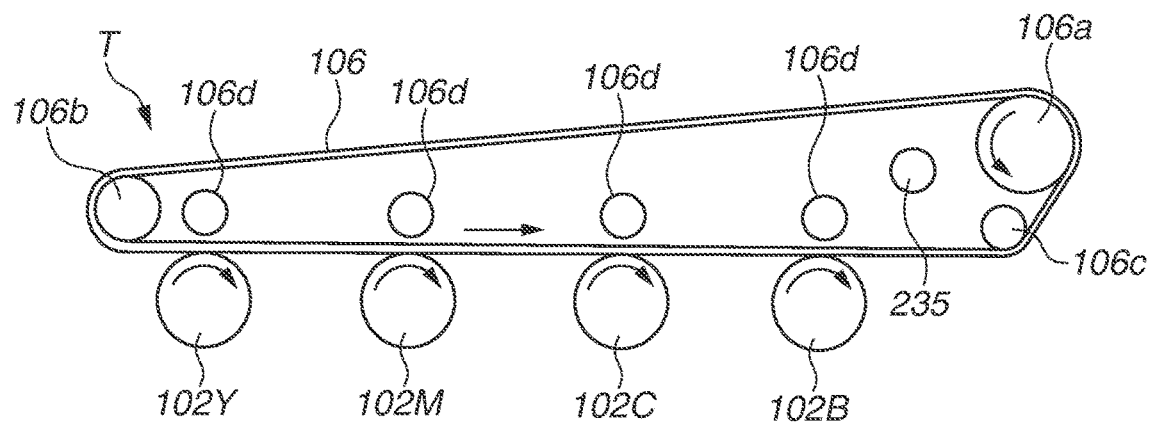
FIGS. 35A and 35B are operation explanatory diagrams of an inner portion in the intermediate transfer unit.
Figure 35B:
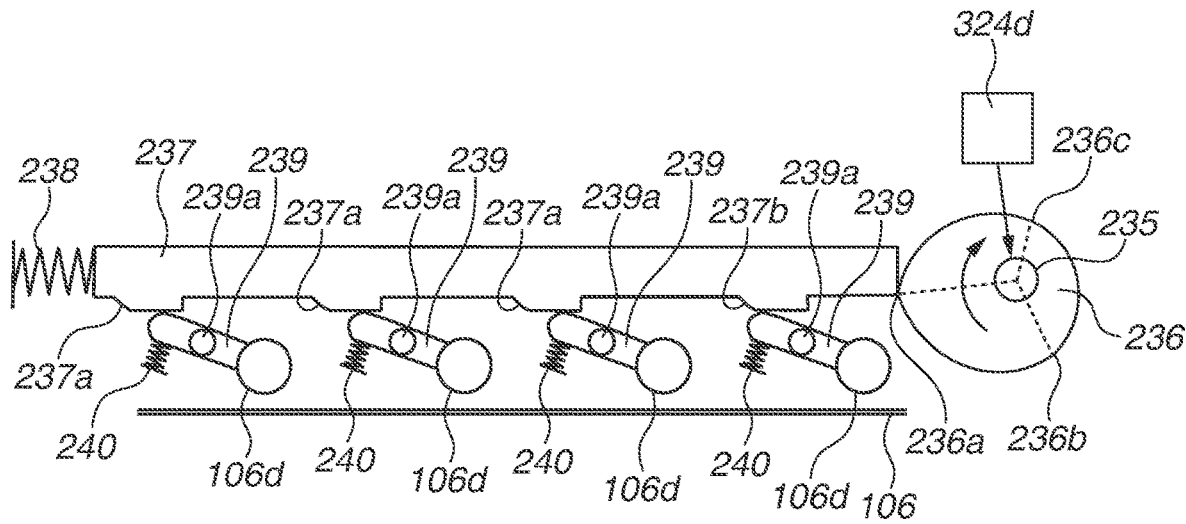

In the first operation mode, as illustrated in FIGS. 35A and 35B, the slider 237 is in contact with the first actuation surface 236a of the drive cam 236. In this state, the primary transfer roller supporting members 239 are in contact with the ascending and descending cams 237a and the ascending and descending cam 237b of the slider 237, and all of the primary transfer rollers 106d are in an ascended position where they are separate from the belt 106. This is a state obtained before an image forming operation of the image forming apparatus 100 is performed.

Figure 36A:
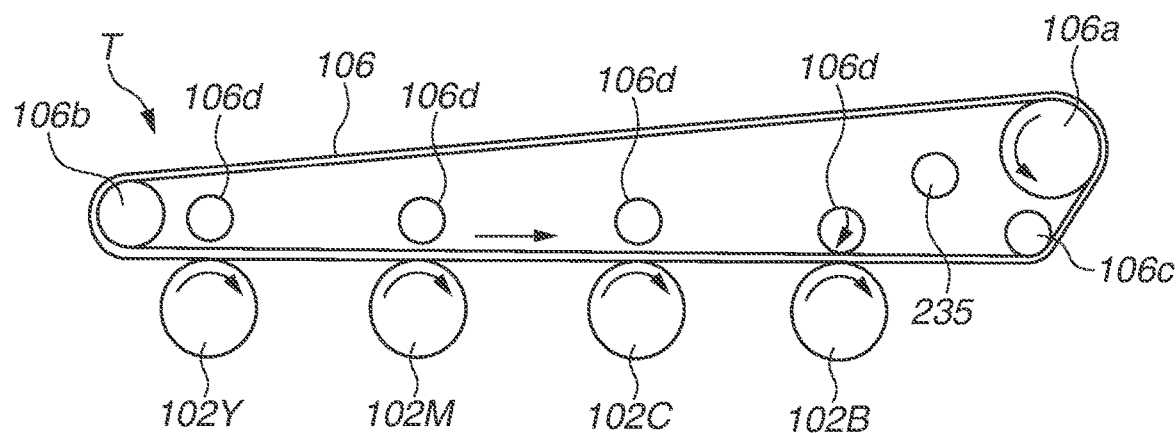
FIGS. 36A and 36B are operation explanatory diagrams of the inner portion in the intermediate transfer unit.
Figure 36B:
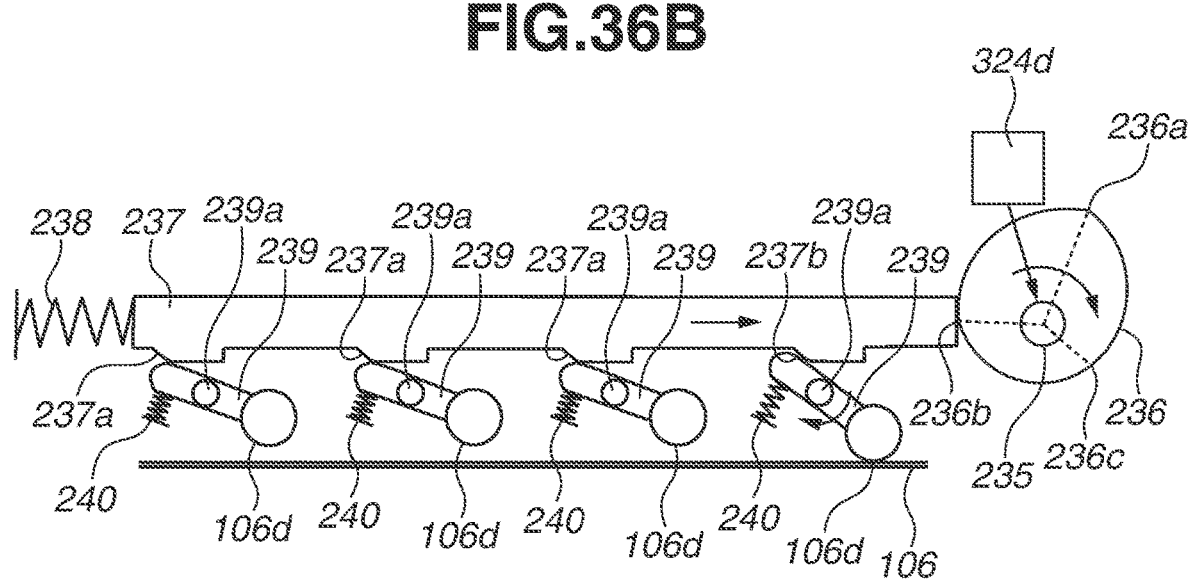

In the second operation mode, as illustrated in FIGS. 36A and 36B, the drive cam 236 rotates clockwise by 120 degrees, and the slider 237 slides rightward from the state illustrated in FIG. 35B and is in contact with the second actuation surface 236b of the drive cam 236. In this state, the primary transfer roller supporting member 239 of the primary transfer roller 106d facing the photosensitive drum 102B is separate from the ascending and descending cam 237b, so that the primary transfer roller 106d facing the photosensitive drum 102B is in a descended position where the primary transfer roller 106d is in contact with the belt 106. The other three primary transfer roller supporting members 239 are still in contact with the ascending and descending cams 237a, so that the corresponding three primary transfer rollers 106d are in the ascended position where they are separate from the belt 106. This is a state obtained when an image forming operation for black color of the image forming apparatus 100 is performed.

Figure 37A:
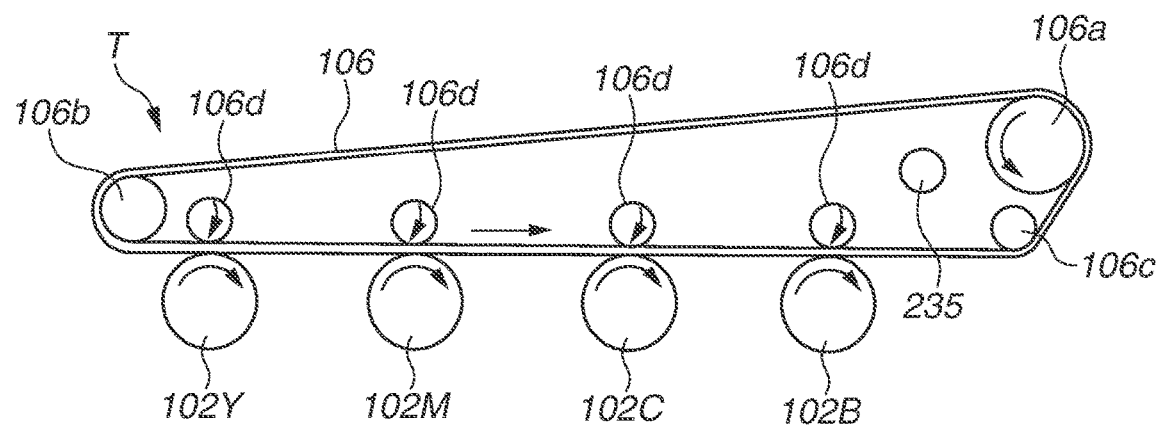
FIGS. 37A and 37B are operation explanatory diagrams of the inner portion in the intermediate transfer unit.
Figure 37B:
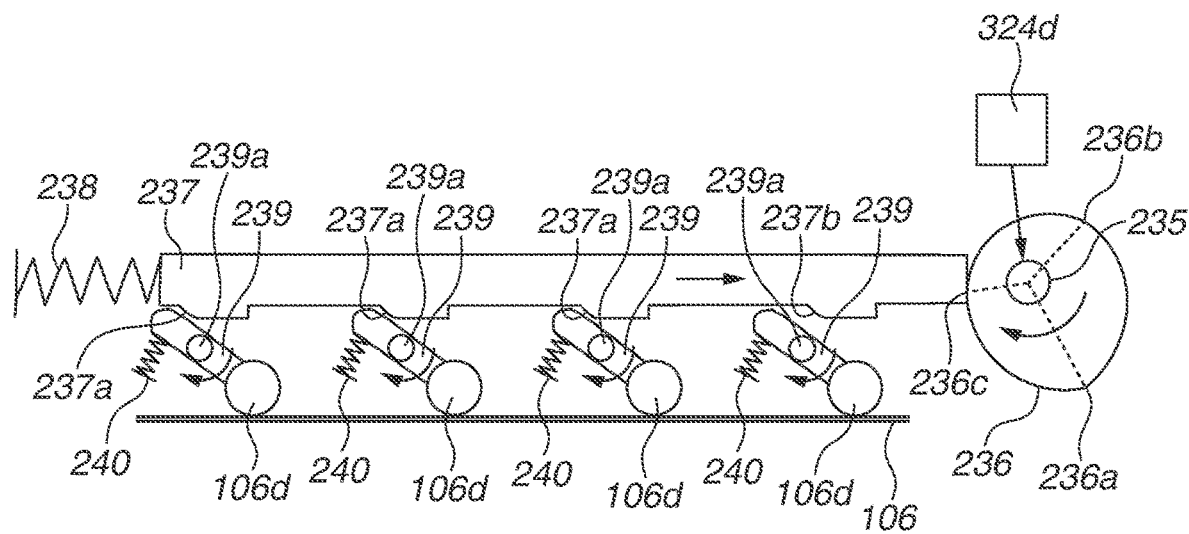

In the third operation mode, as illustrated in FIGS. 37A and 37B, the drive cam 236 rotates clockwise further by 120 degrees, and the slider 237 further slides rightward from the state illustrated in FIG. 36B and is in contact with the third actuation surface 236c of the drive cam 236. In this state, the primary transfer roller supporting members 239 are separate from the ascending and descending cams 237a and the ascending and descending cam 237b of the slider 237, so that all of the primary transfer rollers 106d are in the descended position where they are in contact with the belt 106. This is a state obtained when an image forming operation for full colors of the image forming apparatus 100 is performed.

Additionally, when, from the state of the third operation mode illustrated in FIG. 37B, the drive cam 236 rotates clockwise further by 120 degrees, the slider 237 slides leftward and comes into contact with the first actuation surface 236a of the drive cam 236, so that the intermediate transfer unit T returns to the first operation mode illustrated in FIG. 35B. In this way, the operation modes are switched each time the drive cam 236 rotates by 120 degree.

Here, in the first operation mode illustrated in FIGS. 35A and 35B, all of the transfer roller pressure springs 240 are in a state in which the elastic force thereof is charged.

When the first operation mode transitions to the second operation mode illustrated in FIGS. 36A and 36B, the slider 237 causes an inverse input torque to be generated at the drive cam 236. This is because the primary transfer roller supporting member 239 which supports the primary transfer roller 106d facing the photosensitive drum 102B presses the ascending and descending cam 237b of the slider 237 rightward by the urging force of the transfer roller pressure spring 240.

When the second operation mode transitions to the third operation mode illustrated in FIGS. 37A and 37B, the slider 237 causes an inverse input torque larger than the inverse input torque generated when the first operation mode transitions to the second operation mode to be generated at the drive cam 236. This is because the three primary transfer roller supporting members 239 which support the primary transfer rollers 106d facing the photosensitive drums 102Y, 102M, and 102C press the ascending and descending cams 237a of the slider 237 rightward by the urging force of the transfer roller pressure springs 240.

When the third operation mode transitions to the first operation mode illustrated in FIGS. 35A and 35B, the slider 237 causes a relatively large drive torque for charging the elastic force of the four transfer roller pressure springs 240 to be generated at the drive cam 236. This is because three ascending and descending cams 237a and one ascending and descending cam 237b cause all of the primary transfer roller supporting members 239 to swing to the ascended position, thus charging the elastic force of all of the transfer roller pressure springs 240.

[Fourth Clutch CL4]

Next, a configuration of a fourth clutch CL4 serving as a driving force transmission device according to the fourth exemplary embodiment, which performs transmission and blocking of driving force with respect to the drive shaft 235, is described with reference to FIGS. 38A and 38B and FIG. 39.

Figure 38A:
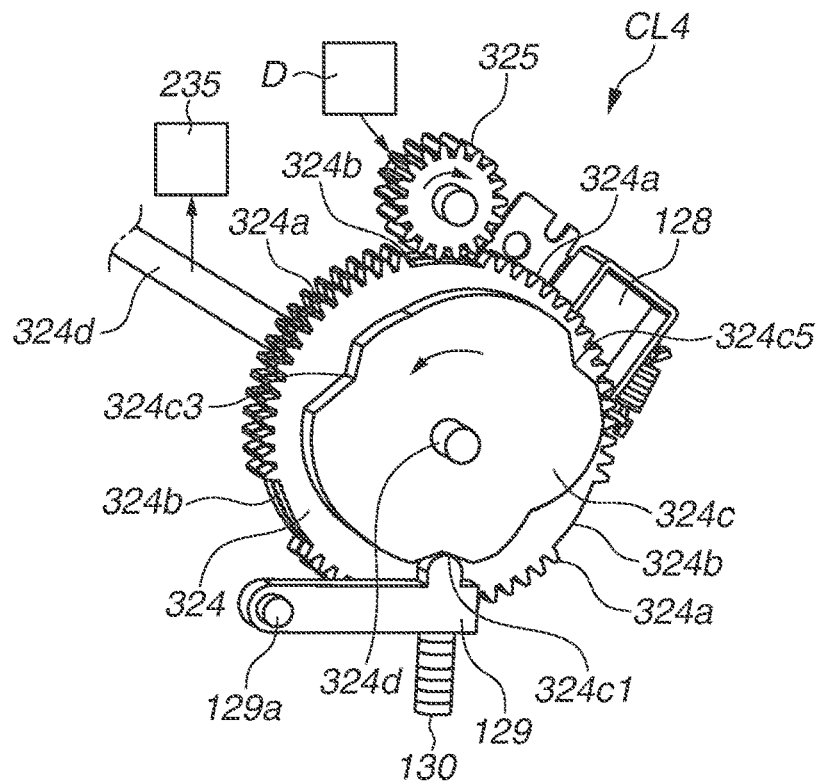
FIGS. 38A and 38B are perspective views of a fourth clutch.
Figure 38B:
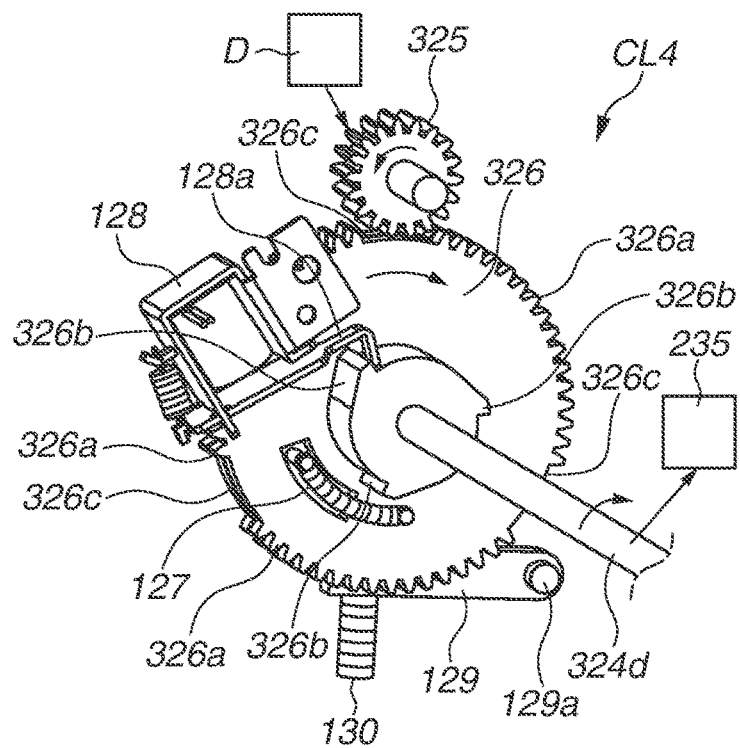

FIGS. 38A and 38B are perspective views of the fourth clutch CL4, in which FIG. 38A illustrates a view of the fourth clutch CL4 as viewed from one side in the axial direction (from the side of a driven gear 324) and FIG. 38B illustrates a view of the fourth clutch CL4 as viewed from the other side in the axial direction (from a side opposite to the side of the driven gear 324). FIG. 39 is a front view of the driven gear 324 in the fourth clutch CL4. Rotational directions and operational directions of the respective members illustrated in FIGS. 38A and 38B and FIG. 39 are represented by arrows drawn near the respective members.

Figure 39:
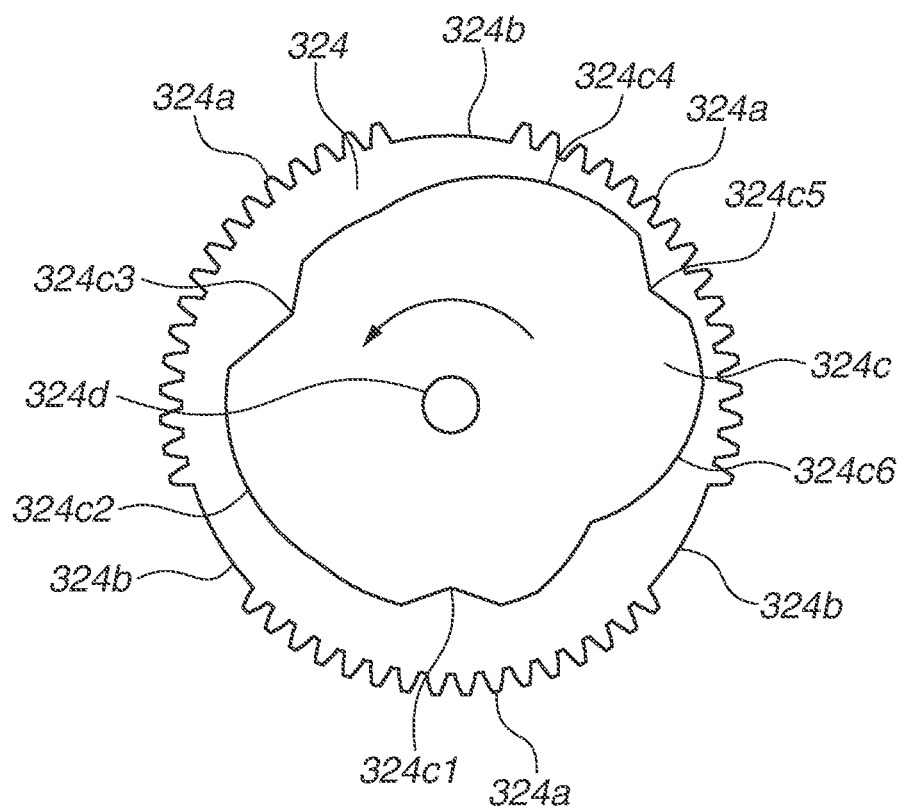
FIG. 39 is a front view of a driven gear in the fourth clutch.

As illustrated in FIGS. 38A and 38B and FIG. 39, the fourth clutch CL4 includes a drive gear 325, which is always coupled to a drive source D to rotate, a driven gear 324 and a trigger gear 326, each of which is able to mesh with the drive gear 325, and a trigger spring 127. Moreover, the fourth clutch CL4 includes a solenoid 128, which is a regulation unit for regulating the rotation of the trigger gear 326, and a home spring 130, which is a first elastic member for applying urging force to a lever member 129. The home spring 130, which is the first elastic member, applies urging force to the lever member 129 to bring the lever member 129 into contact with a cam portion 324c of the driven gear 324, which is described below.

Additionally, the fourth clutch CL4 includes a cam portion 324c serving as a first cam member and a drive cam 236 serving as a second cam member, each of which rotates in conjunction with the rotation of the driven gear 324. Although described below, in the fourth exemplary embodiment, the cam portion 324c is configured integrally with the driven gear 324 and rotates together with the driven gear 324, and the drive cam 236 rotates in conjunction with the driven gear 324.

A driving force coming from the drive source D is transmitted from the drive gear 325 of the fourth clutch CL4 to the driven gear 324 to rotate the drive shaft 235 of the intermediate transfer unit T via a shaft portion 324d of the driven gear 324.

The trigger gear 326 includes a gear portion 326a, which meshes with the drive gear 325, a locking portion 326b, the rotation of which is restricted by being locked by a locking claw 128a of the solenoid 128, and a partially toothless gear portion 326c, which does not mesh with the drive gear 325. The trigger gear 326 includes three gear portions 326a, three locking portions 326b, and three partially toothless gear portions 326c respectively at intervals of 120 degrees. The gear portion 326a has a plurality of teeth meshing with the teeth of the drive gear 325. The partially toothless gear portion 326c is provided at a part of the gear portion 326a, is a region having no teeth meshing with the teeth of the drive gear 325, and is in the form of a partially toothless gear corresponding to a predetermined number of teeth of the gear portion 326a.

The driven gear 324 includes a gear portion 324a, which meshes with the drive gear 325, and a partially toothless gear portion 324b, which does not mesh with the drive gear 325. In the driven gear 324, the gear portion 324a and the partially toothless gear portion 324b are alternately provided in the rotational direction. Moreover, the driven gear 324 includes three gear portions 324a and three partially toothless gear portions 324b respectively at intervals of 120 degrees. The gear portion 324a has a plurality of teeth meshing with the teeth of the drive gear 325. The partially toothless gear portion 324b is provided at a part of the gear portion 324a, is a region having no teeth meshing with the teeth of the drive gear 325, and is in the form of a partially toothless gear corresponding to a plurality of teeth of the gear portion 324a.

The trigger gear 326 and the driven gear 324 are arranged in such a way as to be coaxially rotatable around the shaft portion 324d. The trigger gear 326 urges, by the trigger spring 127, the driven gear 324 in such a way as to rotate the locking portion 326b of the trigger gear 326 toward the locking claw 128a of the solenoid 128. Moreover, the trigger gear 326 and the driven gear 324 engage with each other in such a manner that there is play between them, as with the first clutch CL1 in the first exemplary embodiment, and the trigger gear 326 is able to rotate by the amount of play around the rotation center with respect to the driven gear 324.

The solenoid 128 restricts the rotation of the trigger gear 326 by the locking claw 128a locking the locking portion 326b of the trigger gear 326. When the solenoid 128 is energized, the locking claw 128a cancels locking of the locking portion 326b, the trigger gear 326 starts to rotate by the urging force of the trigger spring 127, and, additionally, the driven gear 324 starts to rotate after a delay of the above-mentioned amount of play. Moreover, energization of the solenoid 128 is performed in such a manner that the driven gear 324 rotates by ⅓ revolution (120 degrees) at a time.

Next, as illustrated in FIG. 39, the cam portion 324c of the driven gear 324 includes three home cam surfaces 324c1, 324c3, and 324c5, two cancel cam surfaces 324c2 and 324c4, and one assist cam surface 324c6.

The first home cam surface 324c1, the second home cam surface 324c3, and the third home cam surface 324c5 are provided at respective predetermined positions of the cam portion 324c of the driven gear 324 at intervals of 120 degrees. Each of the first home cam surface 324c1, the second home cam surface 324c3, and the third home cam surface 324c5 is in a concave shape, and has a surface in which the cam radius becomes smaller on the upstream side in the rotational direction and has a surface in which the cam radius becomes larger on the downstream side in the rotational direction.

The first cancel cam surface 324c2 is provided between the first home cam surface 324c1 and the second home cam surface 324c3, and has a surface in which the cam radius becomes larger as the driven gear 324 rotates counterclockwise. The second cancel cam surface 324c4 is provided between the second home cam surface 324c3 and the third home cam surface 324c5, and has a surface in which the cam radius becomes larger as the driven gear 324 rotates counterclockwise. The surface in which the cam radius becomes larger of the second cancel cam surface 324c4 is provided in such a manner that the amount of increase of the cam radius thereof becomes larger as the driven gear 324 rotates counterclockwise than that of the first cancel cam surface 324c2. The assist cam surface 324c6 is provided between the third home cam surface 324c5, and the first home cam surface 324c1, and has a surface in which the cam radius becomes smaller as the driven gear 324 rotates counterclockwise.

[Operation of Fourth Clutch CL4]

A driving force transmission operation from the fourth clutch CL4 to the drive shaft 235 and the drive cam 236 of the intermediate transfer unit T is described with reference to FIGS. 35A and 35B to FIGS. 38A and 38B and FIG. 40. FIG. 40 is a relationship diagram between the rotation torque of the driven gear 324 and the cam radius of the cam portion 324c.

As illustrated in FIG. 38A, the lever member 129 is in contact with the home cam surface 324c1. In this state, the driven gear 324 is held in the home position, in which the partially toothless gear portion 324b corresponding to the home cam surface 324c1 faces the drive gear 325, so that driving force is not transmitted from the drive gear 325 to the driven gear 324.

Moreover, in the state of the fourth clutch CL4 illustrated in FIGS. 38A and 38B, the intermediate transfer unit T is in the state of the first operation mode illustrated in FIGS. 35A and 35B. When the solenoid 128 is energized at the time of the state illustrated in FIGS. 38A and 38B, the shaft portion 324d of the driven gear 324 rotates clockwise as illustrated in FIG. 38B. The drive shaft 235 illustrated in FIG. 35A is configured to also rotate clockwise in conjunction with the rotation of the shaft portion 324d. With such an operation of the fourth clutch CL4, the drive cam 236 coupled to the drive shaft 235 rotates clockwise by 120 degrees and then stops.

At this time, the lever member 129 is in contact with the home cam surface 324c3, and the driven gear 324 is held in the home position, in which the partially toothless gear portion 324b corresponding to the home cam surface 324c3 faces the drive gear 325. In this state, the intermediate transfer unit T is in the state of the second operation mode illustrated in FIGS. 36A and 36B.

When the fourth clutch CL4 operates again, the drive cam 236 rotates by 120 degrees and then stops. At this time, the lever member 129 is in contact with the home cam surface 324c5, and the driven gear 324 is held in the home position, in which the partially toothless gear portion 324b corresponding to the home cam surface 324c5 faces the drive gear 325. In this state, the intermediate transfer unit T is in the state of the third operation mode illustrated in FIGS. 37A and 37B.

In this way, according to the driven gear 324 rotating by 120 degrees at a time, the intermediate transfer unit T switches between the operation modes.

Next, a relationship between a torque variation of the drive cam 236 occurring when the operation modes of the intermediate transfer unit T are switched as the driven gear 324 rotates and a cam radius in the cam portion 324c of the driven gear 324 is described with reference to FIG. 40. A rotation torque shown in FIG. 40 is a torque which the drive cam 236 receives from the slider 237.

As illustrated in FIG. 40, when the first operation mode transitions to the second operation mode, as mentioned above, an inverse input torque is generated at the drive cam 236 and the driven gear 324, which operates in conjunction with the drive cam 236. In conformity with this timing, the first cancel cam surface 324c2 in the cam portion 324c and the lever member 129 come into contact with each other. With such an operation, the lever member 129 swings in such a way as to compress the home spring 130 to charge the elastic force of the home spring 130. Thus, the first cancel cam surface 324c2 acts on the home spring 130 (the lever member 129) in such a way as to charge the elastic force of the home spring 130 in response to an operation in which the slider 237 releases the elastic force of one transfer roller pressure spring 240 by the rotation of the drive cam 236. A force for charging the elastic force of the home spring 130 causes a cancel torque opposite to the inverse input torque generated at the driven gear 324 to be generated.

Next, when the second operation mode transitions to the third operation mode, as mentioned above, a larger inverse input torque is generated at the drive cam 236 and the driven gear 324, which operates in conjunction with the drive cam 236. In conformity with this timing, the second cancel cam surface 324c4 in the cam portion 324c and the lever member 129 come into contact with each other. As mentioned above, the surface in which the cam radius becomes larger of the second cancel cam surface 324c4 is provided in such a manner that the amount of increase of the cam radius thereof becomes larger as the driven gear 324 rotates counterclockwise than that of the first cancel cam surface 324c2. Thus, the second cancel cam surface 324c4 acts on the home spring 130 (the lever member 129) in such a way as to charge the elastic force of the home spring 130 by a force stronger than that in the first operation mode in response to an operation in which the slider 237 releases the elastic force of three transfer roller pressure springs 240 by the rotation of the drive cam 236. With this action, the second cancel cam surface 324c4 is able to cause a larger cancel torque than when the lever member 129 is in contact with the first cancel cam surface 324c2 to be generated.

Next, when the third operation mode transitions to the first operation mode, as mentioned above, a relatively large drive torque is generated at the drive cam 236 and the driven gear 324, which operates in conjunction with the drive cam 236. In conformity with this timing, the assist cam surface 324c6 in the cam portion 324c and the lever member 129 come into contact with each other. With such an operation, the lever member 129 swings in such a way as to expand the home spring 130 to release the elastic force of the home spring 130. Thus, the assist surface 324c6 acts on the home spring 130 (the lever member 129) in such a way as to release the elastic force of the home spring 130 in response to an operation in which the slider 237 charges the elastic force of three transfer roller pressure springs 240 by the rotation of the drive cam 236. A force for releasing the elastic force of the home spring 130 causes an assist torque for canceling out a drive torque generated at the driven gear 324 to be generated.

As described above, according to the fourth exemplary embodiment, when, in the intermediate transfer unit T, the first operation mode transitions to the second operation mode, the fourth clutch CL4 is able to reduce an inverse input torque generated at the driven gear 324. Moreover, when the second operation mode transitions to the third operation mode, the fourth clutch CL4 is able to reduce a larger inverse input torque generated at the driven gear 324 by causing a large cancel torque to be generated. In this way, the fourth clutch CL4 is able to cope with inverse input torques which differ in magnitude depending on a difference in operation mode of the intermediate transfer unit T.

Moreover, when the third operation mode transitions to the first operation mode, the fourth clutch CL4 is also able to reduce a relatively large drive torque generated at the driven gear 324 by applying, to the driven gear 324, a force for expanding the home spring 130 to release the elastic force of the home spring 130.

In the above-described first exemplary embodiment, a configuration in which the home cam 124b serving as a first cam member includes the home cam surface 124b1 and the cancel cam surface 124b2, which acts on the home spring 130 in response to an operation in which the follower portion 122b releases the elastic force of the pick spring 123, has been described as an example. The cancel cam surface 124b2 is a cam surface which acts on the home spring 130 in such a way as to charge the elastic force of the home spring 130 and is a cam surface in which the radius from the rotation center of the home cam 124b to the outer circumferential surface thereof becomes larger as the home cam 124b rotates. However, the present exemplary embodiment is not limited to this. The home cam 124b serving as a first cam member can be configured to include the home cam surface 124b1 and an assist cam surface, which acts on the home spring 130 in response to an operation in which the follower portion 122b of the pick arm 122 charges the elastic force of the pick spring 123. As described in the second exemplary embodiment, the assist cam surface is a cam surface which acts on the home spring 130 in such a way as to release the elastic force of the home spring 130 and is a cam surface in which the radius from the rotation center of the home cam 124b to the outer circumferential surface thereof becomes smaller as the home cam 124b rotates.

Moreover, while, in the above-described exemplary embodiments, four cartridges attachable to and detachable from the image forming apparatus are used, the number of cartridges to be used is not limited, but an appropriate number of cartridges can be used as needed. Moreover, while a cartridge integrally including a photosensitive drum and a charging unit and a developing unit which serve as a process unit acting on the photosensitive drum is used as an example of a cartridge attachable to and detachable from the image forming apparatus, the cartridge is not limited to this. A cartridge integrally including, besides the photosensitive drum, one of the charging unit and the developing unit can be used.

Moreover, while, in the above-described exemplary embodiments, a configuration in which a cartridge including a photosensitive drum is attachable to and detachable from the image forming apparatus is described as an example, the above-described exemplary embodiments are not limited to this. For example, an image forming apparatus in which a photosensitive drum and a process unit acting on the photosensitive drum are individually incorporated or an image forming apparatus which a photosensitive drum and a process unit acting on the photosensitive drum are individually attachable to and detachable from can be used.

Moreover, while, in the above-described exemplary embodiments, an example in which a printer is used as the image forming apparatus has been described, the above-described exemplary embodiments are not limited to this example. For example, another type of image forming apparatus such as a copying machine or facsimile apparatus or another type of image forming apparatus such as a multifunction peripheral including a combination of functions of such apparatuses can be used. Moreover, while an image forming apparatus which uses an intermediate transfer member, sequentially transfers toner images for respective colors to the intermediate transfer member, and collectively transfers the toner images borne on the intermediate transfer member to a recording material has been described as an example, the above-described exemplary embodiments are not limited to this. An image forming apparatus which uses a recording material bearing member and sequentially superposes and transfers toner images for respective colors onto a recording material borne on the recording material bearing member can be used. Similar advantageous effects can be attained even by applying the above-described exemplary embodiments to such image forming apparatuses.

According to exemplary embodiments of the present disclosure, a torque variation of the cam member which is rotated by receiving a driving force from a drive source can be reduced.

Moreover, since, when a partially toothless gear portion of the driven gear faces the drive gear, an urging force of the first elastic member is used for, besides limiting the rotation of the driven gear, reducing a torque variation of the cam member, it is not necessary to arrange a dedicated member, so that there is no increase in the number of components.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-132479 filed Aug. 4, 2020, which is hereby incorporated by reference herein in its entirety.

What is claimed is:

1. A driving force transmission device provided in a drive train which transmits a driving force coming from a drive source to a driven member, the driving force transmission device comprising:
   a drive gear configured to rotate by being coupled to the drive source;
   a driven gear including a gear portion, which has a plurality of teeth meshing with the drive gear, and a partially toothless gear portion, which is a region having no teeth meshing with the drive gear, and configured to rotate in response to the gear portion meshing with the drive gear and to stop rotating in response to the partially toothless gear portion facing the drive gear;
   a first cam member configured to rotate in conjunction with rotation of the driven gear;
   a second cam member configured to rotate in conjunction with rotation of the driven gear;
   a first elastic member configured to apply an urging force to the first cam member;
   a contact portion configured to come into contact with the first cam member by the urging force of the first elastic member; and
   a follower member configured to be urged by a second elastic member and be moved by the second cam member,
   wherein the first cam member includes (i) a home cam surface configured to come into contact with the contact portion in such a manner that, when the partially toothless gear portion faces the drive gear, rotation of the driven gear is limited, and (ii) a cancel cam surface configured to come into contact with the contact portion when an elastic force of the second elastic member is released according to rotation of the driven gear, and
   wherein the cancel cam surface comes into contact with the contact portion in such a manner that an elastic force of the first elastic member is charged according to rotation of the driven gear.

2. The driving force transmission device according to claim 1, wherein the cancel cam surface is formed in such a manner that a radius from a rotation center of the first cam member becomes larger according to rotation of the driven gear.

3. The driving force transmission device according to claim 1, wherein the first cam member includes an assist cam surface configured to come into contact with the contact portion when the elastic force of the second elastic member is charged according to rotation of the driven gear, and the assist cam surface comes into contact with the contact portion in such a manner that the elastic force of the first elastic member is released according to rotation of the driven gear.

4. The driving force transmission device according to claim 3, wherein the assist cam surface is formed in such a manner that a radius from a rotation center of the first cam member becomes smaller according to rotation of the driven gear.

5. The driving force transmission device according to claim 3,
   wherein the home cam surface includes a first home cam surface, a second home cam surface, and a third home cam surface, and the first home cam surface, the second home cam surface, and the third home cam surface are arranged side by side in a rotational direction of the first cam member,
   wherein the cancel cam surface includes a first cancel cam surface provided between the first home cam surface and the second home cam surface and a second cancel cam surface provided between the second home cam surface and the third home cam surface, and
   wherein the assist cam surface is provided between the third home cam surface and the first home cam surface.

6. The driving force transmission device according to claim 5, wherein the first cancel cam surface and the second cancel cam surface are formed in such a manner that a radius from a rotation center of the first cam member becomes larger according to rotation of the driven gear.

7. The driving force transmission device according to claim 6, wherein an amount of increase of a radius of the second cancel cam surface according to rotation of the driven gear is larger than an amount of increase of a radius of the first cancel cam surface according to rotation of the driven gear.

8. The driving force transmission device according to claim 1, wherein the first cam member and the second cam member are integrally configured.

9. The driving force transmission device according to claim 8, wherein the driven gear, the first cam member, and the second cam member are integrally configured.

10. An image forming apparatus comprising:
    the driving force transmission device according to claim 1; and
    an image forming unit configured to form an image.

11. The image forming apparatus according to claim 10, further comprising:
    a stacking unit configured to stack a recording material thereon; and
    a roller configured to convey the recording material from the stacking unit,
    wherein the roller moves in conjunction with movement of the follower member.

12. The image forming apparatus according to claim 10, further comprising an intermediate transfer unit including a belt and a transfer member,
    wherein the transfer member moves in conjunction with movement of the follower member.

13. A driving force transmission device provided in a drive train which transmits a driving force coming from a drive source to a driven member, the driving force transmission device comprising:
    a drive gear configured to rotate by being coupled to the drive source;
    a driven gear including a gear portion, which has a plurality of teeth meshing with the drive gear, and a partially toothless gear portion, which is a region having no teeth meshing with the drive gear, and configured to rotate in response to the gear portion meshing with the drive gear and to stop rotating in response to the partially toothless gear portion facing the drive gear;
    a first cam member configured to rotate in conjunction with rotation of the driven gear;
    a second cam member configured to rotate in conjunction with rotation of the driven gear;
    a first elastic member configured to apply an urging force to the first cam member;
    a contact portion configured to come into contact with the first cam member by the urging force of the first elastic member; and a follower member configured to be urged by a second elastic member and be moved by the second cam member, wherein the first cam member includes (i) a home cam surface configured to come into contact with the contact portion in such a manner that, when the partially toothless gear portion faces the drive gear, rotation of the driven gear is limited, and (ii) an assist cam surface configured to come into contact with the contact portion when an elastic force of the second elastic member is charged according to rotation of the driven gear, and wherein the assist cam surface comes into contact with the contact portion in such a manner that an elastic force of the first elastic member is released according to rotation of the driven gear.

14. The driving force transmission device according to claim 13, wherein the assist cam surface is formed in such a manner that a radius from a rotation center of the first cam member becomes smaller according to rotation of the driven gear.

15. The driving force transmission device according to claim 13, wherein the first cam member and the second cam member are integrally configured.

16. The driving force transmission device according to claim 15, wherein the driven gear, the first cam member, and the second cam member are integrally configured.

17. An image forming apparatus comprising:
the driving force transmission device according to claim 13; and
an image forming unit configured to form an image.

18. The image forming apparatus according to claim 17, further comprising:
a stacking unit configured to stack a recording material thereon; and
a roller configured to convey the recording material from the stacking unit,
wherein the roller moves in conjunction with movement of the follower member.

19. The image forming apparatus according to claim 17, further comprising an intermediate transfer unit including a belt and a transfer member,
wherein the transfer member moves in conjunction with movement of the follower member.

20. A driving force transmission device provided in a drive train which transmits a driving force coming from a drive source to a driven member, the driving force transmission device comprising:
a drive gear configured to rotate by being coupled to the drive source;
a driven gear including a gear portion, which has a plurality of teeth meshing with the drive gear, and a partially toothless gear portion, which is a region having no teeth meshing with the drive gear, and configured to rotate in response to the gear portion meshing with the drive gear and to stop rotating in response to the partially toothless gear portion facing the drive gear;
a first cam member configured to rotate in conjunction with rotation of the driven gear;
a second cam member configured to rotate in conjunction with rotation of the driven gear;
a first elastic member configured to apply an urging force to the first cam member;
a contact portion configured to come into contact with the first cam member by the urging force of the first elastic member; and
a follower member configured to be urged by a second elastic member and be moved by the second cam member,
wherein the first cam member includes (i) a home cam surface configured to come into contact with the contact portion in such a manner that, when the partially toothless gear portion faces the drive gear, rotation of the driven gear is limited, and (ii) at least one of a cancel cam surface and an assist cam surface,
wherein the cancel cam surface comes into contact with the contact portion in such a manner that, when an elastic force of the second elastic member is released according to rotation of the driven gear, an elastic force of the first elastic member is charged according to rotation of the driven gear, and
wherein the assist cam surface comes into contact with the contact portion in such a manner that, when the elastic force of the second elastic member is charged according to rotation of the driven gear, the elastic force of the first elastic member is released according to rotation of the driven gear.

* * * * *